United States Patent
Hashim et al.

(10) Patent No.: US 10,421,675 B2
(45) Date of Patent: Sep. 24, 2019

(54) METHODS OF SYNTHESIZING THREE-DIMENSIONAL HETEROATOM-DOPED CARBON NANOTUBE MACRO MATERIALS AND COMPOSITIONS THEREOF

(71) Applicants: Daniel Paul Hashim, Deer Park, NY (US); Pulickel M. Ajayan, Houston, TX (US); Mauricio Terrones, State College, PA (US)

(72) Inventors: Daniel Paul Hashim, Deer Park, NY (US); Pulickel M. Ajayan, Houston, TX (US); Mauricio Terrones, State College, PA (US)

(73) Assignee: CSS Nanotech, Inc., Houston, TX (US)

( * ) Notice: Subject to any disclaimer, the term of this patent is extended or adjusted under 35 U.S.C. 154(b) by 0 days.

(21) Appl. No.: 16/369,022

(22) Filed: Mar. 29, 2019

(65) Prior Publication Data
US 2019/0225516 A1 Jul. 25, 2019

Related U.S. Application Data

(63) Continuation of application No. 13/424,185, filed on Mar. 19, 2012.
(Continued)

(51) Int. Cl.
*C02F 1/68* (2006.01)
*B01J 20/02* (2006.01)
(Continued)

(52) U.S. Cl.
CPC .......... *C02F 1/681* (2013.01); *B01J 20/0248* (2013.01); *B01J 20/0259* (2013.01);
(Continued)

(58) Field of Classification Search
CPC .......... C02F 1/681; C02F 1/281; C02F 1/283; C02F 2101/32; C02F 2103/007;
(Continued)

(56) References Cited

U.S. PATENT DOCUMENTS

| 2004/0222080 A1* | 11/2004 | Tour | B82Y 30/00 204/157.15 |
| 2010/0015033 A1* | 1/2010 | Keskar | B82Y 30/00 423/447.3 |

FOREIGN PATENT DOCUMENTS

| WO | WO 03/072859 | * 9/2003 | D01F 9/12 |

OTHER PUBLICATIONS

Satishkumar, et al., The decoration of carbon nanotubes by metal nanoparticles, J. Phys. D: Appl. Phys. 1996; 29: 3173-3176 (Year: 1996).*

(Continued)

*Primary Examiner* — Daniel C. McCracken
(74) *Attorney, Agent, or Firm* — David Bradin; Nexsen Pruet, PLLC

(57) ABSTRACT

Methods for synthesizing macroscale 3D heteroatom-doped carbon nanotube materials (such as boron doped carbon nanotube materials) and compositions thereof. Macroscopic quantities of three-dimensionally networked heteroatom-doped carbon nanotube materials are directly grown using an aerosol-assisted chemical vapor deposition method. The porous heteroatom-doped carbon nanotube material is created by doping of heteroatoms (such as boron) in the nanotube lattice during growth, which influences the creation of elbow joints and branching of nanotubes leading, to the three dimensional super-structure. The super-hydrophobic heteroatom-doped carbon nanotube sponge is strongly oleophilic and can soak up large quantities of organic solvents and oil. The trapped oil can be burnt off and the heteroatom-doped carbon nanotube material can be used
(Continued)

repeatedly as an oil removal scaffold. Optionally, the heteroatom-doped carbon nanotubes in the heteroatom-doped carbon nanotube materials can be welded to form one or more macroscale 3D carbon nanotubes.

26 Claims, 40 Drawing Sheets

Related U.S. Application Data

(60) Provisional application No. 61/454,475, filed on Mar. 18, 2011.

(51) Int. Cl.
| | | |
|---|---|---|
| *C02F 1/28* | (2006.01) | |
| *B01J 20/20* | (2006.01) | |
| *C01B 35/00* | (2006.01) | |
| *B82Y 30/00* | (2011.01) | |
| *B82Y 40/00* | (2011.01) | |
| *C01B 32/16* | (2017.01) | |
| *H01G 11/32* | (2013.01) | |
| *C02F 101/32* | (2006.01) | |
| *C02F 103/00* | (2006.01) | |
| *C02F 103/08* | (2006.01) | |

(52) U.S. Cl.
CPC ......... *B01J 20/0266* (2013.01); *B01J 20/205* (2013.01); *B82Y 30/00* (2013.01); *B82Y 40/00* (2013.01); *C01B 32/16* (2017.08); *C01B 35/00* (2013.01); *C02F 1/288* (2013.01); *H01G 11/32* (2013.01); *B01J 2220/42* (2013.01); *C01B 2202/30* (2013.01); *C02F 1/281* (2013.01); *C02F 1/283* (2013.01); *C02F 2101/32* (2013.01); *C02F 2103/007* (2013.01); *C02F 2103/08* (2013.01); *C02F 2305/08* (2013.01); *Y02E 60/13* (2013.01); *Y02W 10/37* (2015.05)

(58) Field of Classification Search
CPC .. C02F 2103/08; C02F 2305/08; C02F 1/288; B01J 20/0248; B01J 20/0259; B01J 20/0266; B01J 20/205; B01J 2220/42; B82Y 30/00; B82Y 40/00; H01G 11/32; Y02W 10/37; C01B 2202/30; C01B 32/16; C01B 35/00; Y02E 60/13
See application file for complete search history.

(56) References Cited

OTHER PUBLICATIONS

Ferrocene, accessed online at: https://pubchem.ncbi.nlm.nih.gov/compound/ferrocene#section=Top on May 12, 2018. (Year: 2018).*
Triethylborane, accessed online at: https://pubchem.ncbi.nlm.nih.gov/compound/Triethylborane#section=Top on May 12, 2018. (Year: 2018).*
Lozano-Castello, et al., Preparation and characterization of novel sea-cucumbef-like structures containing carbon and boron, Carbon 2004; 42: 2223-2231 (Year: 2004).*

* cited by examiner

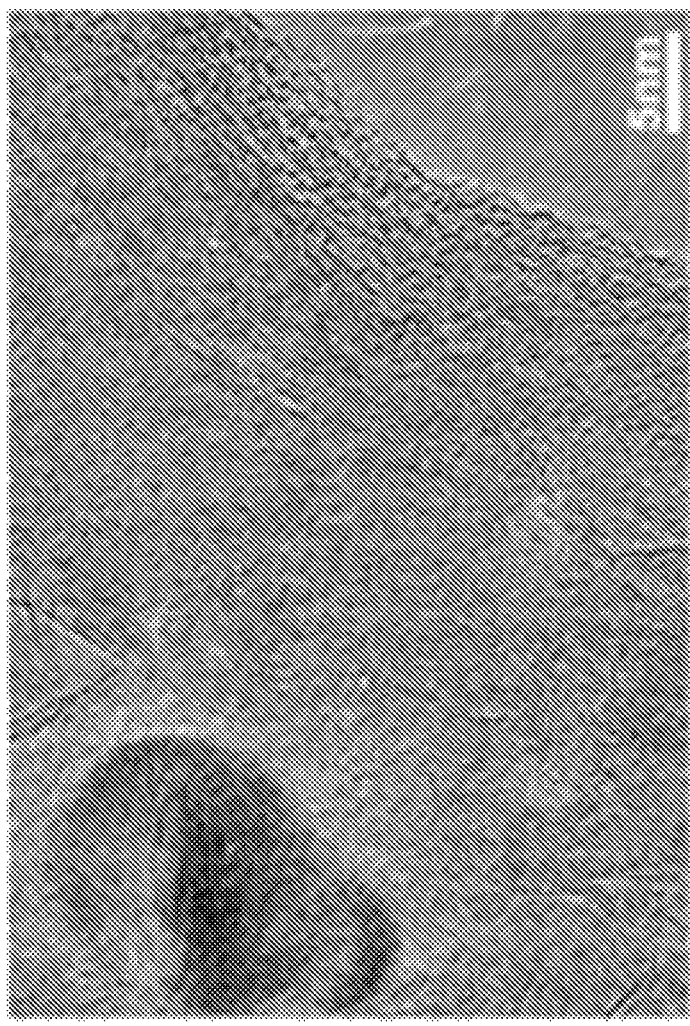
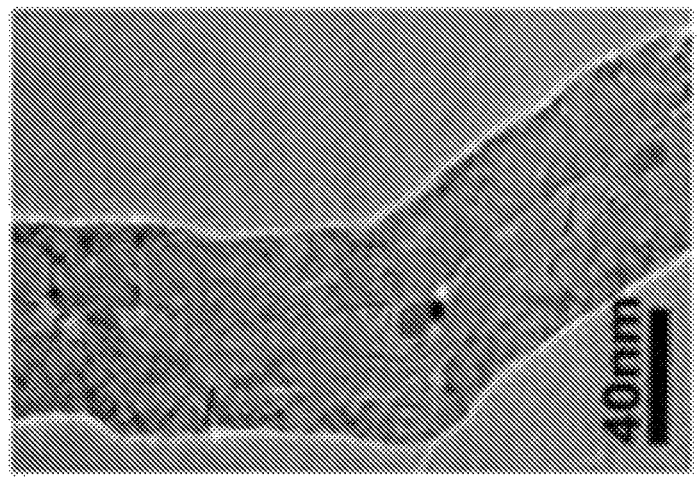
Figure 5H
Figure 5G

METHODS OF SYNTHESIZING THREE-DIMENSIONAL HETEROATOM-DOPED CARBON NANOTUBE MACRO MATERIALS AND COMPOSITIONS THEREOF

CROSS-REFERENCE TO RELATED PATENT APPLICATIONS

This application is a Continuation of U.S. patent application Ser. No. 13/424,185, filed Mar. 19, 2012, which claims priority to provisional U.S. Patent Application Ser. No. 61/454,475, filed Mar. 18, 2011, entitled "Methods Of Synthesizing Three-Dimensional Heteroatom-Doped Carbon Nanotube Macro Materials And Compositions Thereof," which provisional patent application is commonly assigned to the assignee of the present invention. The disclosures of each of these documents is hereby incorporated by reference in its entirety.

GOVERNMENT INTEREST

This invention was made with government support under Grant Number OISE-0756097 (titled "IRES-US-Mexico Collaborative Effort on Nanotechnology Education and Research") awarded by the National Science Foundation. This material is also based upon work supported by the National Science Foundation Graduate Research Fellowship awarded to D. P. H. under Grant No. 0940902. The government has certain rights in the invention.

FIELD OF THE INVENTION

The present invention relates to methods for synthesizing heteroatom-doped carbon nanotube sponge-like materials and compositions thereof. More particularly, present invention relates to methods for synthesizing three-dimensional (3D) carbon nanotube sponge-like materials using heteroatom substitutional dopants and compositions thereof. Such 3D carbon nanotube sponge-like materials include boron-doped carbon nanotube sponge-like materials and sulfur-doped carbon nanotube sponge-like materials.

BACKGROUND OF THE INVENTION

Since the advent of carbon nanotubes (CNT) [Iijima 1991; Oberlin 1976] engineering and controlled synthesis of these materials have been thoroughly investigated. Doping multi-walled carbon nanotubes (MWCNT) and single-wall carbon nanotubes (SWCNT) with elements such as nitrogen and boron has also been used for altering their electronic properties for specific applications. [Stephan 1994; Suenaga 1997; Terrones 1996; Sen 1998; Nath 2000; Terrones 1999; Yudasaka 1997; Suenaga 2000; Wang 2002; Kurt 2001; Ma 1999; Redlich 1996; Sen 1997]. Boron doping of fullerenes by substitution was theoretically discussed [Han 2000]; and previous research demonstrated that boron-doped multi-walled carbon nanotubes (CBxMWNTs) can be formed via chemical vapor deposition (CVD) using $BF_3$/MeOH as the boron source, a complex boron supported catalyst Fe/Ca $(BO_3)_2$/$CaCO_3$, and acetylene as the carbon source. [Mondal 2007] It was also found that "sea-cucumber" morphologies could be formed when carrying out the spray-pyrolysis of a ferrocene-xylene-triethylborane (TEB) mixture. [Lozano-Castello 2004]. CBxMWNTs have been synthesized using 1M triethylborane in hexanes solution mixed with toluene and compared to CNxMWNT's. [Koós 2010]. Other methods for synthesizing double-walled and single-walled CBx-NT's have also been reported [Lyu 2011; Goldberg 1999; Maullzsch 2002; Redlich 1996; McGuire 2005].

It has also been found that dopant atoms such as nitrogen or sulfur can induce dramatic tubule morphology changes in CNTs, including covalent multi-junctions [Sumpter 2007; Romo-Herrera 2008; Romo-Herrera 2009; Sumpter 2009], however these morphologies were not utilized to create 3D macro-scale architectures.

Theoretical and experimental studies on the electronic structure of both semiconducting and metallic CBxNT's have shown a strong acceptor state due to the presence of boron and a lowering of the Fermi level. [Yi 1993; Carroll 1998]. Theoretical studies have predicted that significant structural reorganization generates stable bends in CNTs due to presence of pentagon and heptagon defects [Dunlap 1992] that could accommodate foreign atoms besides carbon within the $sp^2$ graphitic lattice [Sumpter 2009]. In addition, it was found that boron doping acts as a "surfactant" during growth to significantly increases the aspect ratio of nanotubes by preventing tube closure—allowing longer tube lengths to be synthesized (~5-100 μm) and favoring the zigzag (or near zigzag) chirality [Blasé 1999]. It was later found that dopant atoms can also induce dramatic-tubule morphology changes in CNT's. [Lee 2002; Sumpter 2007].

CBxMWNTs could be synthesized by chemical vapor deposition (CVD) using multiple hydrocarbons and boron sources [Mondal 2007; Lozano-Castello 2004; Koós 2010; Lyu 2011], but none of these works yielded macroscale 3D solid structures, or were able to confirm the distinct tubular morphologies induced by boron.

Theoretical and experimental research had demonstrated that boron interstitial atoms located between double-walled CNTs act as atomic "fusers" or "welders" under high temperature annealing (1400-1600° C.) [Endo 2005], thus establishing covalent tube interconnections, but neither did this work produce macroscale solids. 3D solids of straight entangled non-doped CNTs were recently reported by others to create compressible sponges [Gui II 2010] and temperature-invariant viscoelastic solids [Xu 2010]. However neither of these works show promise towards any degree of covalent bonding established between CNTs; nor do they possess dramatic defect sites within the CNT network.

There is a need for a scalable synthesis process for building macroscale three-dimensional structures from one-dimensional (1D) CNT building blocks. As used herein, a "macroscale three-dimensional structure" (or "macroscale 3D structure") is a material that is at least 1 cm in three orthogonal directions. The macroscale 3D structure composed of CNTs can be obtained by: (1) randomly aligned, isotropic ensemble of entangled nanotubes without requiring nanotube-nanotube junctions; (2) randomly aligned isotropic ensemble or an ordered array nanotube structure containing two-dimensional nanotube junctions; (3) randomly aligned isotropic ensemble or an ordered array nanotube structure containing three-dimensional nanotube junctions; (4) a structure composed of any combination of (1), (2) and (3). As further used herein, a "junction" is considered to be any form of covalent bonding between the nanotubes at any (all) angle(s).

As further used herein, a "two-dimensional nanotube junction" (which is also referred to as a "two-dimensional nanotube" or "2D CNT") is a nanotube that is a least 100 nm in two perpendicular directions (or in the same 2D plane having any angle), while, in the direction orthogonal to both perpendicular directions (2D plane), the nanotube is generally less than 100 nm. For example, a nanotube in the shape of a cross (or an "X") that has a length of more than 100 nm along the vertical axis and a width of more than 100 nm along the vertical axis, but has a depth less than 100 nm, would be a two-dimensional nanotube junction. When a two-dimensional nanotube junction is on the macroscale, this means the carbon nanotube is at least 1 cm in two perpendicular directions, and can be referred to as a "macroscale two-dimensional nanotube junction" (or a "macroscale two-dimensional nanotube.")

Coordinately, a "three-dimensional nanotube junction" (which is also referred to as a "three-dimensional nanotube" or "3D CNT") is a nanotube that is a least 100 nm in three orthogonal directions. When a three-dimensional nanotube junction is on the macroscale, this means the carbon nanotube is at least 1 cm in three orthogonal directions, and can be referred to as a "macroscale two-dimensional nanotube junction" (or a "macroscale three-dimensional nanotube.")

In the present invention, the heteroatom-doped carbon nanotube material (such as CBxNT material) synthesized by the AACVD process of the present invention is a macroscale 3D structure (or macroscale 3D material). The heteroatom-doped carbon nanotubes in this macroscale 3D structure are not necessarily macroscale three-dimensional nanotubes. Generally, in the absence of a post-synthesis process (such as welding) the heteroatom-doped carbon nanotubes in the macroscale 3D structure are two-dimensional nanotubes, and, in some instances, macroscale two-dimensional nanotubes, or purely entangled randomly aligned one-dimensional nanotubes.

After the post-synthesis process (such as welding), the nanotubes in the macroscale 3D structure can themselves be three-dimensional nanotubes, and, generally, macroscale three-dimensional nanotubes. In this way the structure can become virtually monolithic solids composed of macroscale three-dimensional nanotubes.

SUMMARY OF THE INVENTION

It has been discovered that heteroatom (such as boron, sulfur, nitrogen, phosphorous) doping can be used to build macroscale three-dimensional structures from CNTs in a scalable synthesis process, which results in the formation of heteroatom-doped carbon nanotube materials, such as boron-doped carbon nanotube ("CBxNT") materials. Herein, with respect to doping with heteroatoms, the term "doping" refers to placing heteroatoms in the CNT lattice in place of carbon atoms. A "heteroatom-doped CNT" is a carbon nanotube that has heteroatoms replacing carbon atoms in the CNT lattice.

An abundance of localized and topological defects, including extreme tubular morphologies, are impactful features for many applications requiring further CNT functionalization chemistry, or anchor-sites for molecular/atomic/nanoparticle adsorption (decoration) within the 3D porous solid. Furthermore, substitutionally doped CNTs provide enhanced chemical reactivity. It is believed that the present invention is the first demonstration to exploit the uniqueness of heteroatom substitutional dopant effects on CNT morphology to create elastic macroscale 3D structures. In combination with the heteroatom's (such as boron's) interstitial "welding" and "surfactant" effects, the doping route is directed to true (covalent) macroscale 3D carbon nanotubes, such as CNT monoliths, or interlocked nanotube ring structures proposed by Gogotsi [Gogotsi 2010], which had been studied theoretically as fascinating future materials with superior mechanical and electrical properties [Romo-Herrera 2007]. The present invention includes substitutional doping effects of boron (or other heteroatoms such as sulfur, nitrogen, phosphorus, etc.) in carbon nanotubes so as to create a networked CBxNT solid (a macroscale 3D material). These materials possess intriguing dynamic mechanical properties and can be used, for example, as a reusable oil sorbent scaffold material in seawater.

Macroscopic quantities of three-dimensionally networked CBxNT materials (or other heteroatom-doped carbon nanotube materials) are directly grown using an aerosol-assisted chemical vapor deposition method. The porous nanotube sponge is created by doping of boron (or other heteroatom source) in the nanotube lattice during growth, which influences the creation of elbow joints and branching of nanotubes leading to the three dimensional super-structure. The resulting materials have unique properties. For instance, the super-hydrophobic CBxNT material is strongly oleophilic and can soak up large quantities of organic solvents and oil(s). Due to this property, the CBxNT materials are sometimes referred to as "CBxNT sponges" or "CBxNT sponge-like materials." The trapped oil can be burnt off and the material can be used repeatedly as an oil removal scaffold.

The growth of macroscale ($cm^3$ in size) 3D networked heteroatom-doped carbon nanotube materials (such as CBxNT materials) can be made directly through an efficient large-scale AACVD synthetic process. Detailed elemental analysis revealed the heteroatom (such as boron) to be responsible for these results and creates "elbow-like" junctions and covalent nanojunctions. These observations are in agreement with first principle calculations—indicating that the most suitable sites to host heteroatoms within a defective $sp^2$-hybridized carbon network are close to heptagonal rings or negatively curved areas. These macroscale 3D heteroatom-doped carbon nanotube frameworks contain many functional defect-sites, which can be an advantage over pristine carbon nanotube counterparts. To this end, heteroatom-doped carbon nanotubes have broad implications for many practical material applications, such as selective sorbent materials, hydrogen storage [Singh 1993; Froudakis 2011], and flexible conductive scaffolds as porous 3D electrodes.

The ultra-lightweight macroscale 3D material exhibited a variety of multi-functional properties including robust elastic mechanical properties with high damping, electrical conductivity, thermal stability, high porosity, super-hydrophobicity, oleophilic behavior and strong ferromagnetism. The environmental oil removal-and-salvage application from seawater was demonstrated where the CBxNT sponge acts as an efficient scaffold which can be controlled and recollected via a magnetically driven process, and reused multiple times.

In general, in one aspect, the invention features a method of making a macroscale 3D heteroatom-doped carbon nanotube material. The method includes forming a chemical precursor solution comprising a carbon source, a catalyst source, and a heteroatom source. The method further includes generating an aerosol from the chemical precursor solution. The method further includes performing an aerosol-assisted chemical vapor deposition process using the aerosol to form the macroscale 3D heteroatom-doped carbon nanotube material. The macroscale 3D heteroatom-doped carbon nanotube material include heteroatom-doped carbon nanotubes.

Implementations of the inventions can include one or more of the following features:

The heteroatom can be boron.

The heteroatom-doped carbon nanotubes can include two-dimensional heteroatom-doped carbon nanotubes.

The carbon source can include toluene.

The carbon source can be toluene, cyclohexane, heptane, pentane, xylenes, hexanes, benzene, or a combination thereof.

The carbon source can include a liquid hydrocarbon that is capable of dissolving the catalyst source, the heteroatom source, or both.

The carbon source can be at least 87 wt % of the carbon source, the catalyst source, and the heteroatom source in the chemical precursor solution.

The carbon source can be between about 87 wt % and about 97 wt % of the carbon source, the catalyst source, and the heteroatom source in the chemical precursor solution.

The catalyst source can be capable of catalyzing the formation of carbon nanotubes in an aerosol-assisted chemical vapor deposition process.

The catalyst source can include a metal catalyst.

The metal catalyst can include iron, nickel, cobalt, an alloy thereof, or a combination thereof.

The metal can be iron.

The catalyst source can include ferrocene.

The catalyst source can include a metallocene.

The metallocene can be ferrocene, nickelocene, cobaltocene, or a combination thereof.

The catalyst source can be between about 2.5 wt % and about 12 wt % of the carbon source, the catalyst source, and the heteroatom source in the chemical precursor solution.

The catalyst source can be between about 2.5 wt % and about 10 wt % of the carbon source, the catalyst source, and the heteroatom source in the chemical precursor solution.

The heteroatom source can include a boron source.

The boron source can include triethylborane.

The boron source can be an organoborane, an organoborate, or a combination thereof.

The boron source can be trimethylborane, triphenylborane, trimesitylborane, tributylborane, triethylborane, boric acid, tri methyl borate, triisopropylborate, triethyl borate, triphenyl borate, tributyl borate, diethylmethoxyborane, or a combination thereof.

The heteroatom can be boron, sulfur, nitrogen, phosphorus, or a combination thereof.

The heteroatom source can be a boron source, a sulfur source, a nitrogen source, a phosphorus source, or a combination thereof.

The heteroatom source can include a sulfur source.

The sulfur source can be amorphous sulfur powder, thiophene, allyl sulfide, allyl methyl sulfide, dibenzothiophene, diphenyl disulfide, or a combination thereof.

The heteroatom source can be at most about 2 wt % of the carbon source, the catalyst source, and the heteroatom source in the chemical precursor solution.

The heteroatom source can be between about 0.1 wt % and about 2 wt % of the carbon source, the catalyst source, and the heteroatom source in the chemical precursor solution.

The catalyst source can include metal atoms. The heteroatom source can include heteroatoms. The ratio of the metal atoms to the heteroatoms can be between 2 and 20.

The ratio of the metal atoms to the heteroatoms can be between 4 and 6.

The carbon source can include toluene. The catalyst source can include ferrocene. The boron source can include triethylborane.

The carbon source can be between about 87 wt % and about 97 wt % of the carbon source, the catalyst source, and the boron source in the chemical precursor solution. The catalyst source can be between about 2.5 wt % and about 12 wt % of the carbon source, the catalyst source, and the boron source in the chemical precursor solution. The boron source can be between about 0.1 wt % and about 2 wt % of the carbon source, the catalyst source, and the boron source in the chemical precursor solution.

The step of forming the chemical precursor solution can include (a) mixing the carbon source, catalyst source, and heteroatom source, and (b) sonicating the mixture of the carbon source, catalyst source and boron.

The aerosol can be introduced into a reactor capable of performing the aerosol-assisted chemical vapor deposition process using the aerosol to form the heteroatom-doped carbon nanotube material. The aerosol can be introduced into the reactor via a carrier gas stream.

The carrier gas stream can include argon or argon/hydrogen balanced gas.

The carrier gas stream can be introduced into the reactor at a gas flux range between about 0.05 sl/min-cm$^2$ and about 0.6 L/min-cm$^2$.

The reactor can include a horizontal quartz hot-wall reactor chamber.

The aerosol-assisted chemical vapor deposition process can be carried out under atmospheric pressure and at a temperature between 800° C. and 900° C.

The can further include performing a functionization process to functionalize the heteroatom-doped carbon nanotubes in the macroscale 3D heteroatom-doped carbon nanotube material.

The heteroatom-doped carbon nanotubes can be functioned with substituents that are metal particles.

The metal nanoparticles can be Au, Pt, Ag, Pd, Ti, Sc, Ni, V, or a combination thereof.

The heteroatom-doped carbon nanotubes can be functionalized with substituents that are chemical receptors, polymers, and/or proteins.

The method can further include forming a polymer composite that includes the macroscale 3D heteroatom-doped carbon nanotube material.

The step of forming the polymer composite can include (a) functionalizing the heteroatom-doped carbon nanotubes with substituents and binding the polymer to the functionalized heteroatom-doped carbon nanotubes, (b) directly binding polymer to the unfunctionalized heteroatom-doped carbon nanotubes, or (c) embedding the heteroatom doped carbon nanotubes material in a matrix of the polymer.

The macroscale 3D heteroatom-doped carbon nanotubes can include one or more macroscale 3D heteroatom-doped carbon nanotubes.

The method can further include welding the heteroatom-doped carbon nanotubes in the heteroatom-doped carbon nanotube material to form one or more macroscale 3D heteroatom-doped carbon nanotubes in the heteroatom-doped carbon nanotube material.

The method can further include microwaving the heteroatom-doped carbon nanotube material to form one or more macroscale 3D heteroatom-doped carbon nanotubes in the heteroatom-doped carbon nanotube material.

In general, in another aspect, the invention features a macroscale 3D heteroatom-doped carbon nanotube material that includes heteroatom-doped carbon nanotubes.

Implementations of the inventions can include one or more of the following features:

The bulk density of the macroscale 3D heteroatom-doped carbon nanotube material can be between 10 mg/cm$^3$ and 29 mg/cm$^3$. The average diameter of the heteroatom-doped carbon nanotubes in the heteroatom-doped carbon nanotube material can be between 40 nm and 150 nm.

The heteroatom-doped carbon nanotube material can essentially be heteroatom-doped carbon nanotubes with little to no trace of amorphous carbon.

The heteroatom-doped carbon nanotubes can have heteroatom induced elbow defects.

The heteroatom-doped carbon nanotube material can have a weight-to-weight absorption capacity between about 22 and 123.

The macroscale 3D heteroatom-doped carbon nanotube material can be capable of absorbing a volume of solvent that is between about 70% and about 115% of the volume of the macroscale 3D heteroatom-doped carbon nanotube material before absorption of the solvent.

The macroscale 3D heteroatom-doped carbon nanotube material can be magnetic.

At least some of the macroscale 3D heteroatom-doped carbon nanotubes can be functionalized macroscale 3D heteroatom-doped carbon nanotubes.

The composition can be a polymer composite including the macroscale 3D heteroatom-doped carbon nanotube material.

The heteroatom can be boron, sulfur, nitrogen, phosphorus, or a combination thereof.

The macroscale 3D heteroatom-doped carbon nanotube material can include at least one macroscale 3D heteroatom-doped carbon nanotube.

The macroscale 3D heteroatom-doped carbon nanotube material can be made by the process including the steps of: (a) forming a chemical precursor solution comprising a carbon source, a catalyst source, and a heteroatom source; (b) generating an aerosol from the chemical precursor solution; and (c) performing an aerosol-assisted chemical vapor deposition process using the aerosol to form the macroscale 3D heteroatom-doped carbon nanotube material.

In general, in another aspect, the invention features a method that includes selecting a macroscale 3D heteroatom-doped carbon nanotube material. The method further includes using the macroscale 3D heteroatom-doped carbon nanotube material in an application that is: (i) an organic/oil cleanup process; (ii) a water purification process; (iii) an electrode material for a supercapacitor/battery device; (iv) an electrode material for a battery device; (v) a scaffold support for tissue engineering and cell growth; (vi) a process to sense hazardous gasses at concentrations in the ppm range; (vii) a mechanical sensor application; (viii) hydrogen storage, or (ix) neutron radiation absorption applications.

Implementations of the inventions can include one or more of the following features:

The macroscale 3D heteroatom-doped carbon nanotube material can be used in an organic/oil cleanup process.

The macroscale 3D heteroatom-doped carbon nanotube material can be used to absorb organic/oil material in the organic/oil cleanup process.

The macroscale 3D heteroatom-doped carbon nanotube material the organic/oil material can be mechanically removed from the macroscale 3D heteroatom-doped carbon nanotubes. The macroscale 3D heteroatom-doped carbon nanotube materials can be reused to absorb further organic/oil material.

The organic/oil material mechanically removed from the macroscale 3D heteroatom-doped carbon nanotube materials can be salvaged.

The macroscale 3D heteroatom-doped carbon nanotube material the organic/oil material can be burned out from the macroscale 3D heteroatom-doped carbon nanotubes. The macroscale 3D heterodoped carbon nanotube materials can be reused to absorb further organic/oil material.

The heteroatom can be boron.

DESCRIPTION OF DRAWINGS

For a more detailed understanding of the preferred embodiments, reference is made to the accompanying figures, wherein:

FIGS. 5A-5H are high resolution transmission electron microscopy (HRTEM) images showing "elbow" defects of CBxNTs.

FIG. 7A shows the isotherm plots 701 and 702 for A and D, respectively.

FIG. 9A is a HAADF image showing the linescan path (arrows 901-902) along the negative curvature of elbow defect profiles for elemental boron counts. The scale bar of FIG. 9A is 50 nm. FIG. 9B is a graph that shows the EELS lineprofile for line scans 901-902. The highest density of boron was found at the onset of the negative curvature. FIG. 9C is an HAADF image showing linescans performed on different locations (arrows 903-905) mapping both elemental boron (B) and carbon (C) profiles. The scale bar of FIG. 9C is 50 nm. FIG. 9D is a graph that shows the EELS lineprofiles for line scan 903 mapping B (profile 906) and C (profile 907). FIG. 9E is a graph that shows the EELS lineprofiles for line scan 904 mapping B (profile 908) and C (profile 909). FIG. 9F is a graph that shows the EELS lineprofiles for line scan 905 mapping B (profile 910) and C (profile 911). FIGS. 9D-9F appear to follow the same trend as further evidence of boron incorporation into the lattice. FIG. 9F shows the boron appears to be more easily detected at the outer layers near the regions of high negative curvature. FIG. 9G is a graph of the background subtracted EELS spectrum of the CBxNT's showing both the C and B characteristic K-shell peaks.

FIG. 13D is a photograph that shows the material 1304 dropped into the oil at t=0 min. Inset 1305 shows the material before use. FIG. 13E is a photograph of material 1304 absorbing the oil at t=2 min with inset 1306 showing material 1304 at t=5 min. FIG. 13F is a photograph that shows by burning or squeezing (inset 1307) the oil can be salvaged from material 1304. FIG. 13G is a photograph showing that material 1304 can then be reused repetitively. By using a magnet 1308, material 1304 can track or move the oil. Inset 1309 shows material 1304 after burning and before reuse.

DETAILED DESCRIPTION

Figure 1A:
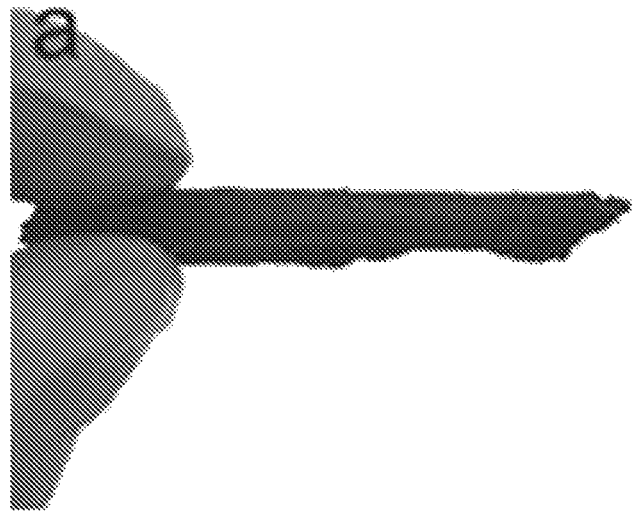
FIG. 1A is a photographic image of macroscale 3D CBxNT material as produced.

The present invention is a new method for synthesizing heteroatom-doped carbon nanotube materials, such as CBxNT materials. Other heteroatom-doped carbon materials include sulfur doped carbon nanotube materials.

In the present specification, boron-doped carbon materials are primarily discussed throughout the detailed description; however, this is representative of doping carbon nanotubes with other heteroatoms.

Large-scalable CVD synthesis of CNTs (such as AACVD synthesis) with a heteroatom (such as boron) containing precursor resulted in "elbow" tubule morphologies forming sponge-like macroscale 3D materials of entangled carbon nanotube networks. It is believed that the heteroatom (i.e., boron) was responsible for the formation of these "elbow" defects, which evidences structural morphology effects of substitutional doping with foreign atoms in the pristine carbon nanotube lattice. The resulting heteroatom-doped carbon nanotube material (such as CBxNT material) exhibited robust elastic mechanical properties, high electrical conductivity, high porosity, super-hydrophobicity, oleophilic behavior, and strong magnetism. The combination of these properties enable this novel macroscale 3D structure of nanotubes for use in various applications, including in environmental organics/oil cleanup and water purification technologies.

The present invention entails a newly specified precursor formula and experimental parameters/processing conditions on an existing technological materials synthesis method (chemical vapor deposition), to create an entirely new form of carbon nanotube material. More specifically, this new form is heteroatom doped carbon nanotube material, such as boron-doped carbon nanotube (CBxNT) materials, which are macroscale 3D materials.

In embodiments of the present invention, the invention is a composition of matter to be synthesized via an aerosol assisted CVD technique. Embodiments of the invention include:

(a) Forming of the heteroatom-doped carbon nanotube material;
(b) Characterization of the heteroatom doped carbon nanotube material;
(c) Functionalization of the heteroatom-doped carbon nanotube material;
(d) Polymer composites of the heteroatom-doped carbon nanotube material; and
(e) Use of the heteroatom doped carbon nanotube material in processes.

Synthesis of the Heteroatom Doped Carbon Nanotube Material

Synthesis Process

The heteroatom-doped carbon nanotube synthesis process takes advantage of the doping effect of heteroatoms (such as boron) on tubule morphology in order to create the three-dimensional entangled networked heteroatom-doped carbon nanotube materials (such as macroscale 3D CBxNT materials).

In an embodiment of the invention, CBxNT material (multi-walled carbon nanotubes) was grown directly on the walls of a quartz tube furnace via a chemical vapor deposition (CVD) method, and more specifically an aerosol-assisted chemical vapor deposition (AACVD), using triethylborane (TEB) (Aldrich >95%) as the boron source.

The AACVD process can be carried out under atmospheric pressure conditions and can include a horizontal quartz hot-wall reactor chamber heated by a tube furnace in the temperature range of 800-900° C. The process involves the use of chemical precursor solutions that include a carbon source, a catalyst source, and a heteroatom source (such as a boron source).

The carbon source is generally an aromatic hydrocarbon chemical liquid hydrocarbon usually in liquid form, such as toluene ($C_7H_8$) or cyclohexane ($C_6H_{12}$). Other carbon sources include heptane ($C_7H_{16}$), pentane ($C_5H_{12}$), xylenes ($C_8H_{10}$), hexanes ($C_6H_{14}$), and benzene ($C_6H_6$). Toluene is a good carbon source to utilize as it is also a solvent in which the other components of the chemical precursor solution can be dissolved. Generally, the carbon source is above 87% of the total weight of the carbon source, the catalyst source, and the heteroatom source in the chemical precursor solutions. In some embodiments, the chemical precursor solutions can be prepared using between about 92 wt % and about 97 wt % of toluene as the carbon source.

The catalyst source is generally a metal catalyst source, such as a metallocene in solid powder form. Typically, the metal catalyst source is an iron metal catalyst source, such as ferrocene ($C_{10}H_{10}Fe$). Other metal catalyst sources include nickel metal catalyst sources, such as nickelocene ($C_{10}H_{10}Ni$), and cobalt metal catalyst sources, such as cobaltocene ($C_{10}H_{10}Co$), and combinations/alloys thereof.

In embodiments utilizing a metallocene, the metallocene (solid powder) concentration dissolved in the hydrocarbon (liquid) is generally between 10 to 150 mg/mL. For instance, ferrocene (solid) concentration dissolved in the toluene (liquid) is generally between 10 to 150 mg/mL.

Generally, the catalyst source is between 2.5 and 12 wt % of the total weight of the carbon source, the catalyst source, and the heteroatom source in the chemical precursor solutions. In some embodiments, the chemical precursor solutions can be prepared using between about 2.5 and about 10 wt % of ferrocene as the catalyst source.

The heteroatom source is generally a liquid source of the heteroatom or a source of the heteroatom that will dissolve in the chemical precursor solution. For example, when the heteroatom is boron, the boron source is a organoborane or organoborate chemical. For instance, the boron source can be triethylborane (Aldrich >95%) (TEB) ($C_6H_{14}B$). Other organoboranes include trimethylborane (liquid)($C_6H_{14}B$), triphenylborane (solid)($C_{18}H_{15}B$), trimesitylborane (solid) ($C_{27}H_{33}B$), tributylborane (liquid) ($C_{12}H_{27}B$), and triethylborane. Organoborates can include boric acid, tri methyl borate, triisopropylborate, triethyl borate, triphenyl borate, tributyl borate, and diethylmethoxyborane. Boron trichloride ($BCl_3$) gas can also be used as a boron source (and mixed with the carrier gas).

Also, for example, when the heteroatom is sulfur, the sulfur source is sulfur containing organic compound. The sulfur source can be pure amorphous sulfur powder or sulfur containing organic compound such as thiophene, allyl sulfide, allyl methyl sulfide, dibenzothiophene, or diphenyl disulfide.

Generally, the heteroatom source is less than about 2 wt % of the total weight of the carbon source, the catalyst source, and the heteroatom source in the chemical precursor solutions. In some embodiments, the chemical precursor solutions can be prepared using between about 0.1 and about 1.0 wt % of triethylborane (Aldrich >95%) (TEB) as the boron source.

In some embodiments of the present invention, the chemical precursor solutions were prepared using 87-96.9 wt. % toluene as the carbon source, 2.5-12 wt. % ferrocene as the iron metal catalyst source and concentrations varying between 0.1-2.0 wt. % triethylborane (Aldrich >95%) (TEB) as the boron source. These concentrations of the carbon source, a catalyst source, and the boron source in the chemical precursor solutions can be varied depending on the desired properties of the material, such as density, porosity, surface area, carbon nanotube diameter, boron doping concentration, etc.

In some embodiments of the invention, the Fe:B, Ni:B, or Co:B (Fe:S, Ni:S, or Co:S) molar ratio within the solution (or gas mixture) is between 2 to 20, and typically between 4 and 6.

After mixing the carbon source, the catalyst source, and the boron (or other heteroatom) source together, this mixture can optionally be sonicated, such as to speed up the dissolution of the catalyst source and/or the boron source in the chemical precursor solution. The sonication can occur between about 15 minutes and an hour. Typically, the sonication occurs for around 30 minutes or more.

After preparation, the chemical precursor solution is placed in an aerosol generator to generate an aerosol, (i.e., micro-droplet (<10 micron diameter) size mist cloud). For instance, an ultrasonic generator can be used to produce an ultrasonic beam directed at the surface of the chemical precursor solution, which forms the aerosol. Such aerosol can be then transported to the reactor by flow of a carrier gas, such as argon (or other non-reactive gas). Examples of such ultrasonic aerosol generators include the Pyrosol 7901 type manufactures by RBI Instrumentation. The Pyrosol 7901 type generator is a vessel with an ultrasonic piezoelectric transducer film at the bottom, controlled by an external generator with adjustable frequency and amplitude. During this aerosol generation process, the aerosol is generated above the solution.

Other types of aerosol generators include ones that are injection systems similar to those utilized in the automobile industry. The chemical precursor solution is stored in a tank, and then pushed under a pressure (typically around 1 bar) by a carrier gas, such as argon, to a valve working in a pulsed mode.

After generation, the aerosol is then transferred into the reactor chamber using the carrier gas, such as argon. In some embodiments of the present invention, the carrier gas is introduced into the reactor at a gas flux range between about 0.05 standard liters per minute per square centimeter (sl/min-cm$^2$) and about 0.6 sl/min-cm$^2$, and typically between about 0.20 sl/min-cm$^2$ and about 0.30 ml/min-cm$^2$. Thus range of flux values can be used to determine the carrier gas feed rate that scales into the CVD system. For instance, when the gas flow of the carrier gas is through a 4.6 cm inner diameter tube (such as a 4.6 cm inner diameter quartz tube), a carrier gas flux of 0.24 sl/min-cm$^2$ would yield a solution feed rate of 4.0 sl/min-cm$^2$. Again, the carrier gas is typically argon. In some embodiments, the carrier gas can be an argon-hydrogen gas mixture.

Referring to the precursor solution in carrier gas, the precursor solution can be introduced into the reactor at a gas flux range between about 0.01 ml/min-cm$^2$ and about 0.5 ml/min-cm$^2$, and typically between about 0.09 ml/min-cm$^2$ and about 0.15 ml/min-cm$^2$. Again, the range of flux values can be used to determine the solution feed rate that scales into the CVD system. For instance, when the gas flow of the carrier gas is through a 4.6 cm inner diameter tube (such as a 4.6 cm inner diameter quartz tube), a solution flux of 0.09 ml/min-cm$^2$ would yield a solution feed rate of 1.50 ml/min.

In the hot chamber reactor zone, the chemical precursor solution is evaporated and the heteroatom-doped carbon nanotube material (such as CBxNT material) is either prepared and collected on the wall of the reactor or is deposited and grown on a substrate. Typically, the heteroatom-doped carbon nanotube growth occurs on quartz/silica substrate in a quartz tube furnace.

An advantage of using an AACVD method is that the chemical precursor solutions can be continuously feed into the reactor chamber, thus rendering the process commercially scalable.

For example, a three-dimensional (3D) bulk CBxNT material consisting entirely of CBxNTs was synthesized as follows:

The aerosol-assisted chemical vapour deposition (AACVD) system was carried out under atmospheric pressure conditions and comprises a horizontal hot-wall quartz tube reactor chamber heated by a furnace (30 cm heating zone). Solutions were prepared mixing toluene (Aldrich, anhydrous, 99.8%) and ferrocene (Fe(C$_5$H$_5$)$_2$) (Alpha Aecer 99%) at a concentration of 25 mg/mL, and triethylborane (TEB) ((C$_2$H$_5$)$_3$B) (Aldrich >95%) at Fe:B ratio 5:1, followed by 30 minute sonication. The TEB was added while in a glove box under an inert nitrogen atmosphere.

The chemical precursor solution was placed in a glass vessel with an ultrasonic piezoelectric transducer film (diameter=40 mm) at the bottom (Pyrosol 7901 type). The piezoelectric frequency and amplitude was controlled by an external generator source providing a resonant frequency ~0.8 MHz.

The chemical precursor solution feed rate was varied between 0.4-0.8 ml/min for a total synthesis time of 30 minutes. The aerosol generated above the solution was transferred into the reactor chamber by an argon, or argon/hydrogen balanced, carrier gas (argon/hydrogen balanced gas is preferred) at flow rates of 2.00-2.50 L/min. The furnace temperature ranged from 850° C.-870° C. in the chamber reactor zone where the chemical precursor solution was evaporated. The temperature of the furnace may range from 800 to 900° C., but is usually between 840 to 870° C. and more usually between 850° C. and 860° C.

Figure 1B:
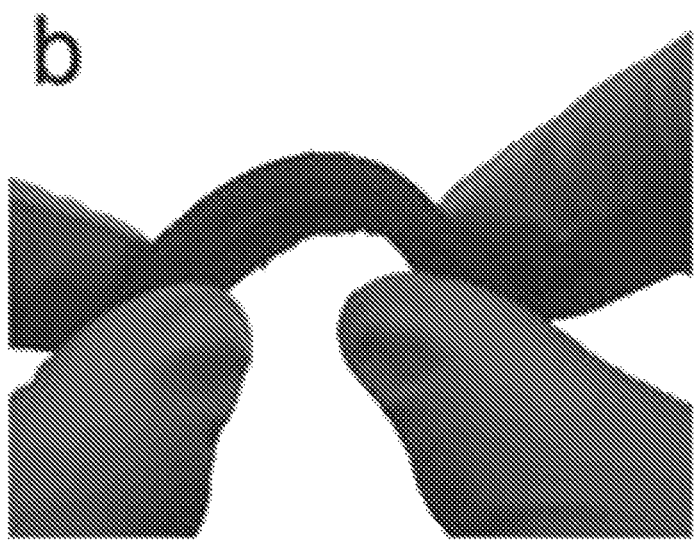
FIG. 1B is the macroscale 3D CBxNT material of FIG. 1A showing its flexibility and mechanical stability upon being bent by hand.

Deposition and growth occurred directly onto the 1 inch diameter quartz tube walls taking on the shape of the tube. The result produced quantities between 2 to 3 grams of CBxNT material in just 30 minutes of growth (60-100 mg/min.), in the form of macroscopic elastic solids (see FIGS. 1A-1F and FIGS. 2A-2E), exhibiting unique physicochemical properties including oleophilicity. As boron can act as a surfactant during growth [Blasé 1999], it is believed this could be a reason for the high yield. The macroscale 3D CBxNT material could be bent to a dramatic degree without breaking and returned to its original position after released. FIGS. 1A-1B. The CBxNT material had a robust mechanical durability and flexibility in response to 'flicking' the material by hand in a cantilever loading fashion. Remarkably, the bulk densities of the porous solids were measured to be in the range of 10 to 29 mg/cm$^3$ (as compared to low density carbon aerogel of 60 mg/cm$^3$). Densities below 10 mg/cm may also be achieved by changing the solution feed rate and synthesis temperature accordingly. The nanotube diameters in the CBxNT material ranged from 40 to 150 nm, as measured from electron microscopy images. FIGS. 1C-1F. Diameters may be below 40 nm or even below 20 nm by changing the synthesis parameters such as precursor feed rate, catalyst concentration, temperature, and carrier gas flow rate. The synthesized 3D architecture of the CBxNT material was entirely made up of randomly orientated and entangled CNTs with little to no amorphous carbon as depicted from SEM. See FIG. 1C.

Figure 3A:
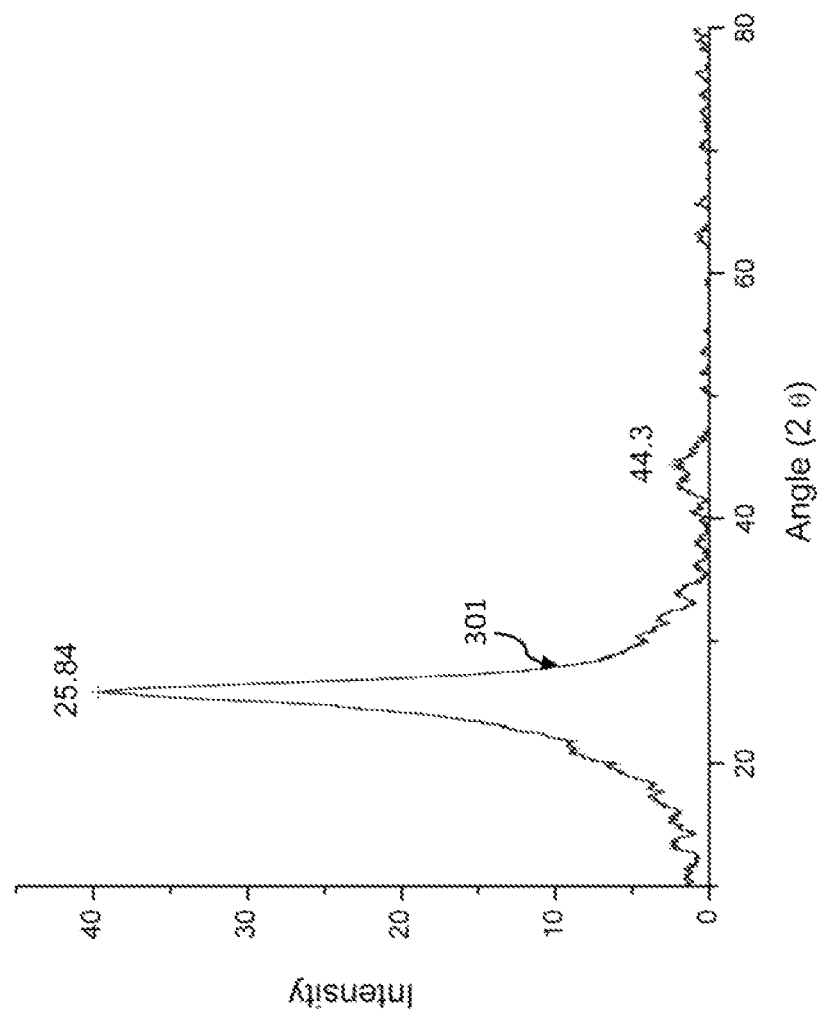
FIG. 3A is an x-ray diffraction pattern of a sample of macroscale 3D CBxNT material.
Figure 3B:
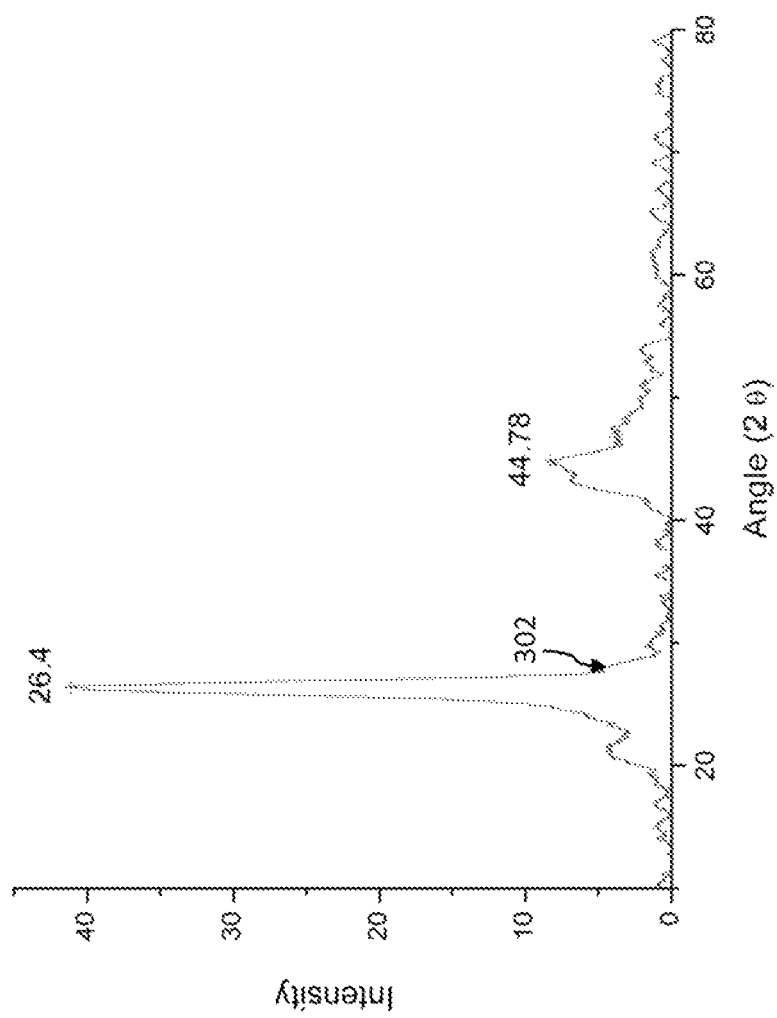
FIG. 3B is an x-ray diffraction pattern of a sample of pristine (undoped) carbon nanotube material.

As shown in FIGS. 3A-3B, the x-ray diffraction pattern showed that the as-produced CBxNT materials were crystalline and had sharp (002) diffraction peaks.

The x-ray diffraction pattern of CBxNT material (curve 301) as compared to the x-ray diffraction pattern of pristine (undoped) carbon nanotubes (curve 302) showed evidence of peak broadening and a shift to lower diffraction angle of the (002) planes appeared for CBxNT material. This indicated an increase in the interplane d-spacing ($\Delta d \approx 0.007$ nm) between the graphitic carbon nanotubes walls due to the boron substitutionally doped with carbon creating disorder in the lattice.

At longer growth times and the lower solution feed rates, sponge-like materials had lower density, more robust mechanical properties (toughness), higher porosity, and higher specific surface area, while maintaining very high electrical conductivity.

The catalytic role of boron (or other heteroatom) to prevent tube closure [Blasé 1999] was responsible to promoting extraordinarily high yield and efficient growth kinetics for doped carbon nanotube production. It was found that the TEB content in the precursor had a direct relationship with the growth temperature needed for yielding the solid structure. The successful growth conditions for the materials of the present invention were very sensitive to the TEB concentration. During growth optimization, it was noticed that the presence of TEB resulted in an increase in the reaction temperature. This observation may be explained by the heteroatoms (such as boron atoms) starting to strongly react with the iron catalyst particles to a degree that may alter the carbon diffusion, saturation, and precipitation growth kinetics of long "elbow-defected" heteroatom-doped carbon nanotubes. For the CBxNT material, it was found that the Fe to B ratio ranges from 2 to 6 within the temperature range 900 to 850° C. respectively. Therefore, the possible role of the catalytic effects of atomic boron on the iron catalyst particles during CBxNT can be used to control nanotube 3D architectures. Using boron as a dopant in carbon nanotube synthesis is a strategy for producing "elbows," which contribute to the elasticity of these networks. The structural integrity of the 3D heteroatom-doped carbon nanotube material is maintained due to the heteroatom induced defects—promoting tube-tube bonding, entanglement, and nanoscale covalent multi-junctions. See FIGS. 1B-1E. In this respect, the doping route seems to be more advantageous, over non-doped CNT entangled networks, holding more promise as a strategy for true (covalent) 3D solid networks with CNTs.

Post-Synthesis Welding Process

Optionally, the synthesized heteroatom-doped carbon nanotube material may be welded after the synthesis process. Accordingly, the invention can further entail a post-synthesis procedure to weld the heteroatom-doped carbon nanotube macroscale 3D material, such as by using microwave radiation energy, for the purpose of enhancing material properties (mechanical, electrical, chemical reactivity).

The post-processing welding procedure enhances the degree of covalent junctions between individual carbon nanotubes. This, in effect can enhance the overall material properties of the macroscale 3D MWCNT structure.

In the synthesis process of the current invention, no substrate is needed to provide a 3D distribution of nanotubes in space, such as described in the Chen '258 Patent. The present invention provides a mass-production method of forming the ideal framework of freestanding, randomly oriented, entangled MWCNTs distributed in 3D macro-scale space. Simply drop casting a solution of carbon nanotubes (such as MWCNTs) onto a substrate (in a "pick-up-sticks" fashion) will yield a loose 2D distribution of MWCNTs, in which case, bundling up of CNTs due to van der Waal forces is very difficult to avoid. In the present invention, bundling of the MWCNTs is avoided due to the "elbow" defects and tube morphologies (bends, kinks, Y-, T-, and X-type junctions) induced by the heteroatom doping (boron. sulfur, etc.) which helps to promote the entanglement and to prevent the strong domination of van der Waal forces commonly known with conventional SWCNT and MWCNT randomly oriented powders and anisotropic aligned arrays. The macroscale 3D entangled network of MWCNTs that compose the heteroatom-doped carbon nanotube materials of the present invention, are therefore in more ideal 3D fixed positions for contacting MWCNTs to weld together within the solid to form macroscale 3D carbon nanotubes. This will result in a virtually monolithic network of carbon nanotubes (such as MWCNTs), which will enhance the overall material properties and performance (in particular the mechanical and electrical properties) of these carbon nanotube elastic solids.

This present invention entails a welding post-processing procedure to provide large-scale synthesis of interconnected carbon nanotube 3D networks in the form of macroscopic solids (i.e., macro-scale 3D materials) having further enhanced material properties and performance. Accordingly, the present invention entails the post-synthesis method performed on the aforementioned CVD synthesized structure for preparing interconnected MWCNT networks in three-dimensional (3D) space to form macro-scaled, porous, elastic solids with enhanced material properties.

This can be done by microwave irradiation welding technique to promote crosslinking and create a virtually monolithic covalently bonded network of interconnected carbon nanotubes and/or heteroatom-doped carbon nanotubes (boron, sulfur, nitrogen, or phosphorous). This can be done using the microwave energy parameters similar to those outlined in the Harutyunyan '884 Patent and the Tour '199 Patent as described for application strictly on pristine (non heteroatom-doped) SWCNT and MWCNT loose powders. These methods were for small-scale 2D layering of CNTs (2D stacking or packing of CNTs), which are vulnerable to the strong van der Waal forces rendering the process counterproductive and less efficient to building true 3D porous solid network structures at the macro-scale. These similar parameters may be applied on the present invention; however in this case, the invention regards the application to 3D heteroatom-doped carbon nanotube materials.

The microwave radiation energy can come from a conventional microwave oven, such as those used as a household appliance; in which case the microwave frequency would be 2.45 GHz and powers that range from 600 to 1400 watts. It is also possible to use other non-conventional microwave frequencies between 1 to 300 GHz, and generally between 1 and 5 GHz.

The power output of the microwave radiation may also vary between 400 watts and 1400 watts. Typically, conventional microwave radiation frequency 2.45 GHz and power output between 600 and 1400 watts is utilized.

By this "welding process," temperatures between 1000 and 2000° C. can be reached. Preferably temperatures above 1500° C. may be needed for the breakdown of the carbon-carbon bonds and the reconstruction (welding) of $sp^2$ crystalline covalent junctions (crosslinking) between individual carbon nanotubes (such as MWCNTs).

Generally, the process is performed under inert atmosphere conditions, such as nitrogen or argon, to prevent significant oxidation or burning of the carbon nanotubes (such as MWCNTs) at elevated temperatures. Also, the material can be put under vacuum environment conditions such as those below <1 torr, and more typically between $10^{-3}$; to $10^{-7}$ torr (or within an ultra high vacuum (UHV) chamber). The samples may be sealed within a quartz vessel under such pressure conditions as well.

In embodiments of the present invention, the heteroatom-doped carbon nanotubes can be chemically functionalized with functional groups before the microwave irradiated procedure.

Moreover, composites thereof may be constructed by such means. For example, embodiments of the present invention, can utilize heteroatom-doped carbon nanotubes (functionalized or unfunctionalized) in combination with one or more of (a) carbon nanotubes doped with the same heteroatom but functionalized with a different substituent, (b) carbon nanotubes doped with other heteroatoms (unfunctionalized or functionalized with the same or different substituent), (c) undoped carbon nanotubes (unfunctionalized or functionalized with the same or different substituent), (d) enhanced heteroatom (such as boron, sulfur etc.) atomic percentage/concentration within the CNT framework by infiltrating additional dopant sources to react and increase/modify the heteroatom-doped carbon nanotubes etc.

By such welding process, the carbon nanotubes in the heteroatom-doped carbon nanotubes are covalently bonded resulted in 3D carbon nanotubes, and generally, macroscale 3D carbon nanotubes.

Characterization of the Heteroatom Doped Carbon Nanotube Material

The process of the present invention yielded gram quantities of heteroatom-doped carbon nanotube material (such as CBxNT material) in the form of macroscopic elastic solids exhibiting fascinating physico-chemical properties including oleophilicity (which can be, for example, used as an efficient oil and solvent removal). For purposed of the present invention, CBxNT materials were characterized.

Figure 1C:
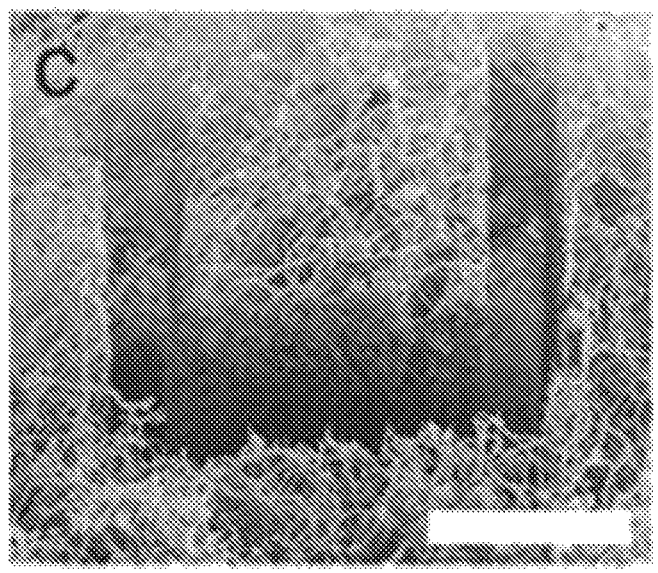
FIG. 1C is an SEM image of an ion beam slice of the macroscale 3D CBxNT material after ion beam slice and view feature showing that the interior porous structure. The scale is 10 μm.
Figure 1D:
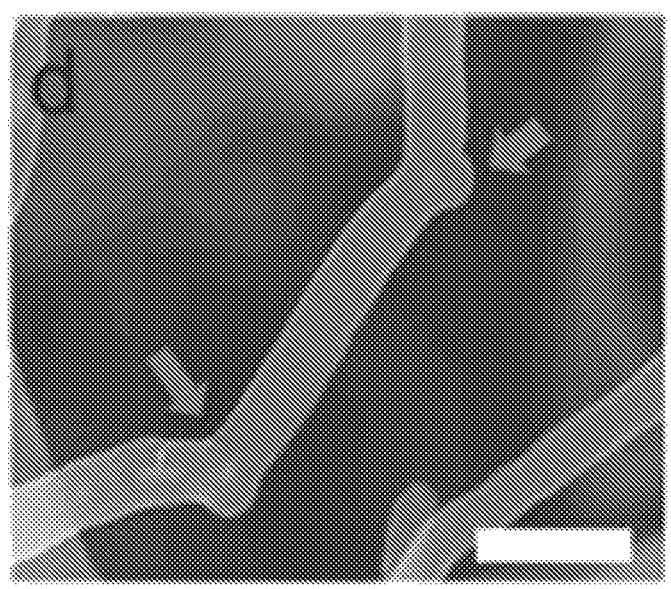
FIG. 1D is an SEM image showing a magnified view of the "elbow" defects found in CBxNTs of the CBxNT material. The scale is 200 μm.
Figure 1E:
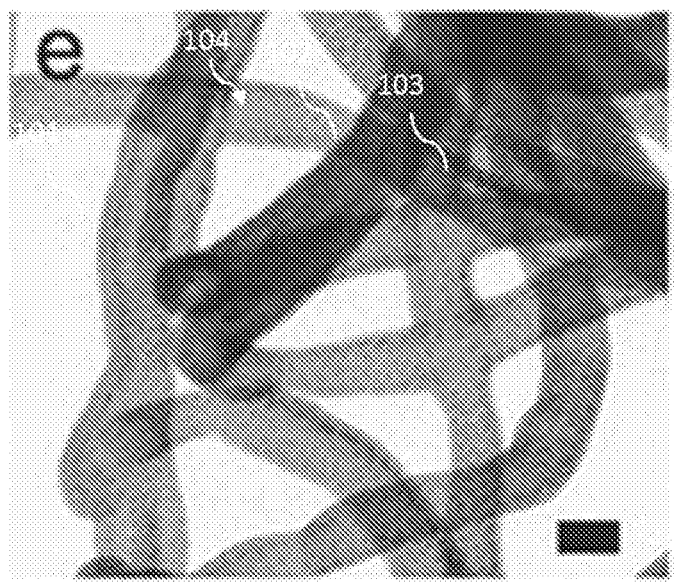
FIG. 1E is an STEM image showing two, four-way covalent nanojunctions in series of the CBxNT material. The scale is 200 μm.
Figure 1F:
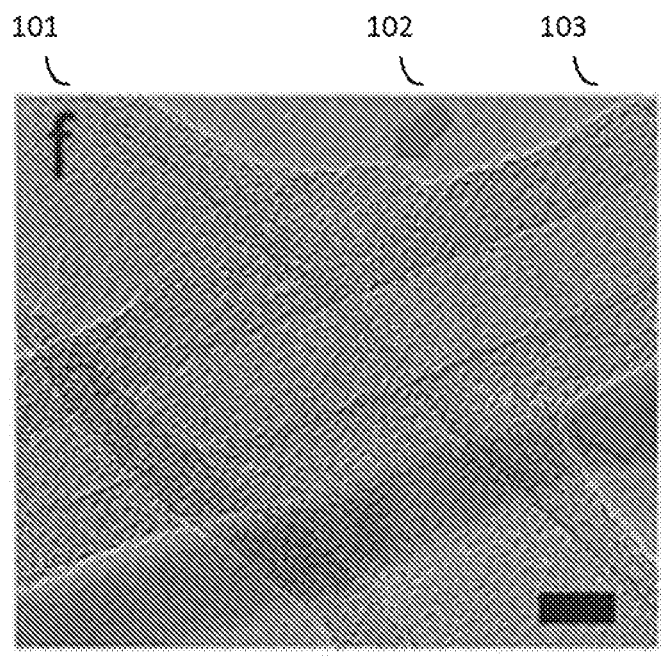
FIG. 1F is a TEM image showing two overlapping CBxNT's (in the CBxNT material) welded together assisted by boron doping. The scale is 10 μm.
Figure 2A:
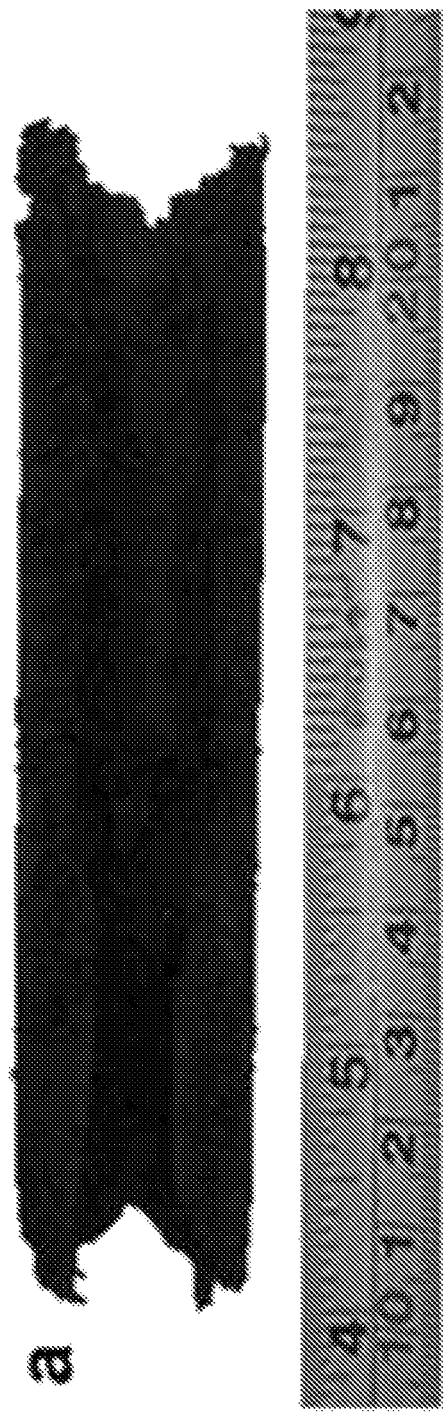
FIG. 2A is a photograph of macroscale 3D CBxNT material taken under sunlight.
Figure 2B:
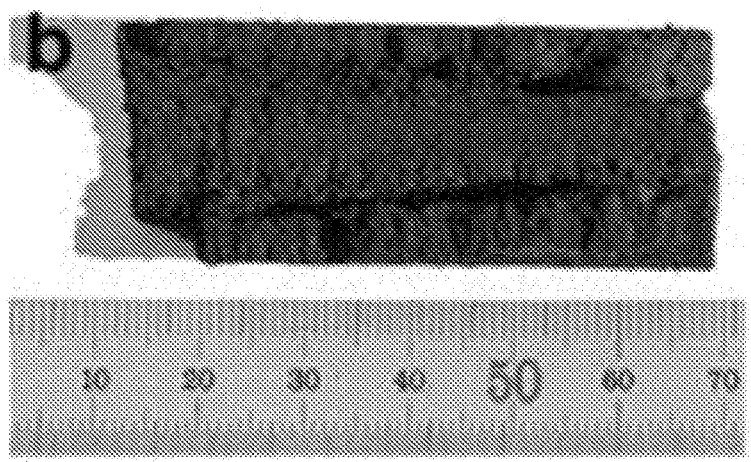
FIG. 2B is another photograph of macroscale 3D CBxNT material taken under sunlight.
Figure 2C:
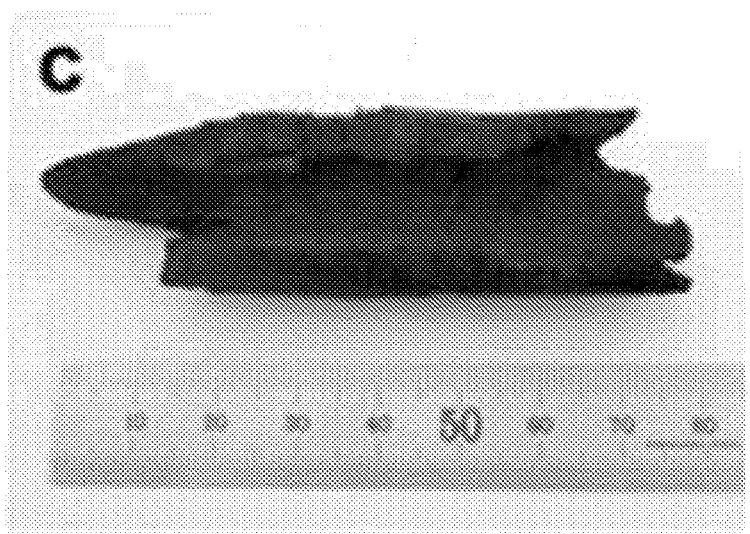
FIG. 2C is a photograph of macroscale 3D CBxNT material taken on the contoured shape of a 1 inch diameter quartz tube in a reaction chamber.
Figure 2D:
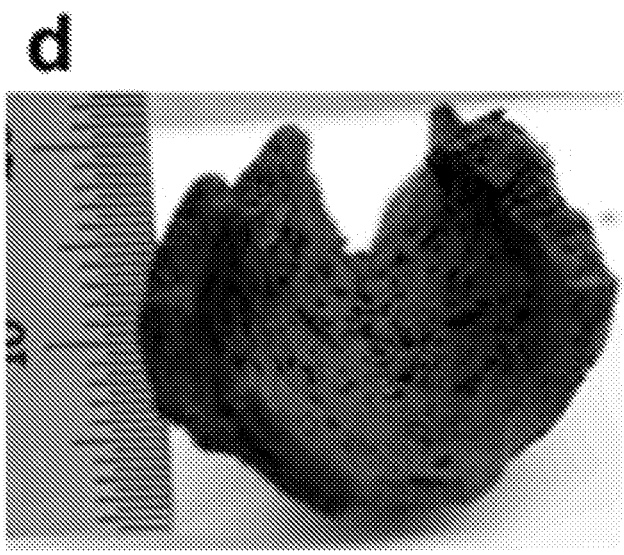
FIG. 2D is another photograph of macroscale 3D CBxNT material taken on the contoured shape of a 1 inch diameter quartz tube in a reaction chamber.
Figure 2E:
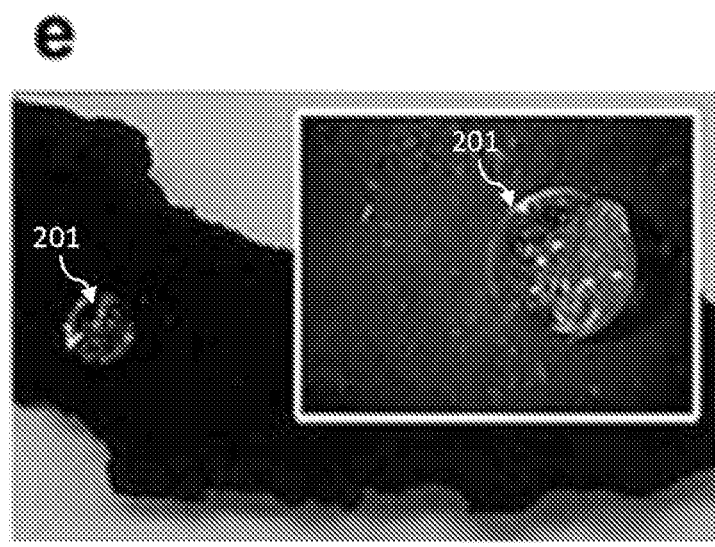
FIG. 2E is a photograph showing a water droplet 201 that beaded-up on contact with the surface of the CBxNT material, which is indicative of the super-hydrophobicity of the CBxNT material.

Remarkably, the bulk densities of the CBxNT material was measured to be in the range of 10-29 mg/cm$^3$ (compared to low density carbon aerogel of 60 mg/cm$^3$) and may be prepared with less than 10 mg/cm$^3$. The morphology and structural properties of the CBxNT material was studied by SEM (FEI-field emission SEM-XL30 operated at 1-15 keV) and TEM/STEM (JEOL 2010 F instrument equipped with a Gatan Enfina energy-loss spectrometer). As measured from SEM images, it was found that the nanotube diameters of the CBxNTs in the CBxNT material generally ranged from 40-150 nm but can also be prepared to have diameters less than 40 nm and sometimes less than 20 nm. The integrity of the 3-D solid CBxNT material was maintained due to the boron induced "elbow" defects—promoting tube entanglement and nanojunctions during synthesis. These defects are shown in FIGS. 1C-1F. FIG. 1C is an ion beam slice and view SEM image showing the interior of the CBxNT material including purely CBxNTs with no trace of amorphous carbon. FIG. 1D is a closer look at the "elbow" defects found in the CBxNT material. FIG. 1E is an STEM image showing two, four-way covalent nanojunctions in series of the CBxNT material. FIG. 1F is a TEM image showing two overlapping CBxNT's welded together assisted by boron doping.

Raman Spectra

Figure 4A:
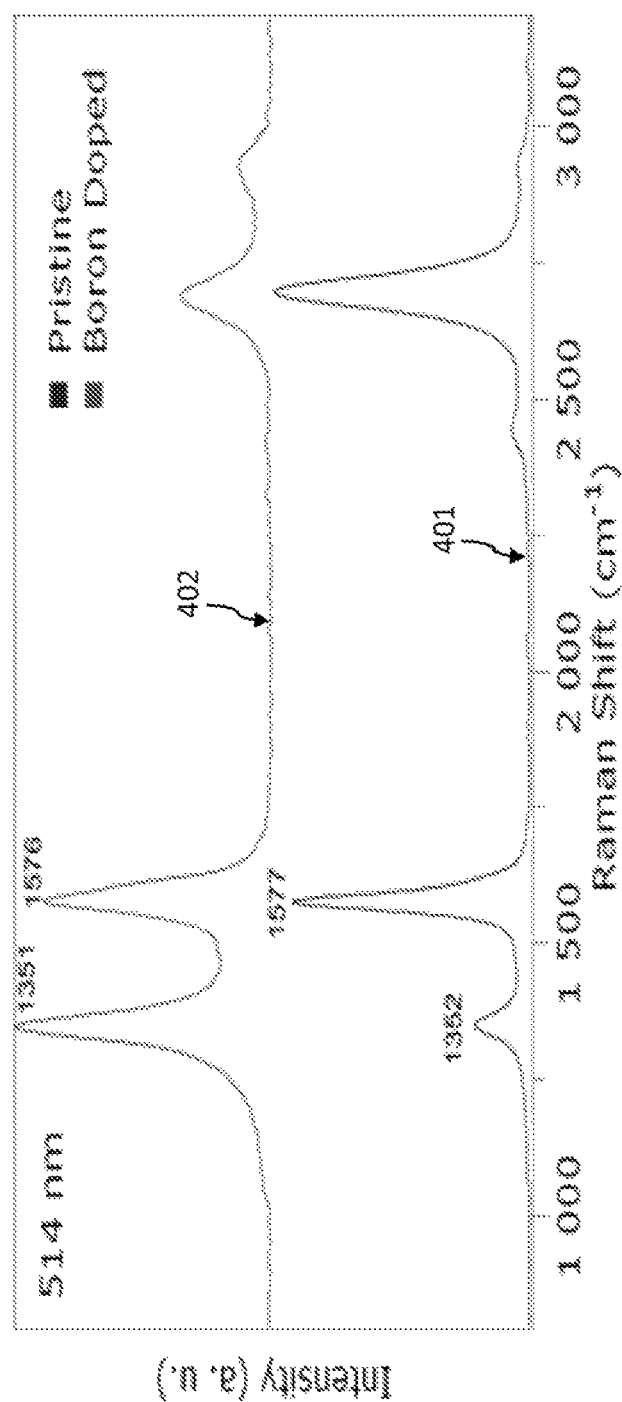
FIG. 4A is a graph showing the Raman spectroscopy comparison of pristine carbon nanotubes (curve 401) with a CBxNT material (curve 402) using a 514 nm wavelength laser.
Figure 4B:
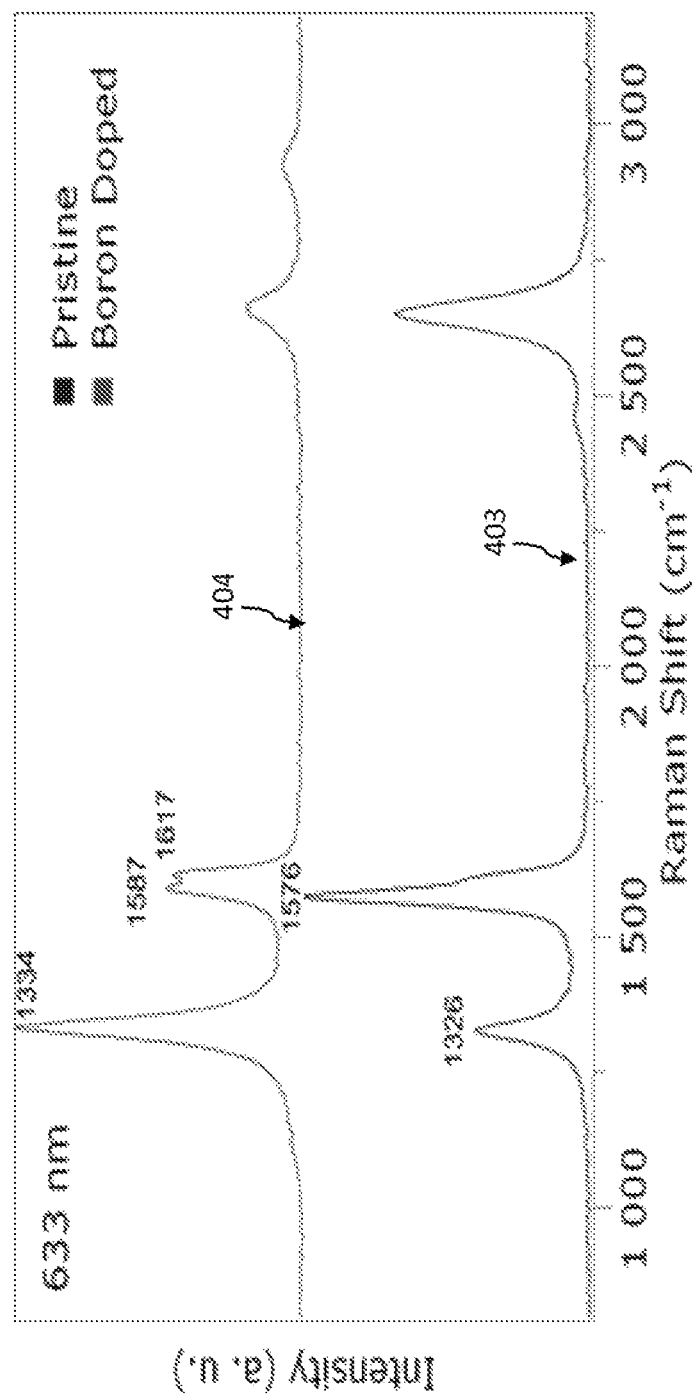
FIG. 4B is a graph showing the Raman spectroscopy comparison of the pristine carbon nanotubes (curve 403) with a CBxNT material (curve 404) using a 633 nm wavelength laser.
Figure 5B:
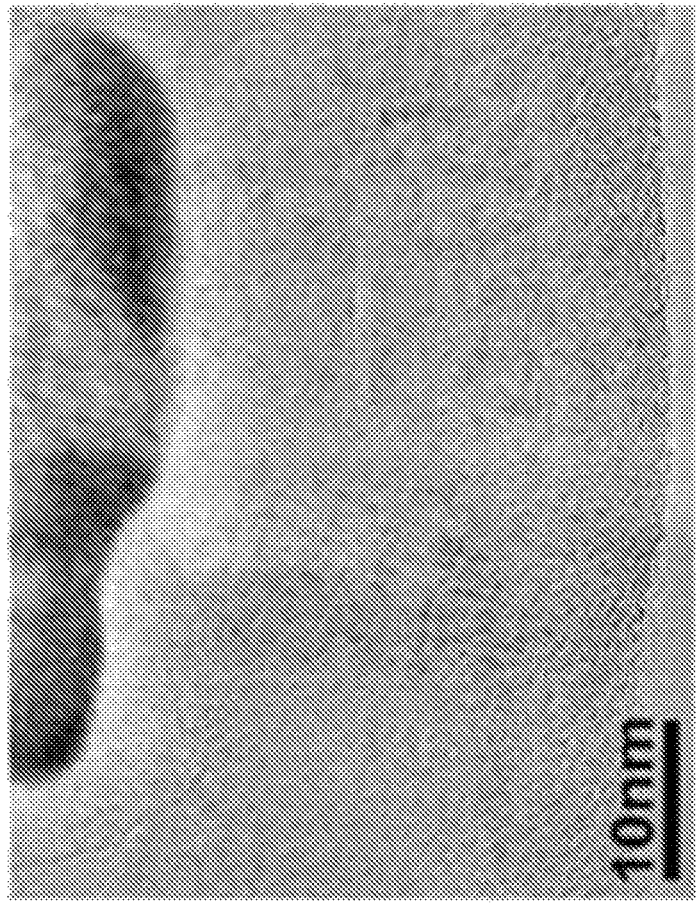
Figure 5A:
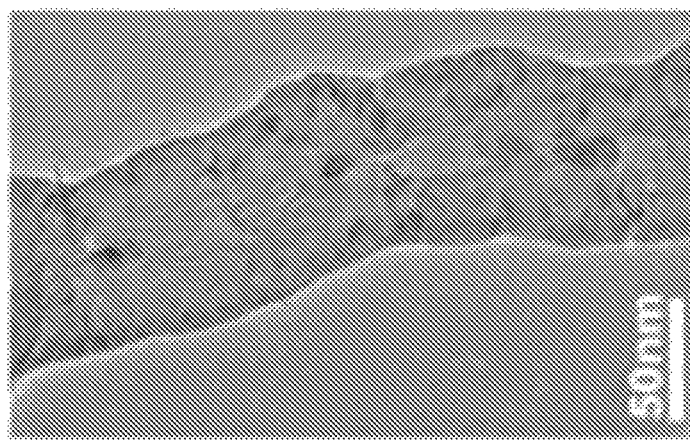
Figure 5D:
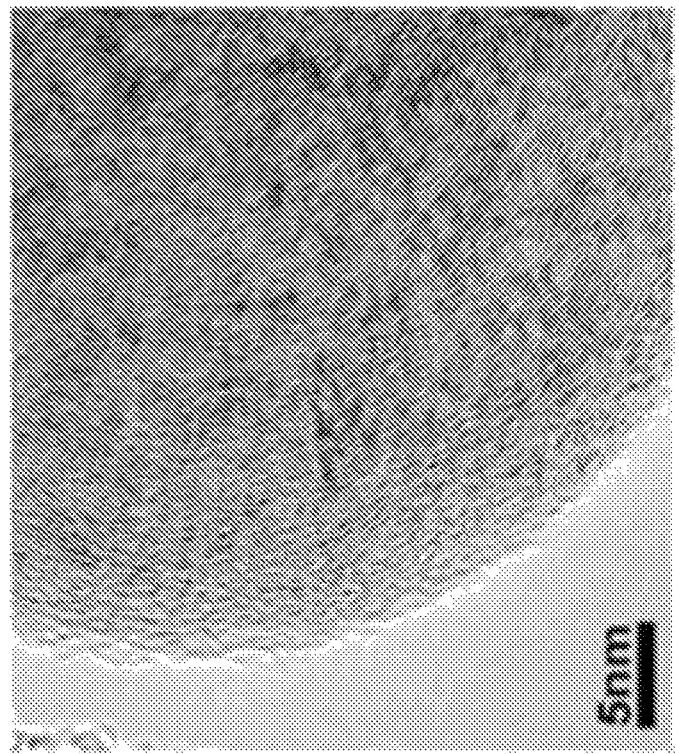
Figure 5C:
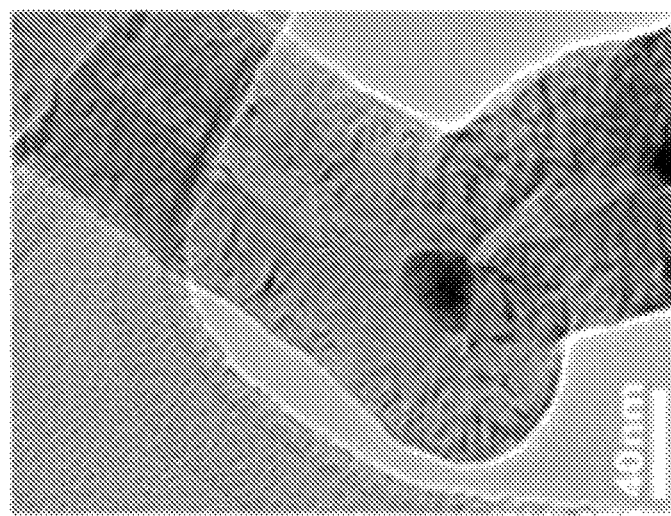
Figure 5F:
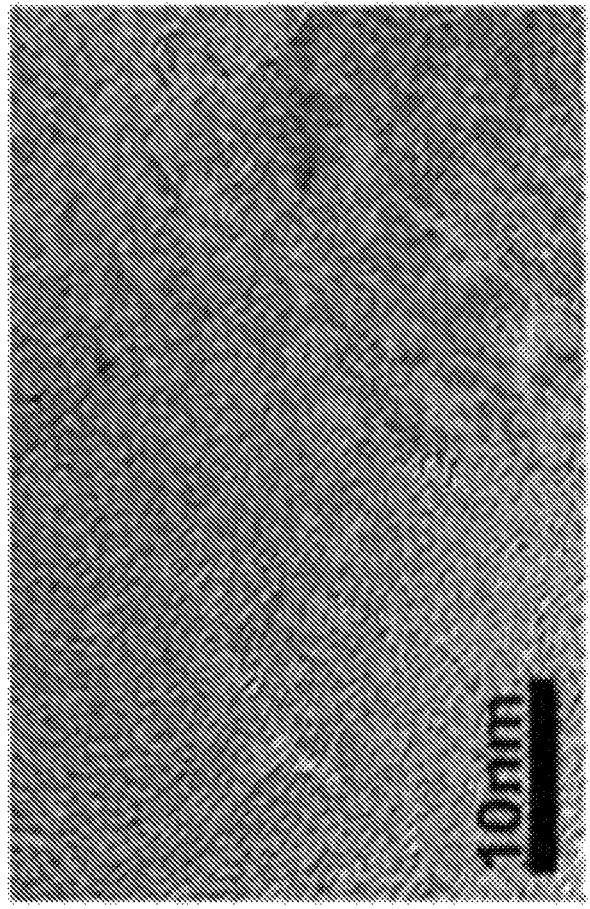
Figure 5E:
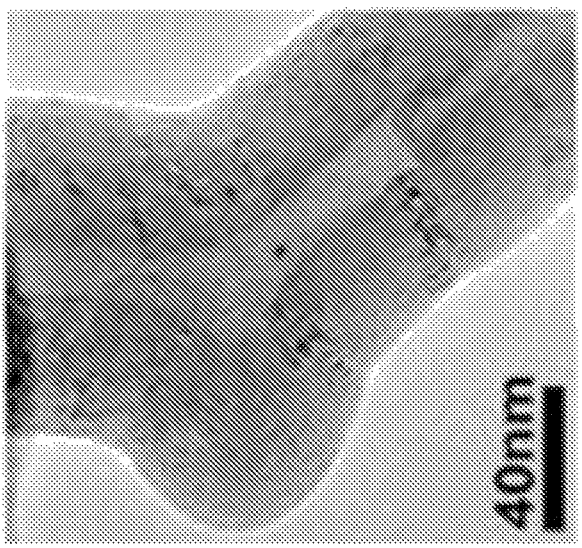
Figure 6A:
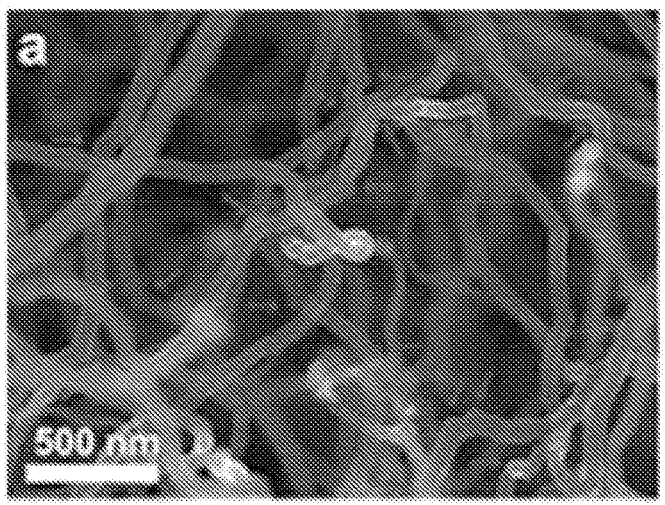
FIGS. 6A-6F are additional SEM images of the elbow nanojunctions (indicated by arrows) found in CBxMWNT's. Inset 601 of FIG. 6B shows a computer generated model of different views of the pentagon-heptagon pair induced by the presence of boron in the nanotube lattice (note the change in chirality of the tubes). Elbow defects occurred continuous and somewhat at periodic distance intervals along the tube length of an individual CBxNT.
Figure 6B:
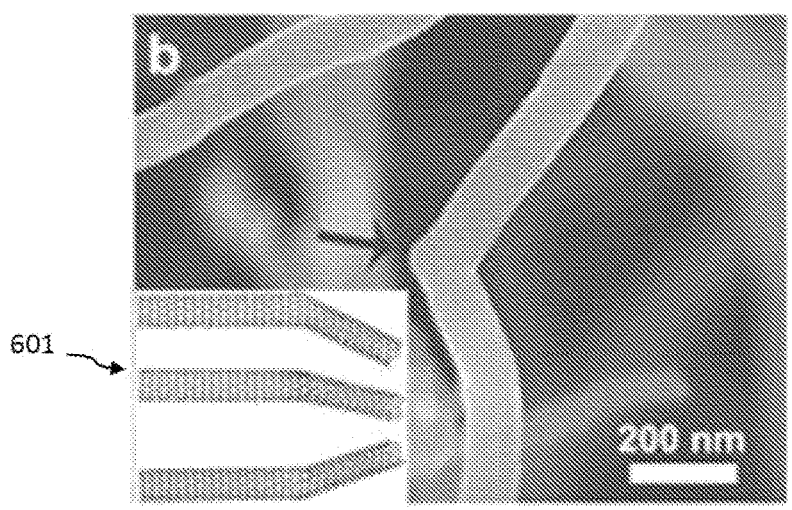
Figure 6C:
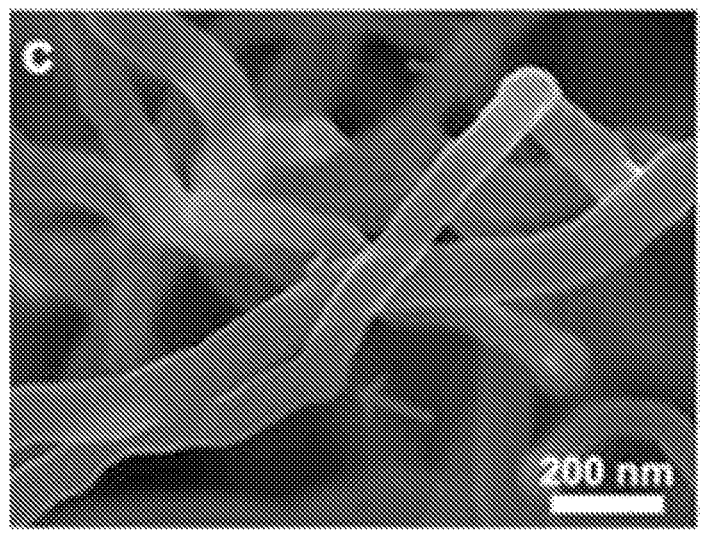
Figure 6D:
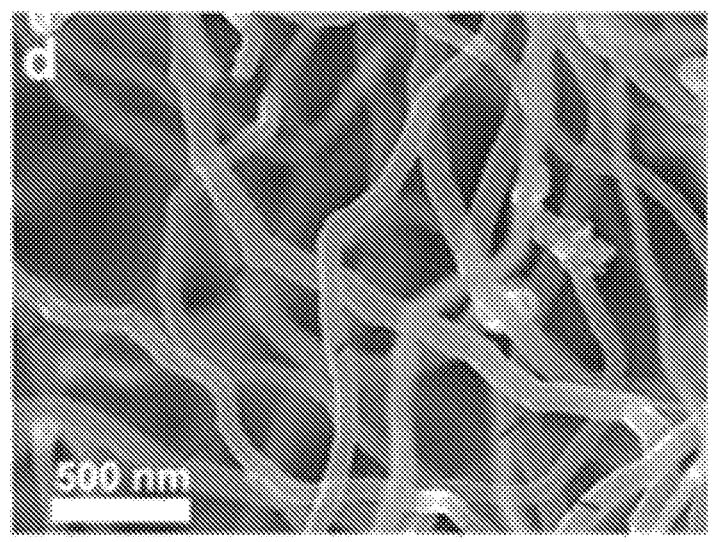
Figure 6E:
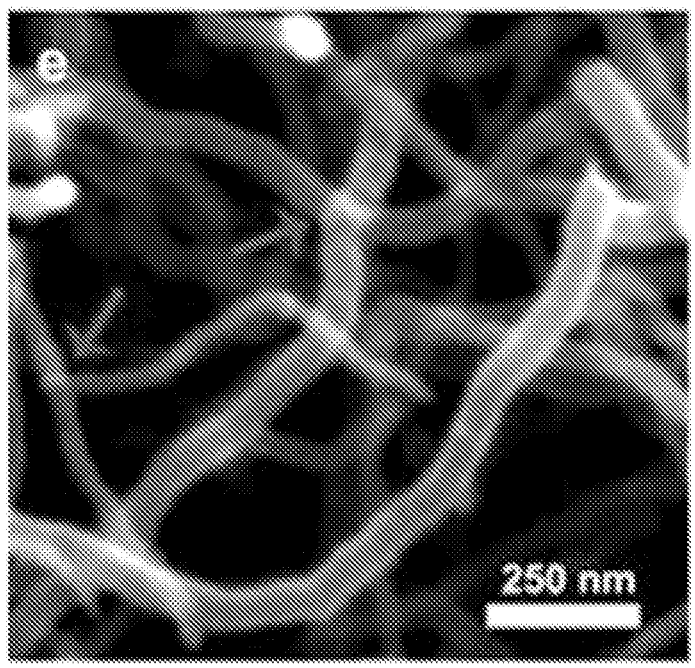
Figure 6F:
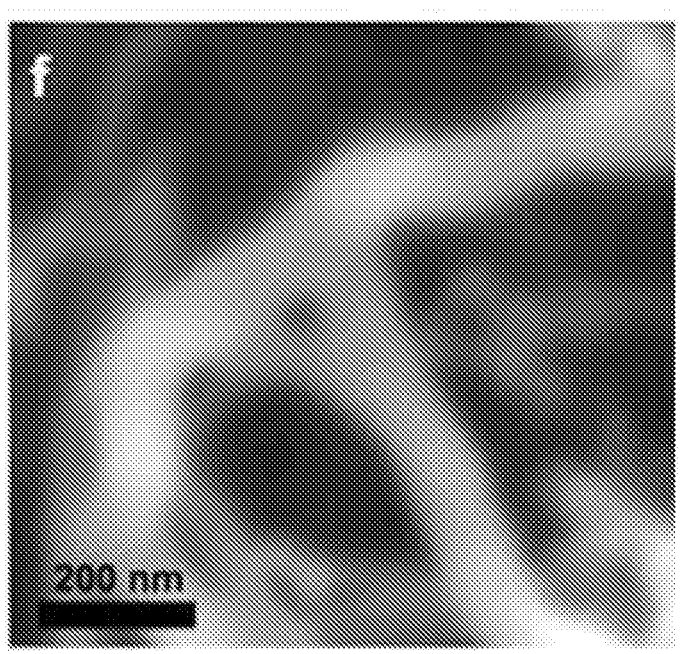

Raman Spectra was used to compare pristine carbon nanotubes with the CBxNT material. The Raman spectroscopy was done using a Renishaw system with laser excitation line λ=514 nm and λ=633 nm. FIGS. 4A-4B are graphs that show the Raman spectroscopy comparison of pristine carbon nanotubes with CBxNT material using the 514 nm and 633 nm wavelength lasers, respectively. These figures evidence that there is a strong D-mode intensity compared to the G-mode intensity, which is believed to be due to the "elbow" defect morphology induced by the boron doping in the hexagonal carbon network.

An intense disorder peak (D-band) (~1300-1360 cm$^{-1}$) compared to the G-peak intensity (~1590 cm$^{-1}$) is seen in the CBxNT material, which would be expected considering the contribution of these substitutional defects induced by the existence of boron in the hexagonal sp$^2$ hybridized network of the CBxNT material. These elbows may be explained by assuming the boron is substitutionally replacing carbon atoms in these regions, favoring the pentagon heptagon pairs to create stable bends (positive and negative curvature) as predicted by theory. [Sumpter 2009]

Figure 9B:
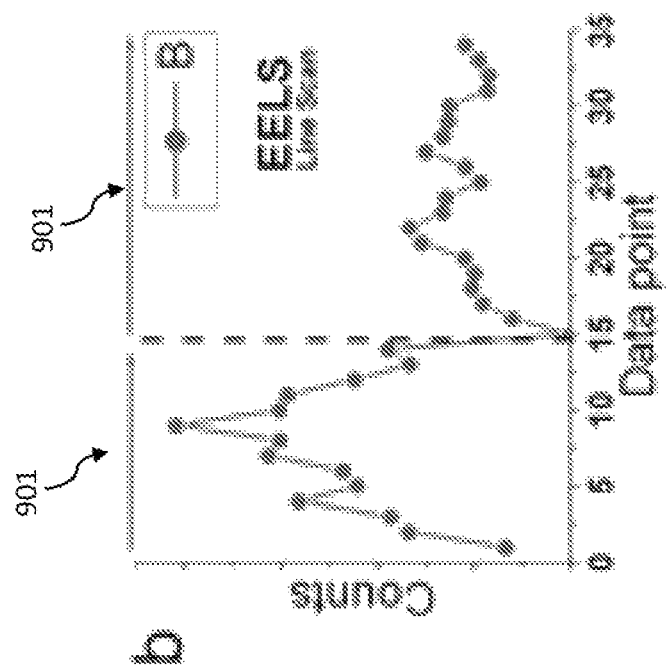
FIGS. 9A-9G are high angle annular dark field (HAADF) images of the CBxNT elbow defects and their corresponding EELS line scans.
Figure 9A:
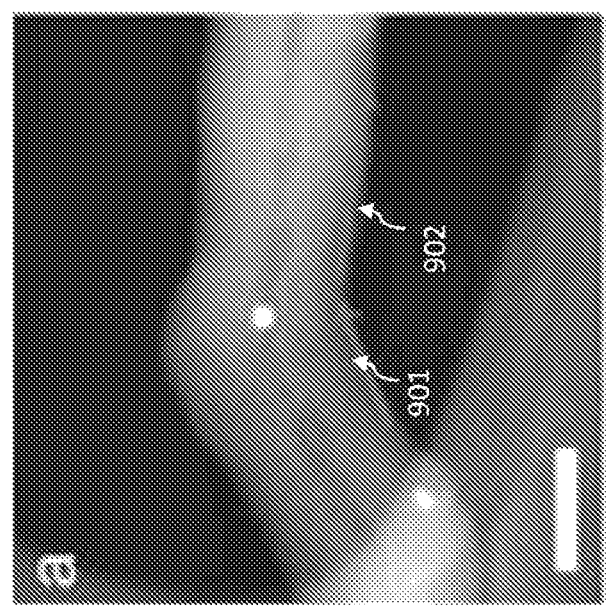
Figure 9D:
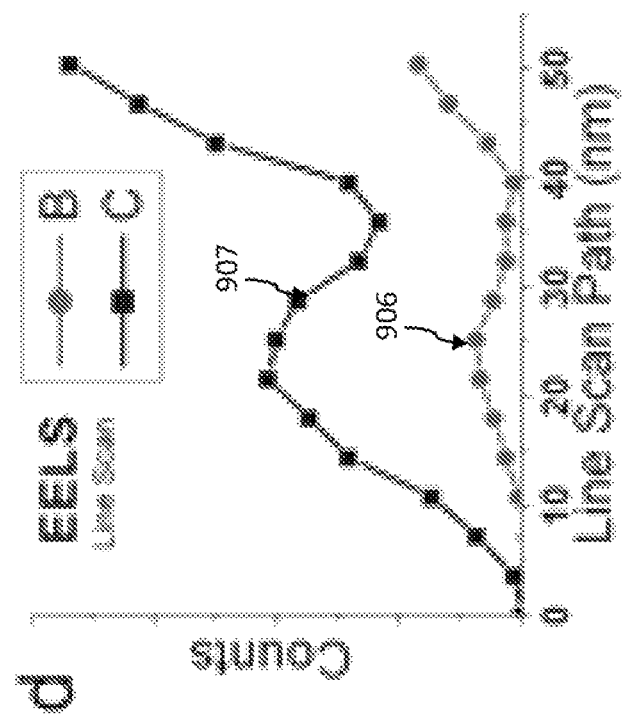
Figure 9C:
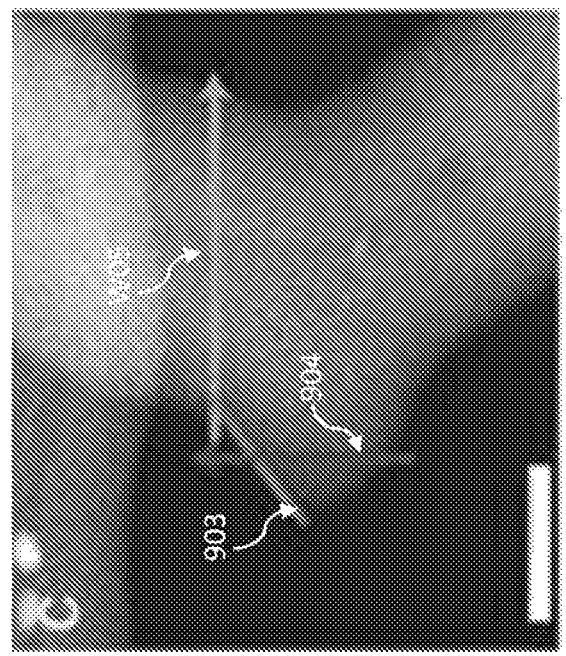
Figure 9F:
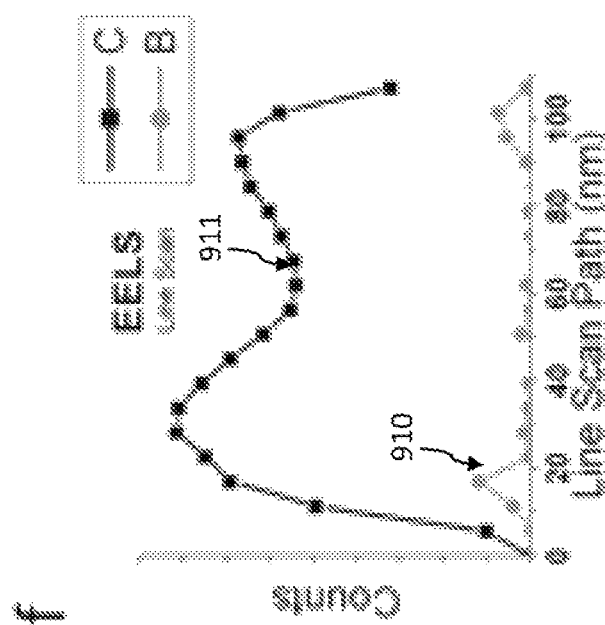
Figure 9E:
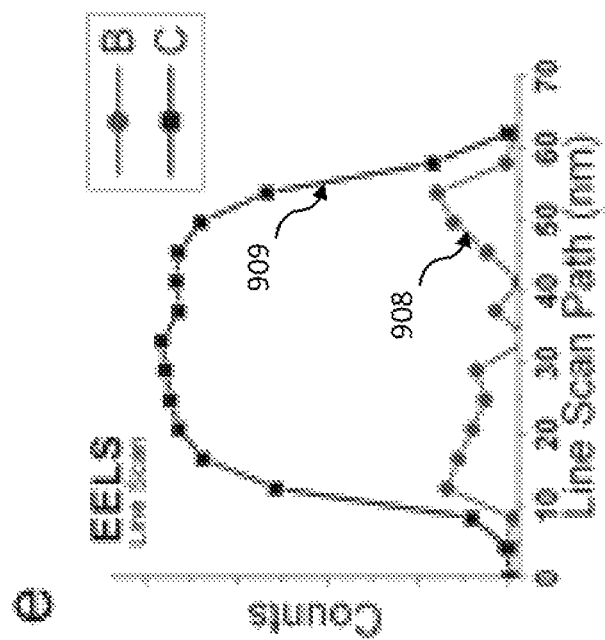

Boron induces atomic-scale "elbow" junctions, as depicted in FIG. 1D and FIGS. 5A-5H, and many other fascinating nanotube morphologies including covalent multi-junctions, such as Y-junctions (FIGS. 6A-6F), and four-way junctions (FIGS. 1E-1F). The most abundant morphologies were the stable "elbow" bends (exhibiting positive and negative curvature) which were found to be continuous and somewhat periodic along the tube length. FIGS. 6A-6F. The porosity could be obtained by recording the N$_2$ gas absorption isotherm using the Brunauer-Emmett-Teller (BET) analysis technique. After performing this test, the results show a type-II adsorption isotherm (FIG. 9A), exhibiting a negligible concave section, which was attributed to microporous volume uptake, and a rapid rise in total volume near P/P$_0$=1; a macroporous material (pore diameters >50 nm). If it is assumed that the density of individual MWCNTs to be around 2.1 g/cm [Stephan 1994; Lehman 2011], any sample with a density <19 mg/cm$^3$ would have a porosity >99% (thus meaning that 99% of the volume is air). The BET surface area measurement further characterizes the material as well. The BET surface area was found to between 103.24 m$^2$/g and 360.42 m$^2$/g. FIGS. 9B-9C.

EELS Mapping of Boron

From these microscopy studies, it was observed that the CBxNT material was entirely made up of CBxNT with little to no amorphous carbon, and several nanojunctions and branches were observed which may also have a role to the structural integrity of the CBxNT materials.

A dramatic increase in the population of elbowed morphologies associated was observed with increasing boron content. The location of boron within the carbon nanotubes was mapped using high-angle annular-dark-field (HAADF) imaging (HAADF) and EELS linescans using a 0.7 nm STEM probe.

Figure 8:
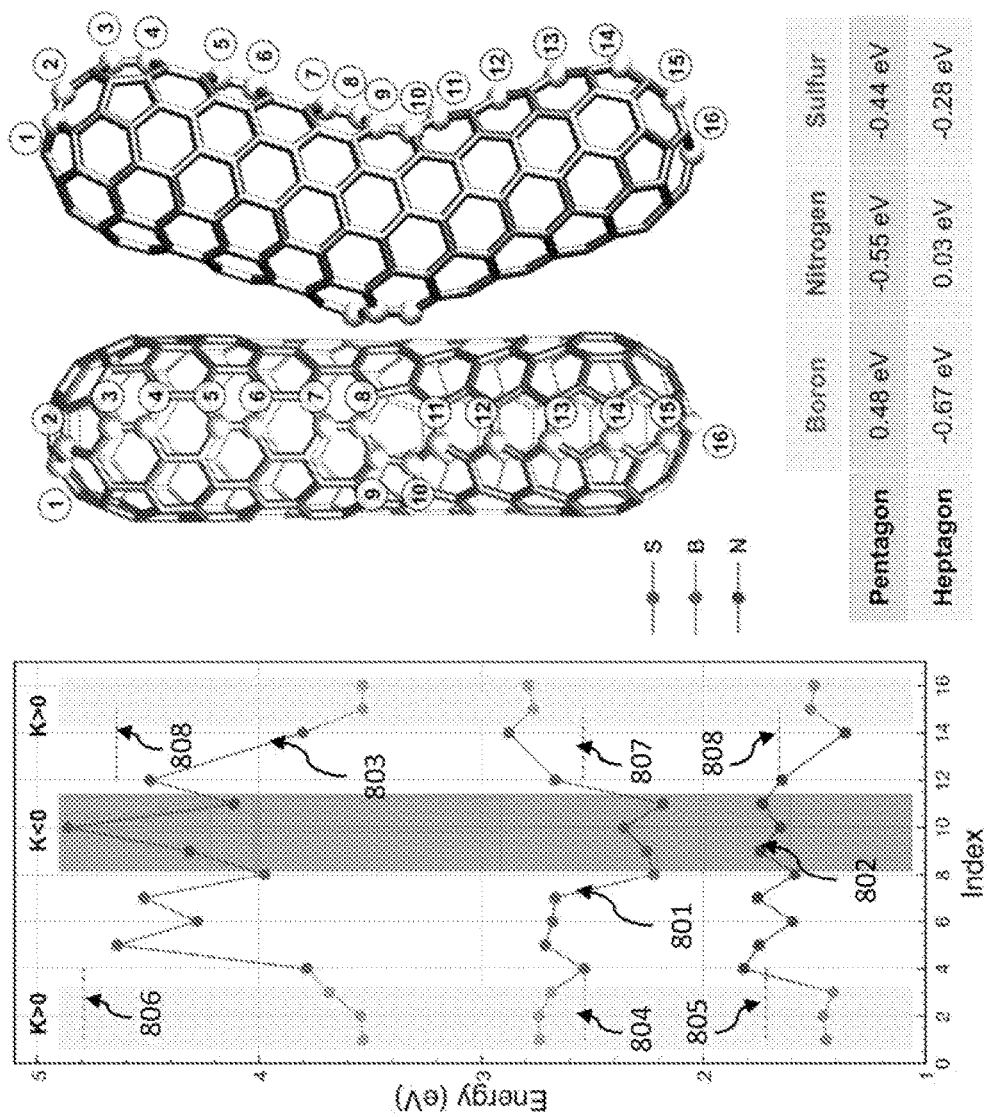
FIG. 8 is the theoretical calculations using Density Functional Theory (DFT) within the GGA/PBE approximation defining stable dopant sites. Relative substitutional energies for B, N, and S dopant for various positions along a (5,5)/(9,0) nanotube knee (boomerang-type structure) as shown in lines 801-803, respectively. The short dashed lines 804-809 correspond to substitutional energy in a straight (9,0) and (5,5) tube, respectively. The table in FIG. 8 shows the energy average over the substitutional sites located at the pentagonal and heptagonal knee position (the energy is relative to that in a periodic (5,5) nanotube). Boron does not promote any type of closure but rather strongly favors structure with a large number of regions exhibiting negative curvature.

The mechanism driving these stable "elbow" formations can be explained by the high stability of boron atoms (or other heteroatoms) on negative Gaussian curvature sites, thus present in rings with more than six carbon atoms (heptagons or octagons). To confirm the effect of boron on negatively curved sites, first principles calculations based on the Density Functional Theory (DFT) were carried out (using a plane wave basis code (VASP) under the GGA/PBE approximation [Kresse 1996; Perdew 1996] to simulate doped "elbow" shape nanostructures. See boomerang-type tube in FIG. 8. A plane-wave basis with a 400 eV energy cut-off was employed, and each structure was relaxed down to 0.001 eV/A for each dopant position. According to these calculations, the substitutional energy, for boron doping the boomerang-type structure, is the lowest at heptagonal rings (negative Gaussian curvature; K<0), whereas nitrogen atoms are favored at the pentagonal sites (positive curvature which causes closure of the structure; K>0). However, sulfur can be accommodated at both, heptagons and pentagons, thus promoting branching of multi-walled carbon nanotubes [Romo-Herrera 2009; Romo-Herrera 2008]. It is therefore clear that the selective preference for negative Gaussian curvature (K<0) of boron, and its influence in inhibiting the formation of pentagons that avoid tube closure (e.g. continuous growth of opened tubes), make boron a dopant able to catalyze the growth of these long, entangled and novel CBxNT materials.

Figure 9G:
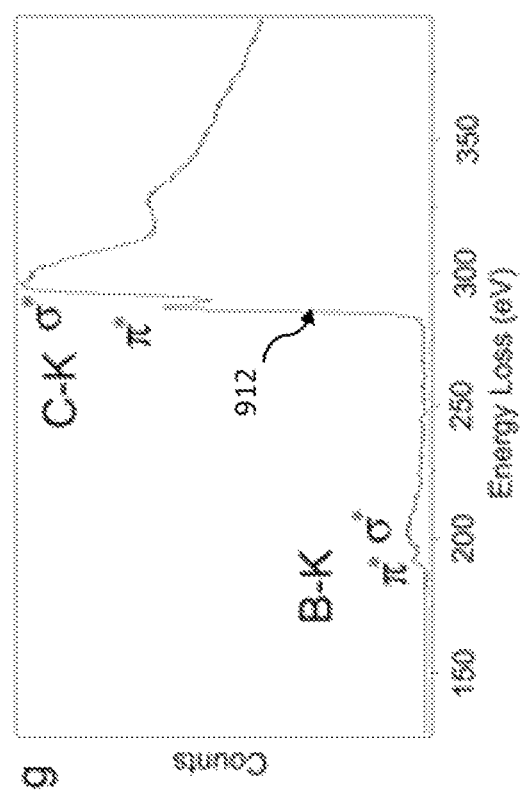
Figure 10B:
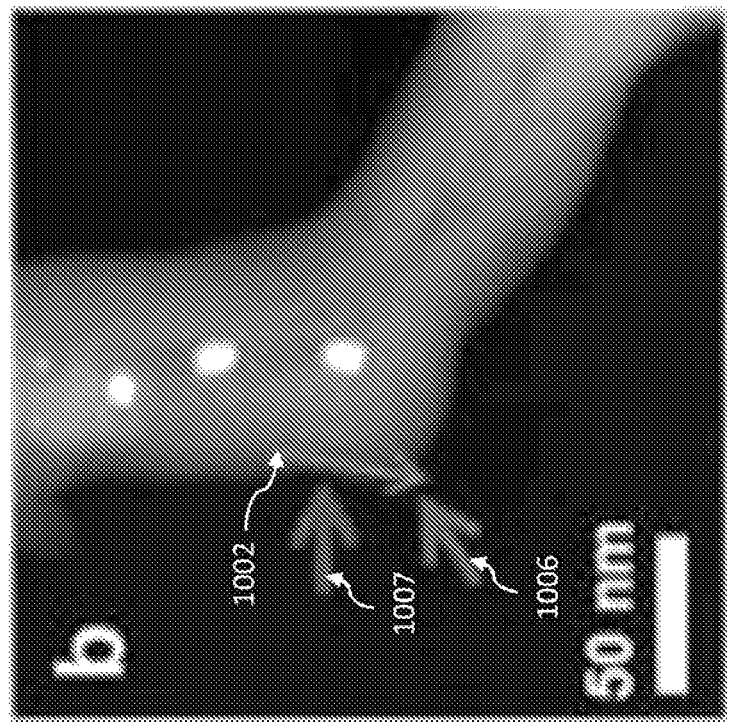
FIGS. 10A-10E are SEM images showing EELS linescans 1001-1005, respectively performed along the positive (arrows 1006) and negative (arrows 1007) curvature regions on the "elbow" defect side.
Figure 10A:
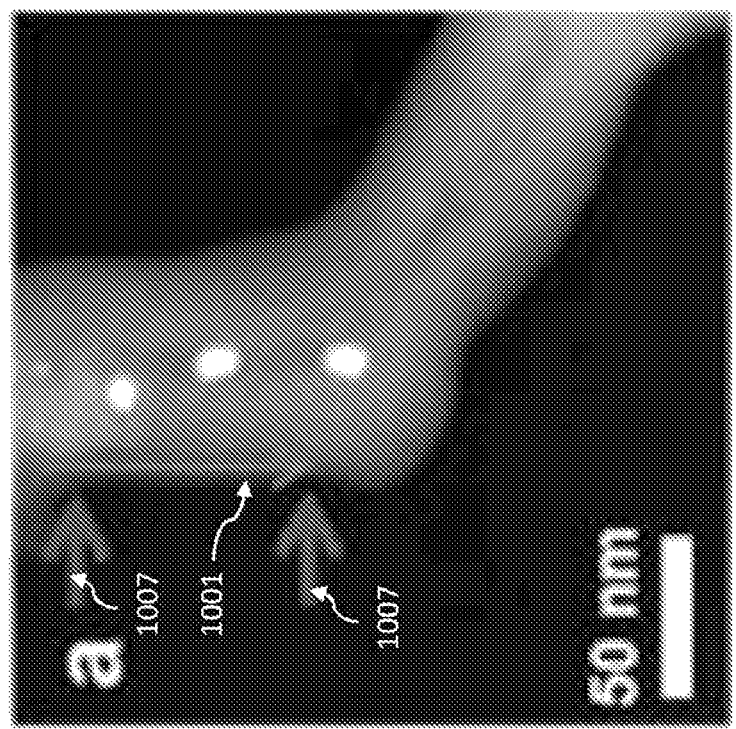
Figure 10D:
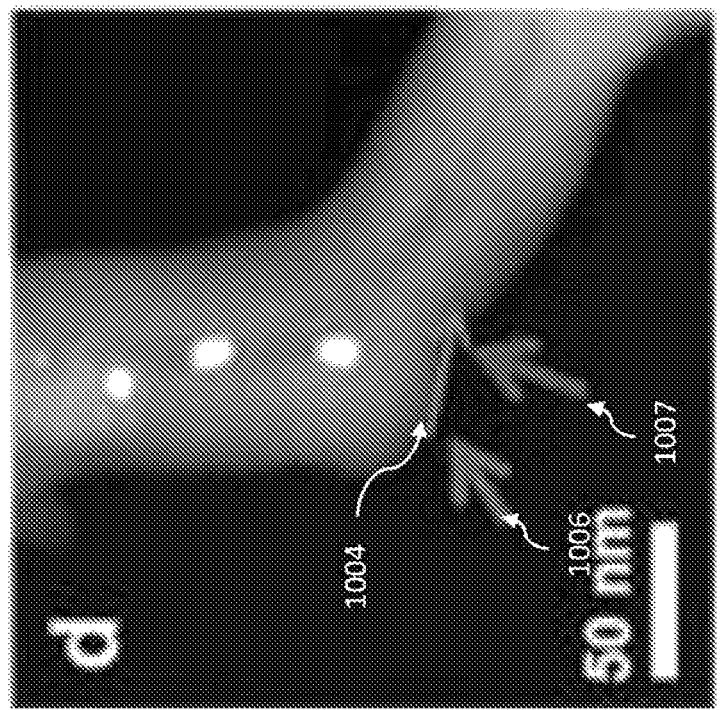
Figure 10C:
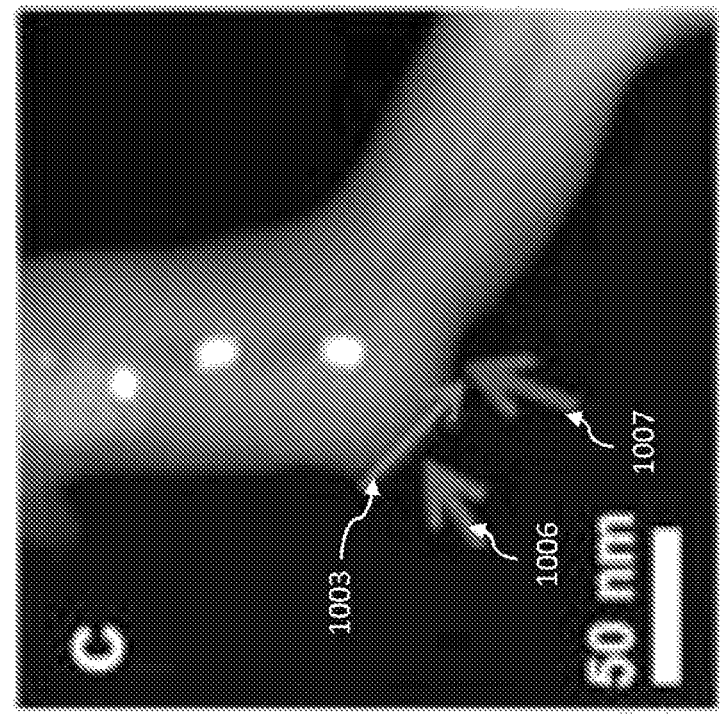
Figure 10E:
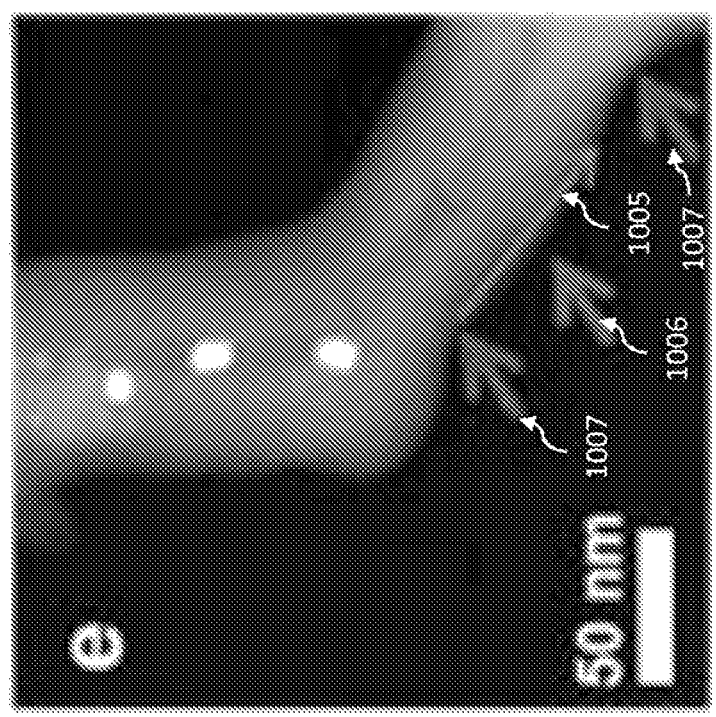
Figure 10F:
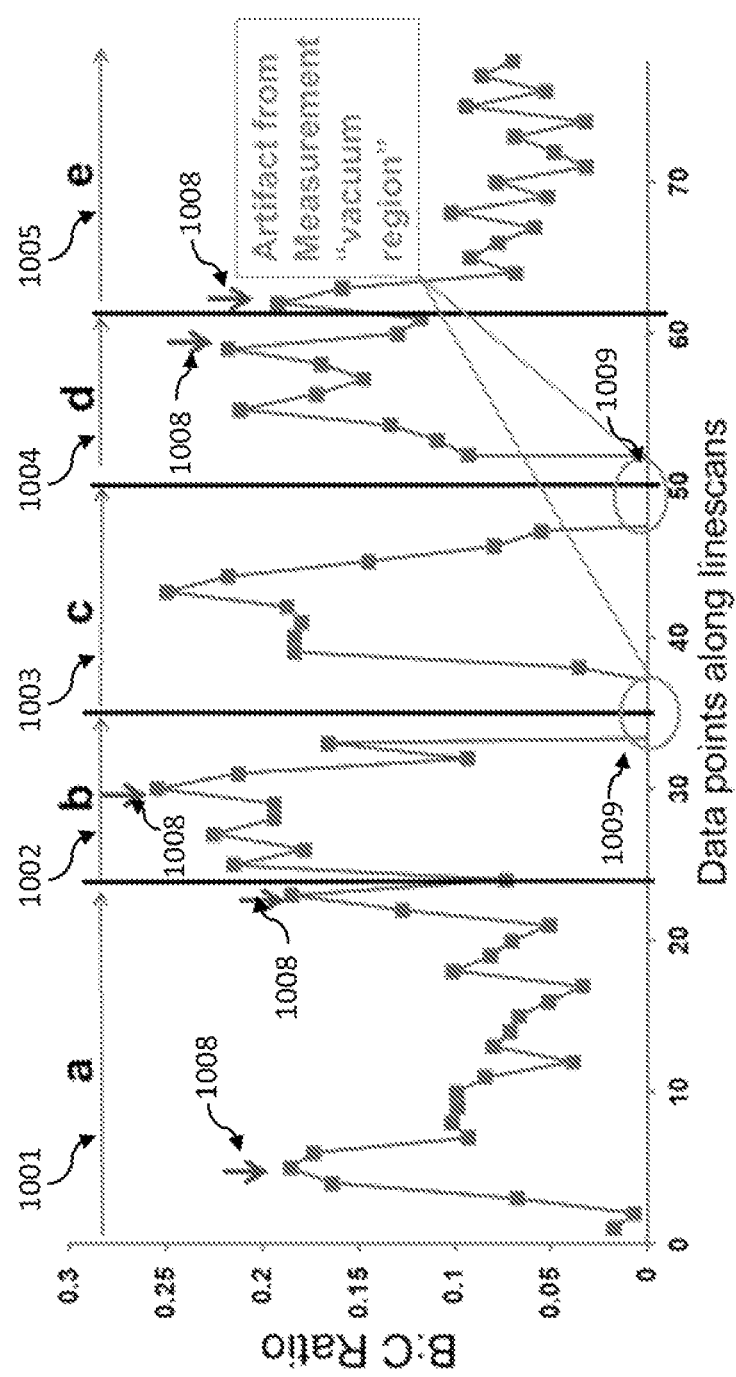
FIG. 10F is a graph that shows the corresponding B:C ratio from the EELS linescans 1001-1005 (of FIGS. 10A-10E, respectively).
Figure 10G:
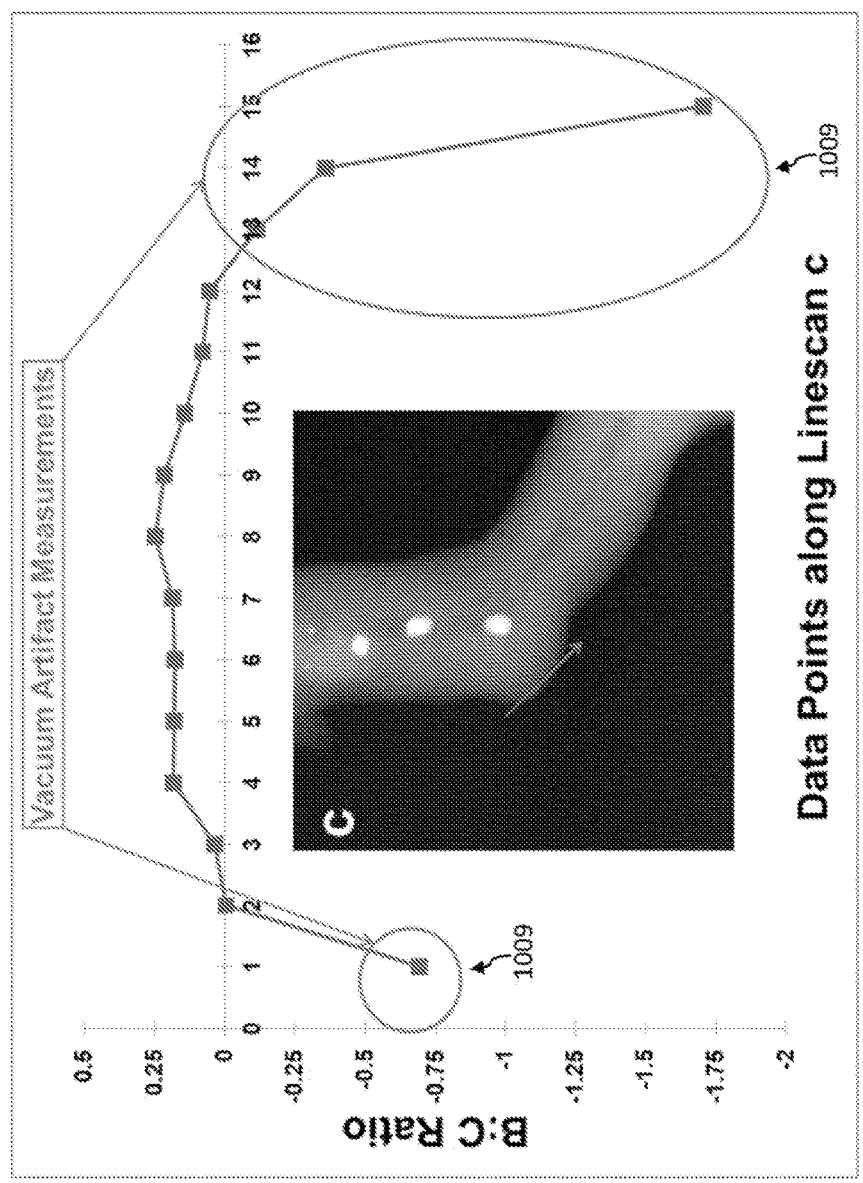
FIG. 10G is the portion of FIG. 10F that corresponds to linescale 1003. Arrows 1008 point to the peaks near the negative curvature regions surrounding the positive curvature regions along the "elbow" bend. The circles 1009 indicate where the linescans extend into the "vacuum region" representing artifacts from the measurement.

The location of boron within the CNTs was experimentally mapped using high-angle annular-dark-field (HAADF) imaging and electron energy loss spectroscopy (EELS) line-scans using a 0.7 nm STEM probe. Line-scans were recorded along the edges of the tube in the region of the "elbow" defects. FIGS. 9A-9G. The regions of highest boron (B) concentration were found to be at the location of the "elbows," supporting that boron played a key role in the formation of negative curvature areas inducing the formation of "elbow" junctions. As shown in FIGS. 9A-9B, linescans across the tube diameter failed to reveal the presence of boron within the inner tube or catalyst particles, thus confirming that the B atoms were incorporated mostly within the walls of the CNTs. As shown in FIGS. 9C-9F, this trend was also observed in other line scans. In FIG. 9G, the EELS survey spectrum, including the characteristic B K-shell peaks and C K-shell peaks (in curve 912), further confirmed the presence of B atoms being at concentrations well within the EELS detection limit.

Additional EELS linescans made along localized regions of high positive and negative curvature (FIGS. 10A-10G) both show boron signals as compared to the artifact measurements from the "vacuum region." As shown in FIG. 9G, the C K-edge shows maximum peaks at 287.2 and 295.4 eV which correspond to the 1s $\pi^*$ and 1s $\sigma^*$ resonance respectively. Meanwhile, the B K-edge shows maximum peaks at 193.2 and 202 eV corresponding to the 1s $\pi^*$ and 1s $\sigma^*$ resonance respectively. The 1s $\pi^*$ resonance is indicative of $sp^2$ hybridization, which indicates that boron is bonded to carbon within the carbon nanotube lattice.

XPS

Figure 11:
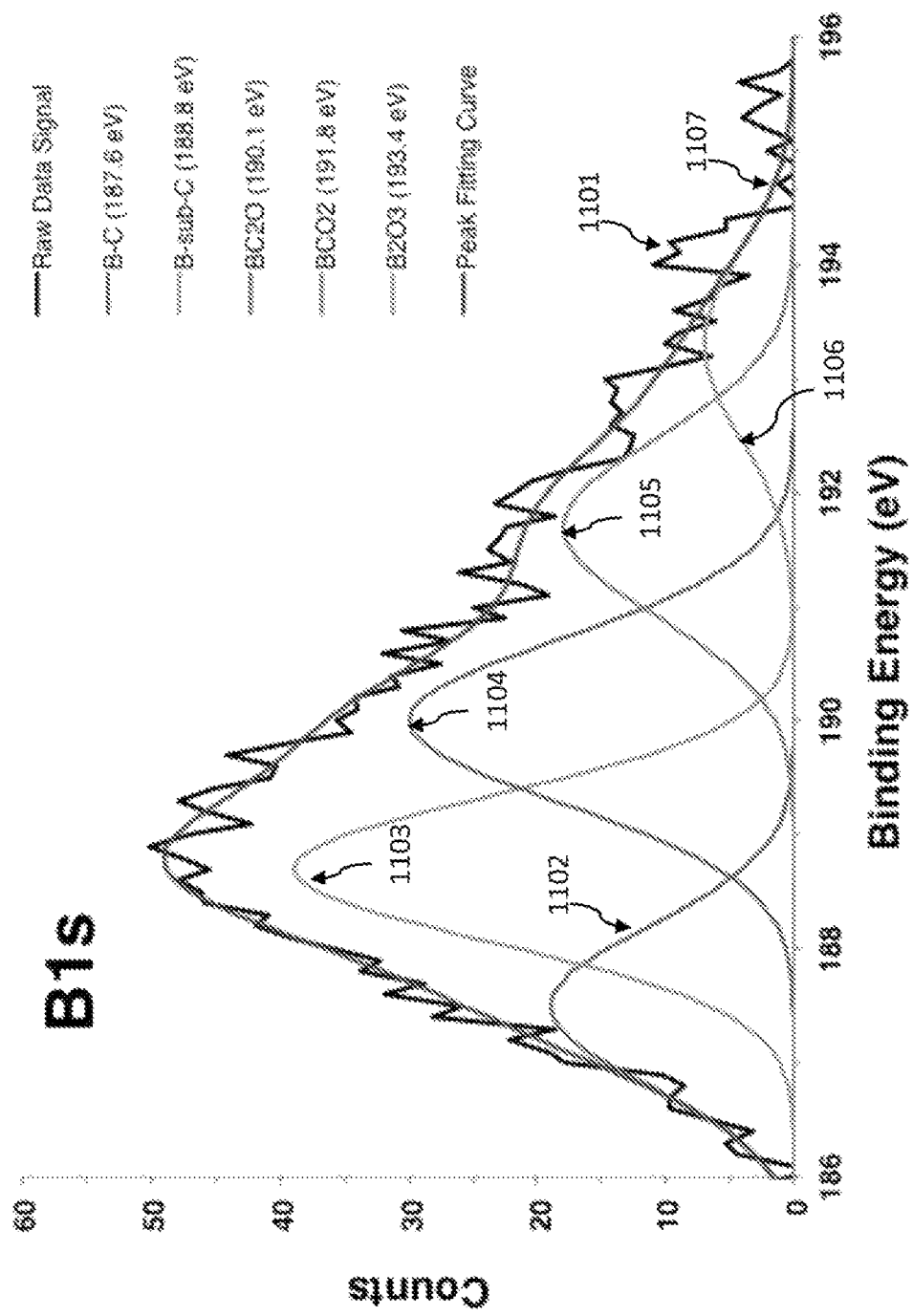
FIG. 11 is a graph showing XPS characterizing boron bonding states and content. Curve 1101 is the raw data signal. Curves 1102-1106 are deconvoluted B1s bonding states, after argon ion-etch, at peak positions 187.6, 188.8, 190.1, 191.8, and 193.4 eV, respectively, corresponding to the B—C bonding in B$_4$C (187.8 eV), B-substituted-C within the hexagonal lattice (188.8 eV), BC$_2$O (190.0 eV), BCO$_2$ (192.0 eV), and B$_2$O$_3$ (193.2 eV). The majority bonding state is B-substituted-C and BC$_2$O on the CBxM-WNT surface, and the boron content is ca. 0.7 at %. Curve 1107 is the peak fitting curve.

Furthermore, it is well known that boron-doped CNTs enhance their oxidation resistance. [Perdew 1996; Yang 2011]. For this reason, the EELS elemental survey data (FIG. 9D) shows higher energy boron bonding states to be dominant, thus indicating the accumulation of the glassy boron oxide layer coating the CNTs surface. [Yang 2011][30] The XP spectrum revealed five underlying B1s bonding states located at peak positions 187.6, 188.8, 190.1, 191.9, and 193.4 eV as marked as peaks in FIG. 11. The lower energy peaks are associated with the B—C bonding, such as that in $B_4C$ (187.8 eV), and B-substituted-C (188.8 eV) within the graphite crystal structure as proposed by Cermignani 1995 and reported by others [Wu 2005; Liu 2009; Jacobsohn 2004; Shirasaki 2000; Burgess 2008]. The higher energy components represent the more oxidized species corresponding to $BC_2O$ (190.0 eV), $BCO_2$ (192.0 eV), and $B_2O_3$ (193.2 eV) respectively. It was found that the main bonding state of boron in the sponges, consist of $sp^2$ hybridization of B-substituted-C, which supports theoretical calculations. Quantitative elemental analysis of the boron content in this structure was revealed to be ca. 0.7 at %.

For the XPS characterization, the chemical bonding states and atomic quantification of boron content within the CBxNT solids were studied using a Phi Quantera instrument equipped with monochromatic Al (K–$\alpha$) 1486.6 eV X-ray source at 50 W and a 200-μm-beam diameter. Argon ion-etch pre-treatment was performed for 2 minutes using a 3 kV beam and target emission current at 7 mA. Survey scans were performed at 140 eV pass energy, and C1s and B1s elemental scans at 55 eV pass energy with 0.10 eV steps. Data analysis software was used for the peak fitting using Guassian functions and a linear baseline. All peaks were generated having FWHM limited to <2.0 eV. Our fits provided values of chi-squared=8.127 and $R^2$=0.978. Before fitting, the background was subtracted using the software and the peaks were calibrated to the C1s peak located at 184.6 eV for graphitic carbon.

Dynamic Mechanical Analysis (DMA)

Figure 12A:
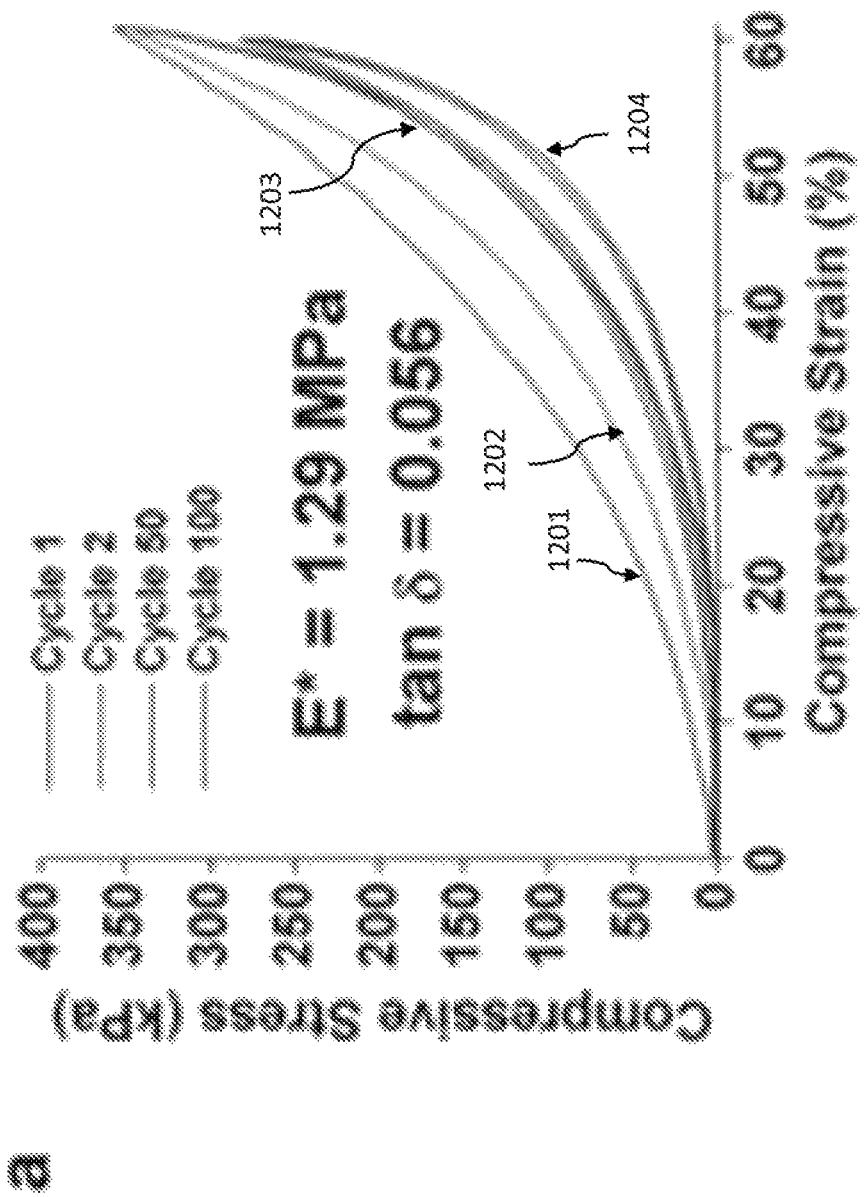
FIG. 12A is a graph of stress-strain curves 1201-1204 at 60% at 0.5 Hz and room temperature for cycles of 1, 2, 50, and 100, respectively, on a sample of CBxNT material with density ~27 mg/cm3.
Figure 12B:
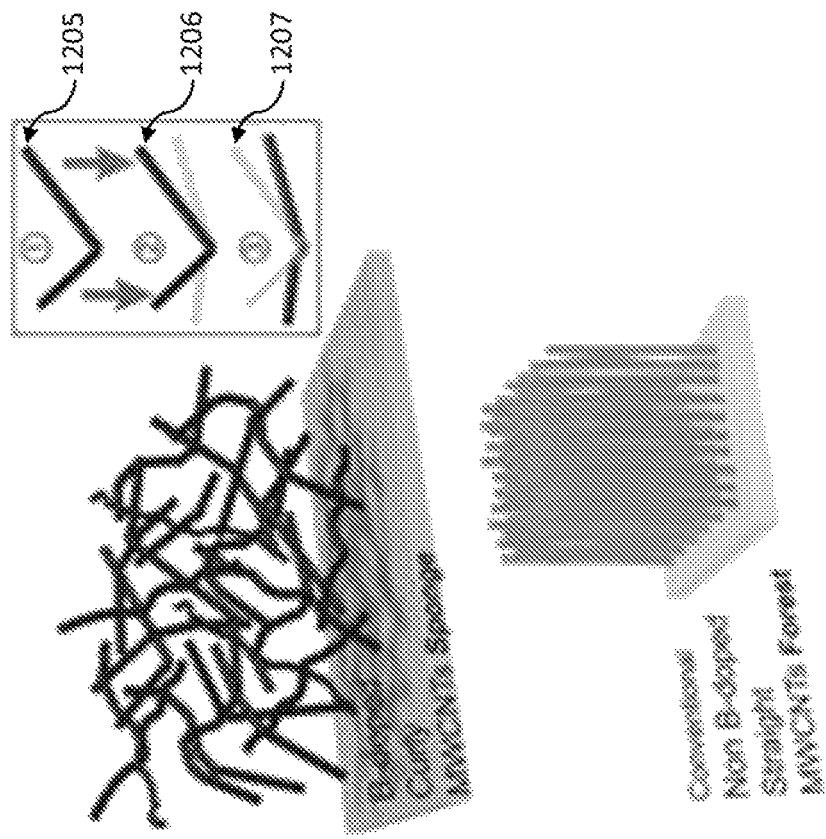
FIG. 12B is a computer graphics model that shows the entangled random network as compared to conventional CNT arrays. The elbow defects aid in recovery via springback loading mode, shown in steps 1205-1207, to overcome the van der Waal 'sticking' force of contacting tubes upon compression which give rise energy dissipation and high tan δ values.
Figure 12C:
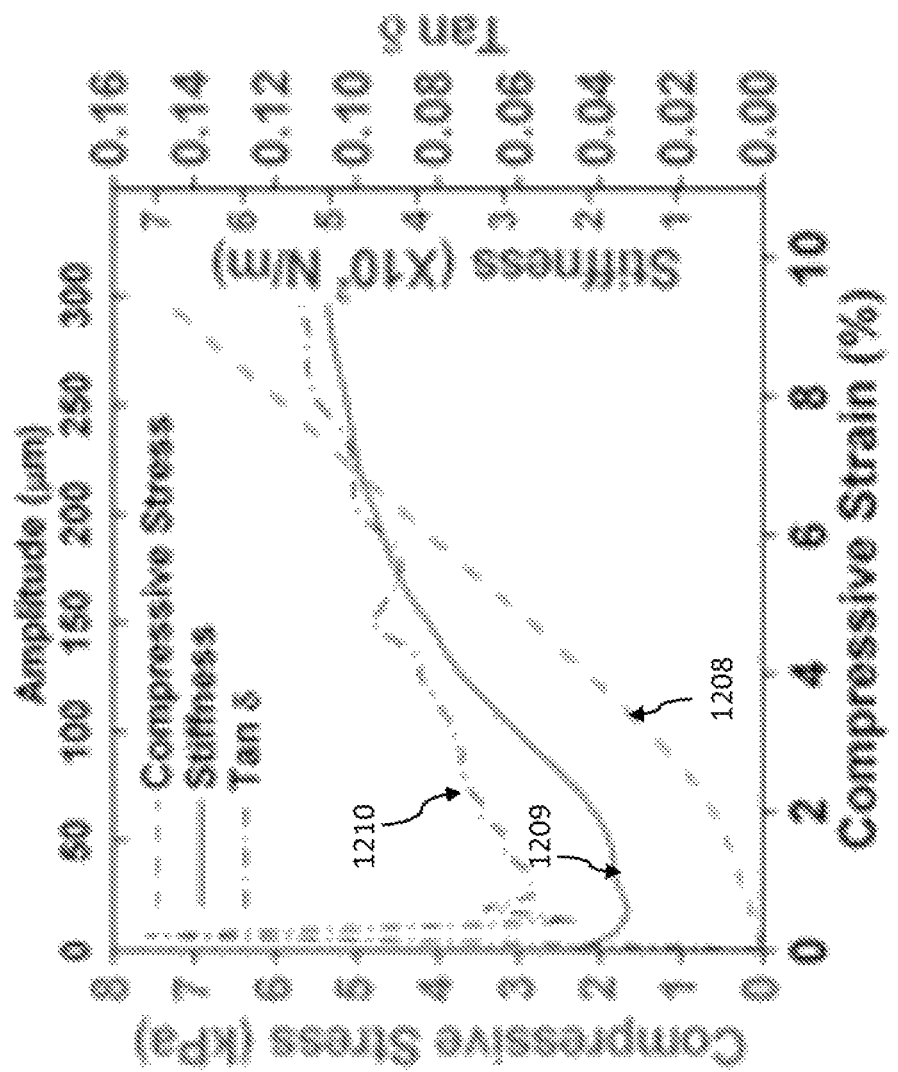
FIG. 12C is a graph showing the results of a dynamic mechanical analysis (DMA) on a CBxNT material (with density≈25 mg/cm) using multi-strain mode at 1 Hz for 250 cycles. Curves 1208-1210 correspond to the compressive strength, stiffness, and tan δ, respectively.

In addition to the formation of the 3D structure, the CBxNT materials exhibited robust flexibility (FIGS. 1A-1B and SA-SE) and good isotropic elastic mechanical behavior. Dynamic mechanical tests were performed on CBxNT material samples using an Intstron Electropuls E3000 instrument and Wavematrix software. As shown in FIG. 12A, at 60% compressive strain the complex modulus is E*=1.26 MPa and tan $\delta$=0.058. The high tan $\delta$ value (ratio of the loss modulus E", to storage modulus E') was indicative of the materials high energy absorption and rubber-like damping capability. Due to the randomly orientated entangled CNT network, isotropic behavior was not surprising as compared to conventional anisotropic MWCNT aligned arrays as depicted in the model drawing of FIG. 12B. Only 18% plastic strain deformation was observed after dynamic compression of 100 cycles at 60% strain. Further dynamic mechanical analysis (DMA) gave tan $\delta \approx 0.11$ at ~9% strain (FIG. 12C) in a multi-strain (ramp strain) test mode. At a dynamic strain of 10% over 11,000 cycles (FIG. 12D), a gradual increase in damping was observed, from tan $\delta \approx 0.11$ to tan $\delta \approx 0.13$, along with increasing stiffness and stress levels.

For the lower, strain amplitude tests at ~9% strain, TA instruments DMA model Q800 was used. Tan $\delta$ values (the ratio of loss modulus, E", to storage modulus, E') and sample stiffness data were measured from a sponge block with density 25 mg/cm$^3$ and size: 2.4015 mm×11.2167 mm$^2$ under compression tests in multi-strain mode with amplitudes ranging 0-300 μm (corresponding to strains up to ~9%) at a frequency of 1 Hz and 0.01 N preload force. A total of 50 data points were collected from 250 cycles to make the plot of FIG. 12C, with each sequential cycle and data point having a linear increase in strain amplitude from 0-300 μm (corresponding to strains of 0-9%).

Figure 12D:
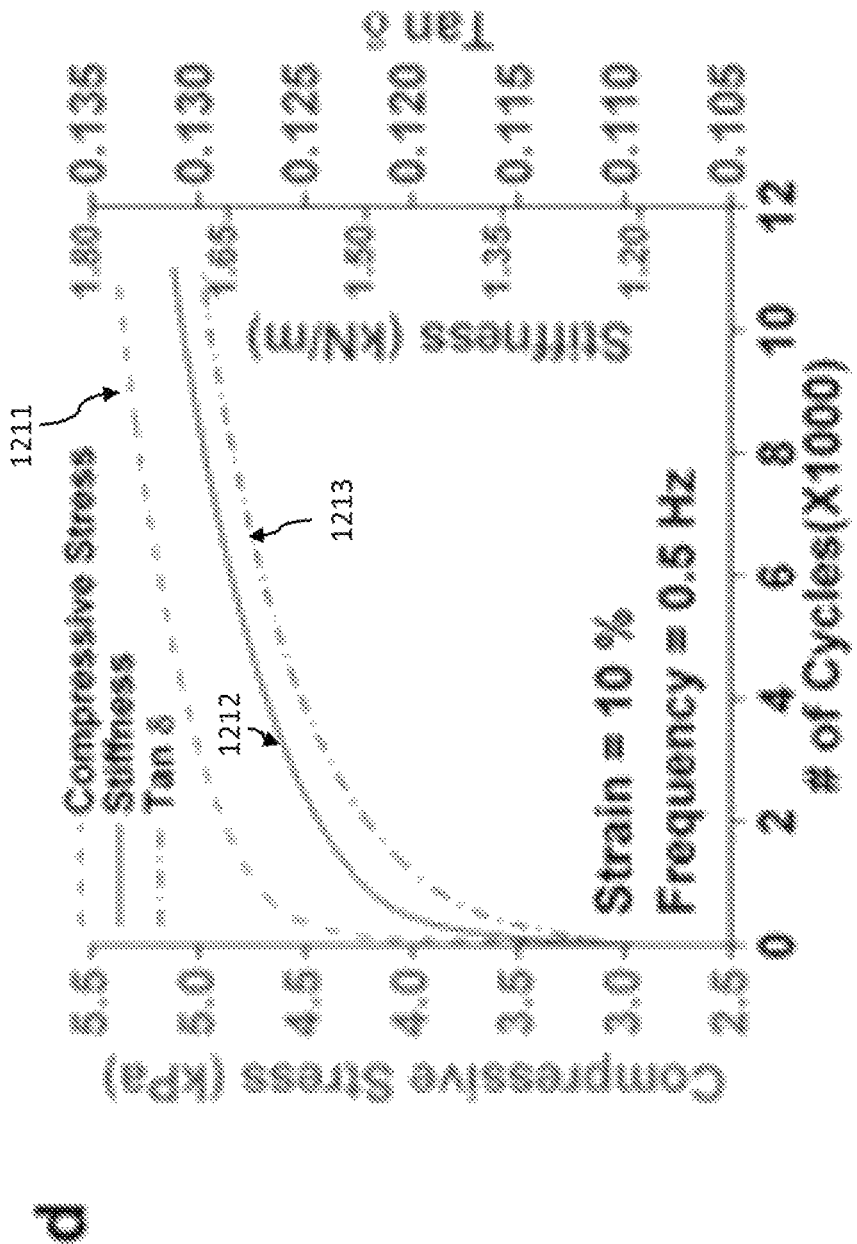
FIG. 12D is a graph showing the results of a dynamic mechanical analysis (DMA) on a CBxNT material (with density≈20 mg/cm$^3$) using multi-strain mode at 1 Hz for 11,000 cycles. Curves 1211-1213 correspond to the compressive strength, stiffness, and tan δ, respectively.

DMA was limited to stay within the perfectly elastic regime of the CBxNT material, limiting the analysis to minimal strain levels. It was noticed that the higher density samples resulted in higher stress levels, as expected, being that denser samples have more network elements in the structure. Each "elbow" joint within the CBxNT materials may act as a 'spring' joint to provide reversible elastic deformation. See FIG. 12A. Strain amplitude on the DMA instrument was limited to the perfectly elastic regime of the material, therefore, above 10% strain, samples would start to plastically deform and the instrument would end the test as to confirm full strain recovery during testing. As a comparison, viscoelastic polymers have E*~20 MPa and tan $\delta$=1.0 while most hard plastics have E*~1 to 10 GPa and tan $\delta$ range from 0.01 to 0.10. In a stiffness-loss map, the CBxNT viscoelastic solids may be categorized with rubber foam. Although the mechanical data suggested the degree of covalent bonding in these solids to be fairly low, it was enough to yield perfectly self-intact elastic solids (after only 30 minutes of growth) up to 10% strains before seeing any loss in volume; and only 18% plastic strain deformation after 100 cycles at 60% strain. The increasing stiffness with sequential compression cycles may indicate some CNT alignment in the structure along the compression axis. FIG. 12D.

It was noticed that the higher density samples resulted in higher stress levels as expected, and the samples were mechanically isotropic due to its random entangled 3D network, similar to the findings of "CNT sponges" recently reported. [Gui I 2010; Gui II 2010]. Control of the density and overall stiffness (resilience) of the sponges can be carried out by changing the solution feed rate. It has been found that a lower feed rate yielded lower densities and more resilient and more flexible sponge-like material.

Figures 13A, 13B:
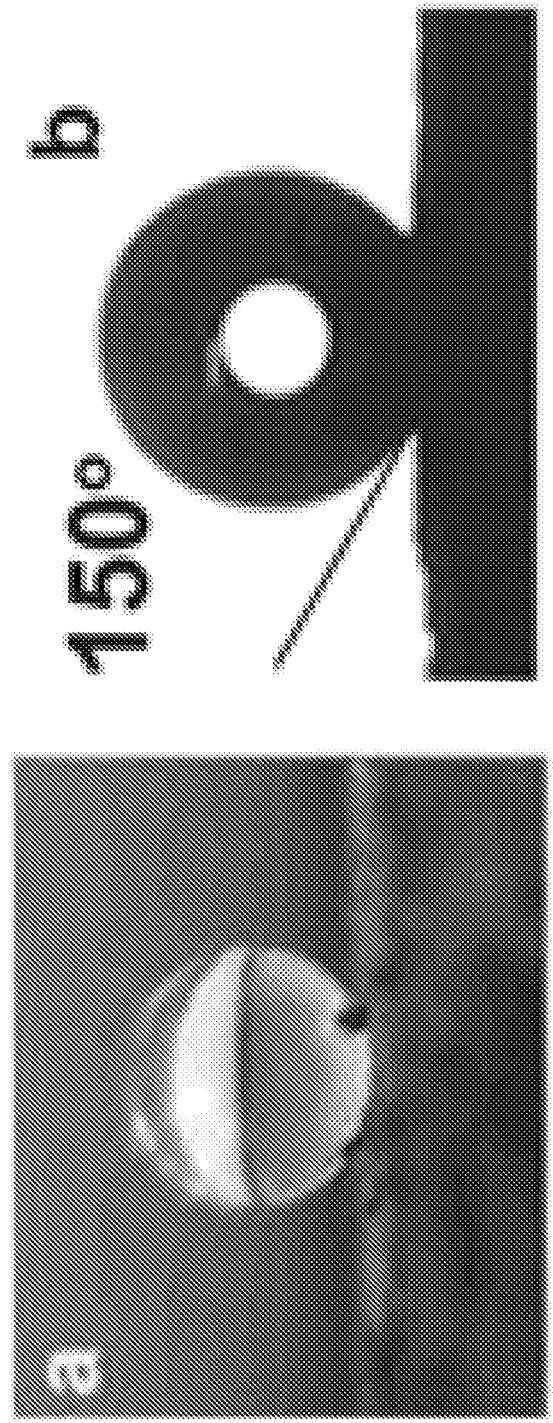
FIG. 13A is a photograph of superhydrophobic surface with a 150° contact angle measurement of a 2 mm diameter water droplet resting on the sponge surface.
FIG. 13B is a contact angle measurement of a 2 mm diameter water droplet on the surface of a CBxNT material using a Goniometer device.

Exploiting the super-hydrophobic nature of CNTs [Li 2002] and the low-density 3D porous framework, the sponge-like solid was shown to be usable as a reusable oil sorbent material in seawater. As shown in FIGS. 13A-13B, the CBxNT material had a contact angle around 150° with a 2 mm water droplet, but readily absorbed many organic compounds and hydrocarbons, including alcohols and oils.

Figure 13C:
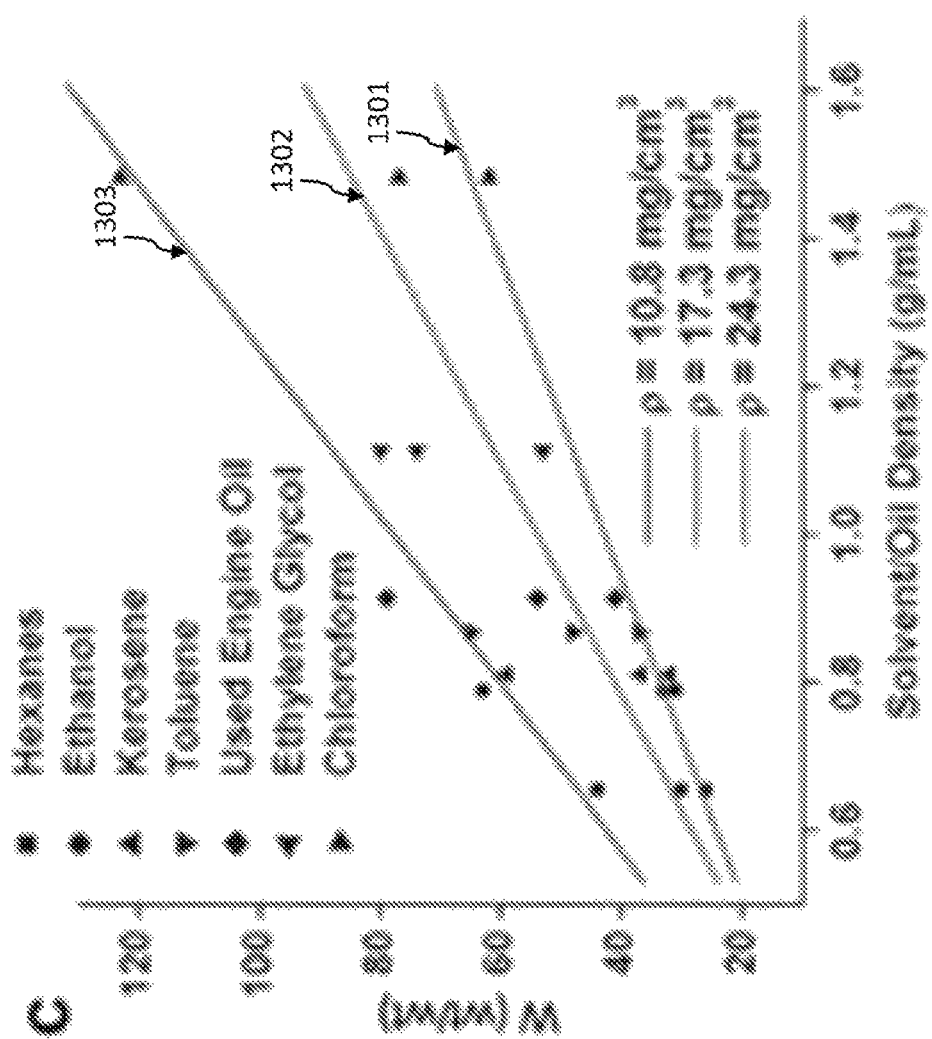
FIG. 13C is a graph of the weight-to-weight absorption capacity defined by the ratio of (a) the final weight after solvent absorption to (b) the initial weight of the sponge before absorption for common solvents, as measured on CBxNT material samples having different densities. Lines 1301-1303 are for CBxNT material samples having densities of 24.3 mg/cm$^3$, 17.3 mg/cm$^3$, and 10.8 mg/cm$^3$, respectively.
Figures 13D, 13E:
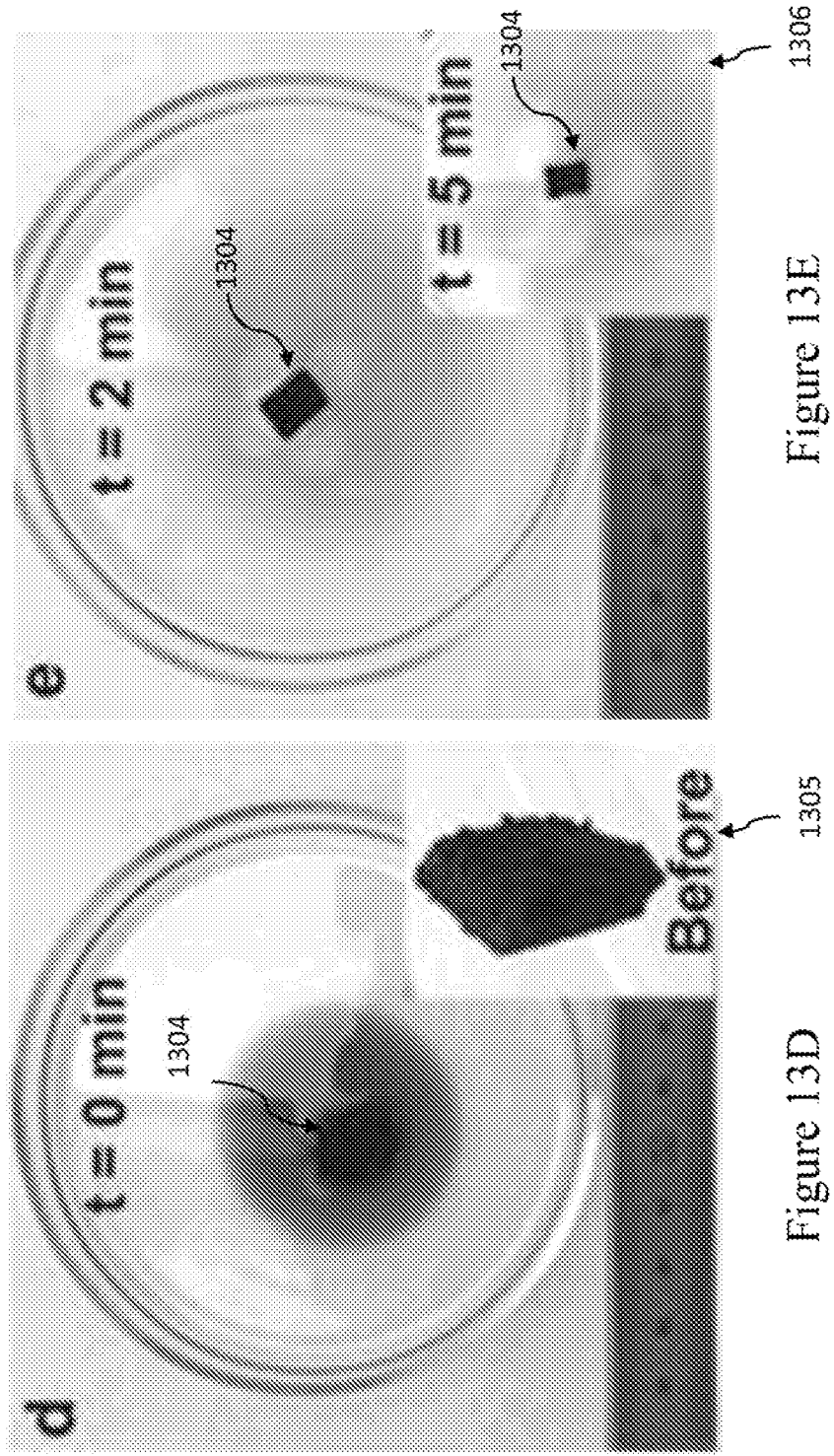
FIGS. 13D-13G are photographs of demonstrations using CBxNT materials to clean up used engine oil spill (0.26 mL) in seawater; sample (m≈4.8 mg, ρ≈17 mg/cm$^3$).
Figures 13F, 13G:
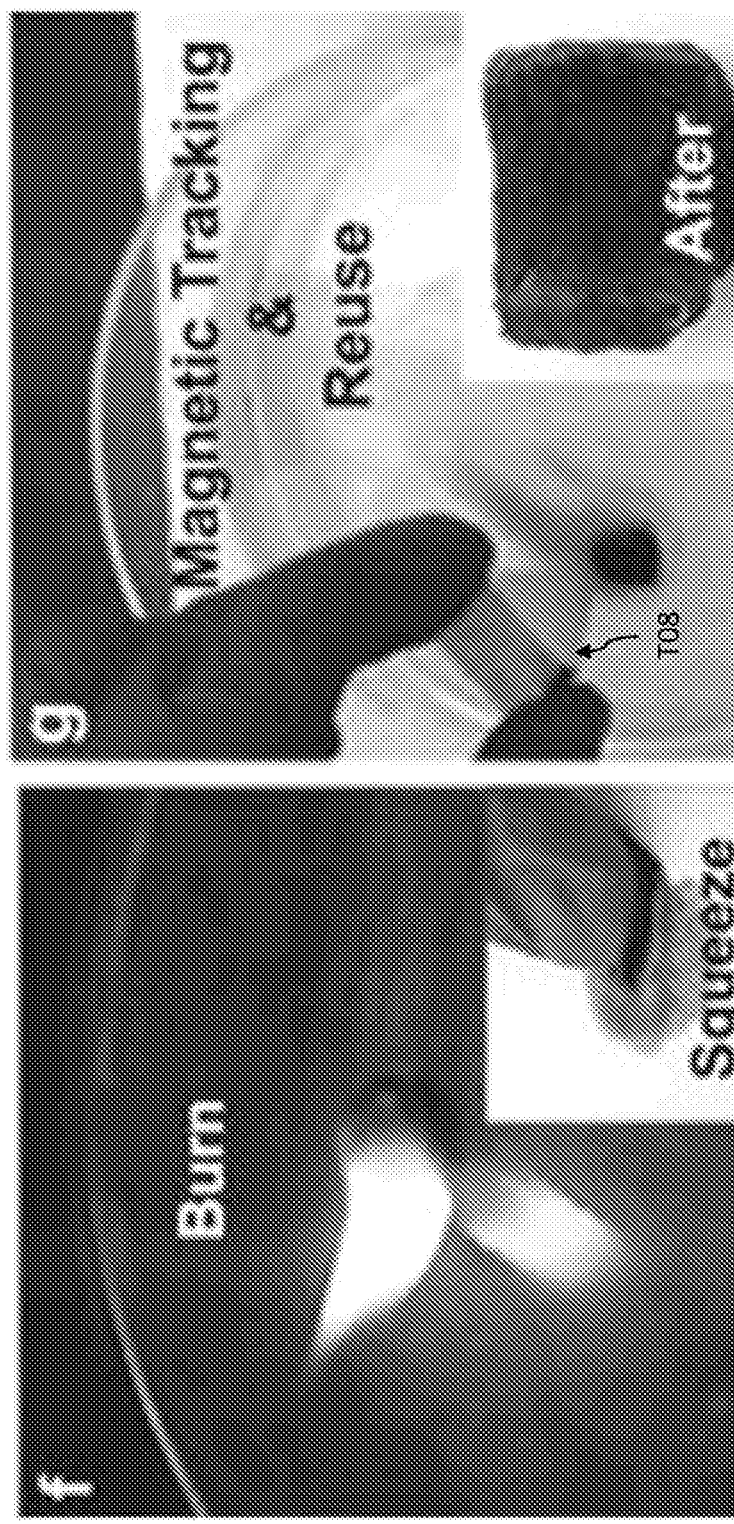

Strong oleophilic behavior was observed with very high absorption capacity. Weight-to-weight absorption capacity (defined by W (g g-1), the ratio of the final weight after absorption and the initial weight before absorption) for common solvents was measured on CBxNT sponges with three different densities: 24.3 mg/cm$^3$, 17.3 mg/cm$^3$, and 10.8 mg/cm$^3$, and plotted as Lines 1301-1303, respectfully in FIG. 13C. The absorption capacity values, W (g g-1), were obtained by measuring the mass of the dry as-produced sponge, and then measuring the mass after oil/solvent absorption. The ratio of the final mass to the initial mass was taken as the W (g g-1) value, averaging out three samples. To ensure full saturation was obtained before weighing, the samples were left submerged in the solvent/oil (without water) overnight. The samples were then removed with sharp needle tweezers and immediately placed onto a weigh paper to be measured on the mass balance.

Table I reflects the solvent weight-to-weight absorption data for the CBxNT sponges for each of the three different densities of 24.3 mg/cm$^3$, 17.3 mg/cm$^3$, and 10.8 mg/cm$^3$.

TABLE I

| Solvent | Sponge $\rho$ = 24.3 mg/cc | Sponge $\rho$ = 17.3 mg/cc | Sponge $\rho$ = 10.8 mg/cc |
| --- | --- | --- | --- |
| Hexanes (0.6548 g/ml) | 26.00 | 29.61 | 44.37 |
| Ethanol (0.789 g/ml) | 30.65 | 33.14 | 62.61 |
| Kerosene (0.81 g/ml) | 31.99 | 36.81 | 59.29 |
| Toluene (0.867 g/ml) | 37.38 | 48.46 | 65.48 |
| Used Engine Oil (0.913 g/ml) | 41.06 | 54.45 | 78.85 |
| Ethylene Glycol (1.1132 g/ml) | 52.98 | 74.38 | 79.526 |
| Chloroform (1.483 g/ml) | 62.28 | 76.91 | 122.86 |

As shown in Table 1, increasing solvent density and decreasing CBxNT sponge density resulted in higher absorption capacity. W increased with lower density sponges and with higher density solvents with as high as W=123 for chloroform (1.483 g/cm$^3$) and as low as W=22 for hexanes (0.655 g/cm$^3$).

The volume-to-volume absorption capacity (defined by V, the volume of the solvent absorbed by the CBxNT sponge per unit volume of the CBxNT sponge before absorption) was calculated from this same data. Table II reflects the volume of solvent absorbed per unit volume of the CBxNT sponges for each of the three different densities of 24.3 mg/cm$^3$, 17.3 mg/cm$^3$, and 10.8 mg/cm$^3$.

TABLE II

| Solvent | Sponge $\rho$ = 24.3 mg/cc | Sponge $\rho$ = 17.3 mg/cc | Sponge $\rho$ = 10.8 mg/cc |
| --- | --- | --- | --- |
| Hexanes (0.6548 g/ml) | 92.78% | 75.59% | 71.53% |
| Ethanol (0.789 g/ml) | 91.32% | 70.47% | 84.33% |
| Kerosene (0.81 g/ml) | 92.97% | 76.48% | 77.72% |
| Toluene (0.867 g/ml) | 101.96% | 94.70% | 80.32% |
| Used Engine Oil (0.913 g/ml) | 106.62% | 101.28% | 92.09% |
| Ethylene Glycol (1.1132 g/ml) | 113.47% | 114.04% | 76.18% |
| Chloroform (1.483 g/ml) | 100.41% | 88.55% | 88.74% |

As shown in Table II, the volume of solvent the CBxNT sponges absorbed was between about 70% and about 115% of the volume of the CBxNT sponge before absorption.

Figure 7A:
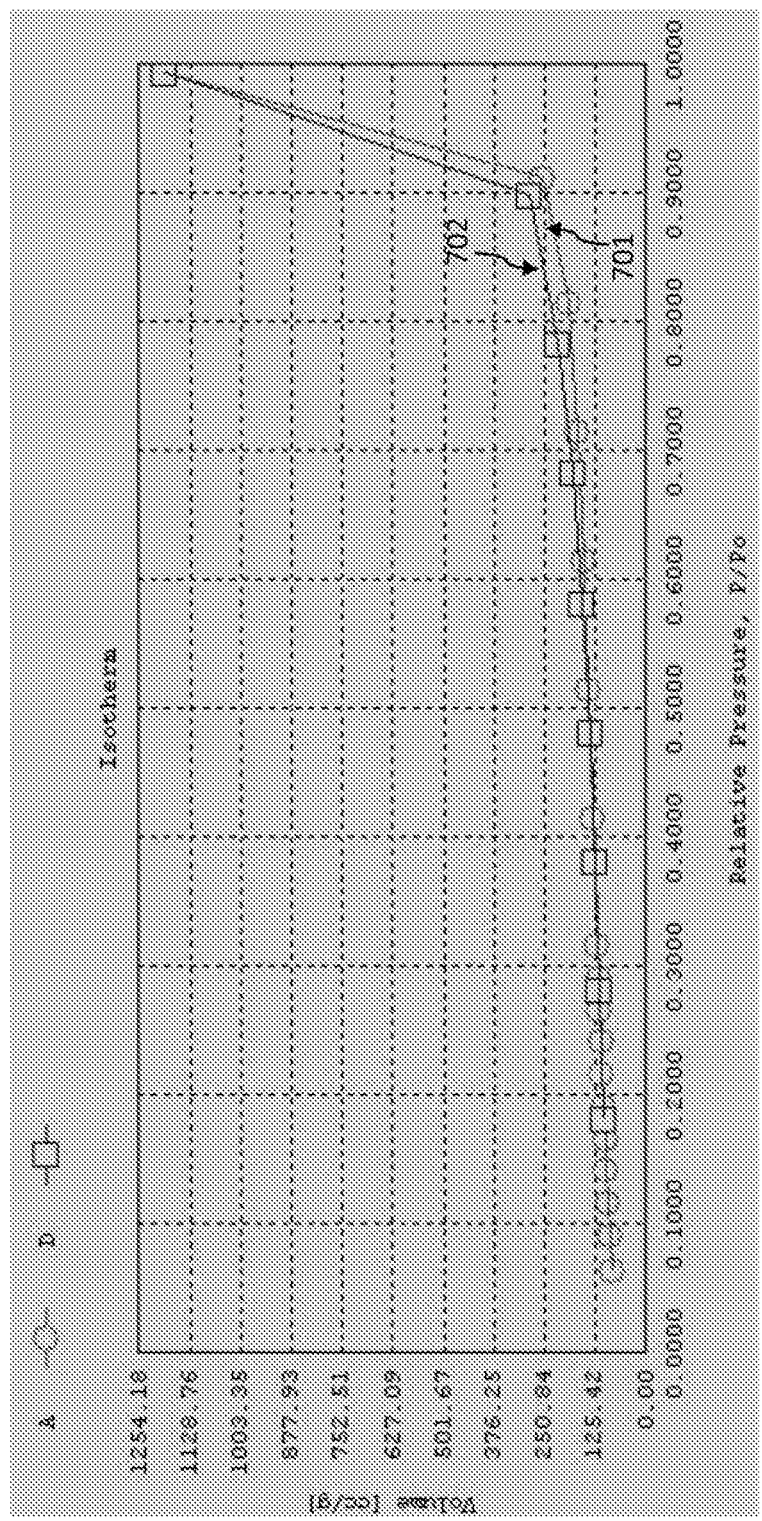
FIG. 7A is a $N_2$ absorption isotherm that shows a type-II adsorption isotherm that exhibits a negligible concave section, which is known to be attributed to microporous volume uptake, and a rapid rise in total volume near $P/P_0=1$ indicating a macroporous material.
Figure 7B:
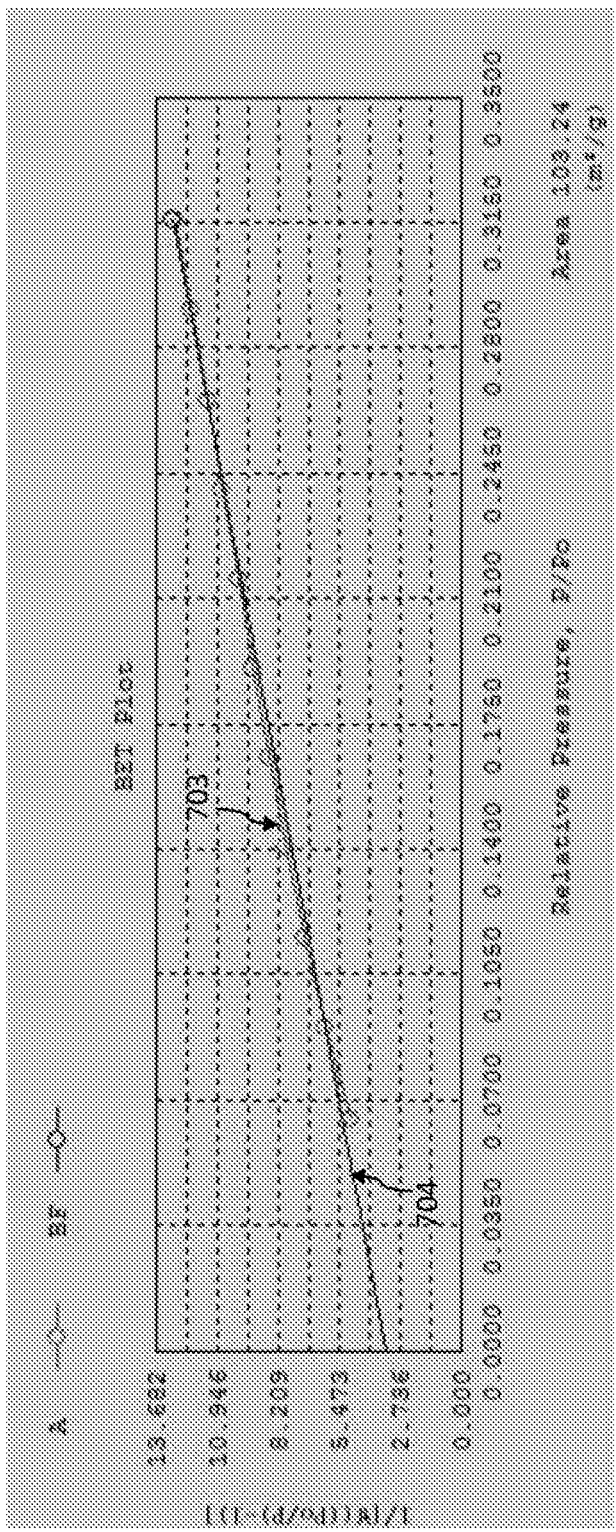
FIG. 7B is the BET plots 703 and 704 for A and BF that shows a surface area of 103.24 m$^2$/g for a high density sample.
Figure 7C:
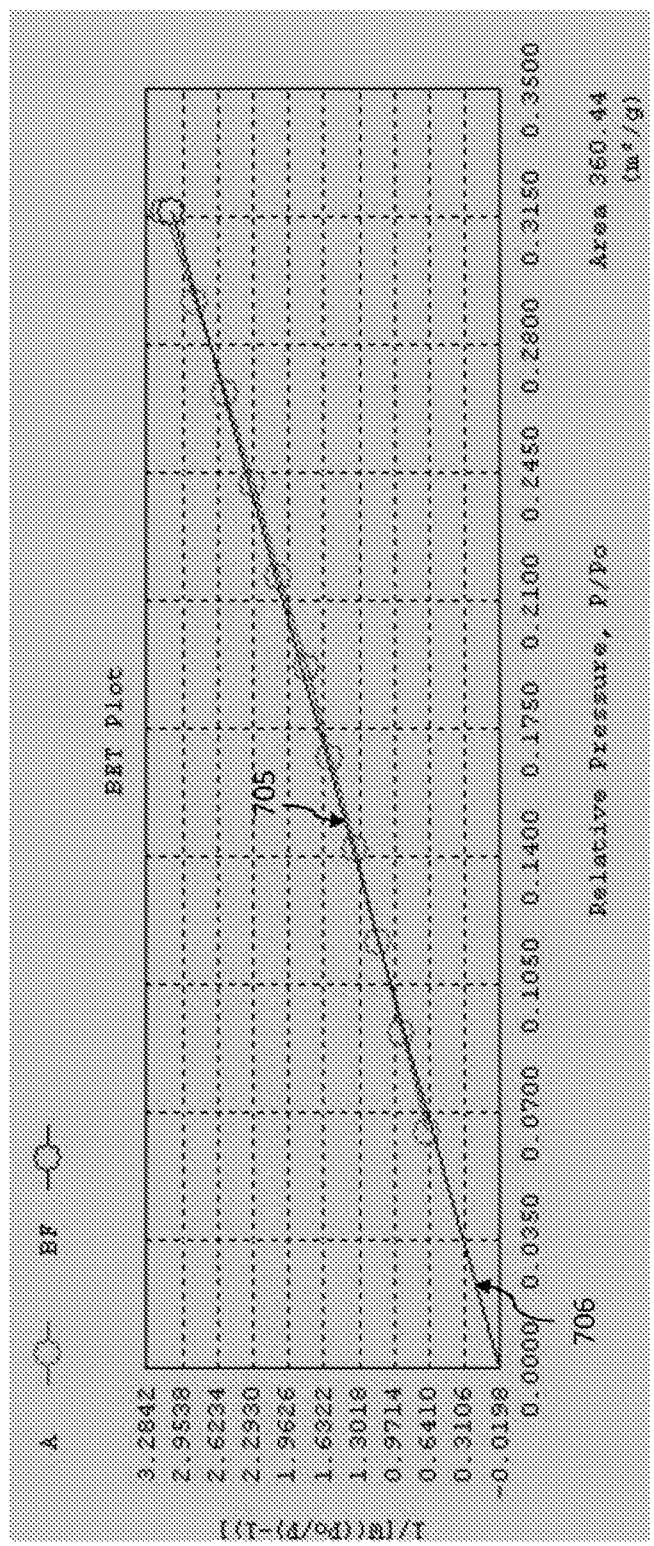
FIG. 7C is the BET plots 705 and 705 for A and BF that shows a surface area of 360.44 m$^2$/g for another high density sample.

The combination of high electrical conductivity with low density and porosity is another interesting aspect of this CBxNT material. As shown in FIG. 7B, the surface area of the CBxNT material with density≈25 mg/cm$^3$ was determined to be 1033.24 m$^2$/g by BET analysis. BET surface area analysis was done using Quantachrome Autosorb-3B Surface Analyzer and Autosorb 6 software. As shown by curve 1404 in FIG. 14B, the bulk elastic solids had an electrical resistivity around 2.4×10$^{-2}$ Ω-m at a temperature of 2 K and decreased to 2.0×10$^{-2}$ Ω-m at 395 K via four probe measurements. Four-probe electrical resistivity and magnetic moment measurements were done using a physical properties measurement system (PPMS; Quantum Design).

As noted above, experimental parameters can be varied (tailored) for creating a structure of desired properties such as density, porosity, surface area, carbon nanotube diameter, boron doping concentration, etc., and boron content. Experimental parameters might change to some extent for optimizing and controlling growth on a new system. Changing synthesis parameters such as dopant concentration and temperature, give the ability to control the boron defect concentration, density of junctions, and the overall properties of the CBxNT materials. Furthermore, these defects could act as anchor points for chemical or cluster functionalization in order to better tailor CBxNT for various alternative applications.

Varying the synthesis growth time will enhance the structural and mechanical integrity of the entangled network as longer carbon nanotubes will make the CBxNT materials less brittle and less likely to crumble. The metal catalyst (iron, nickel, cobalt, etc.) can also be changed. Carrier gas composition, gas flow rates, solution feed rates, density, porosity, boron concentrations (elbow defect concentrations), nanotube diameters, number of nanotube walls may also be varied. Composite material variations can be realized. This includes chemical functionalizing, which will affect the properties of the CBxNT materials and physadsorbing metal nanoparticles to the surface of the CBxNT for tailoring selective adsorption of chemical species etc.

Functionalization of the Heteroatom Doped Carbon Nanotube Material

In embodiments of the present invention, the heteroatom doped carbon nanotube materials (such as CBxNT materials) can be functionalization with metal nanoparticles (such as Au, Pt, Ag, Ti, Ni, Sc, etc.) or with other chemical receptors, polymers, proteins, etc. For instance, for CBxNT materials, the heavily boron-doped regions may act as chemical anchor points for functionalization or adsorption of specific gas molecules or solid-state particles, such as metals or metal ions for example.

The CBxNT materials (or other heteroatom-doped carbon nanotube materials) can also be functionalized using processes similar to those for functionalizing carbon nanotubes, such as, for example, by processes similar to those disclosed and taught in Margrave '455 Patent, Colbert '098 Patent, Khabashesku '533 Patent, Tour '147 Patent, and Tour '137 Patent.

Polymer Composites of the Heteroatom Doped Carbon Nanotube Material

In embodiments of the present invention, the heteroatom-doped carbon nanotube materials (such as CBxNT materials) can used to form a composite with a polymer binder.

For instance, the CBxNTs (or other heteroatom-doped carbon nanotubes) can be functionalized (such as described above) and then a polymer can be bound (by polymerization or otherwise) to the CBxNTs, such as, for example, by using processes similar to those disclosed and taught in Tour '940 Patent, Tour '137 Patent, and Tour '103.

Further, for instance, a polymer can be directly bound to the CBxNT, such as, for example, using a process similar to those disclosed and taught in Tour '199 Patent.

Also, for instance, a polymer matrix can be used to bind the CBxNT material, such as, for example, using a process similar to those disclosed and taught in Smalley '596 Patent.

Use of the Heteroatom-Doped Carbon Nanotube Material in Processes

By the present invention, it has been discovered that doping of carbon nanotubes with heteroatoms (such as elemental boron) created an entirely different tubule morphology, "elbow" geometrical defect, in the carbon nanotube lattice giving it unique material properties including: chemical, physical, mechanical, and electrical (altered thermal and optical properties are yet to be discovered). The synthesis parameters stated above produced high yields of a 3-dimensional, low density, porous solid sponge-like material composed of a heavily entangled network entirely of clean (little to no amorphous carbon) CBxNTs, which are generally boron-doped multiwall carbon nanotubes (CBxNT's). This nanostructure of the CBxNT material remained self-intact upon many deformation cycles without the need of any polymer binding material(s) to form a composite. In this way, the exceptional electrical conductivity that nanotubes have to offer was not compromised, which may be useful for some applications requiring such high conductivity. In fact, the boron doping seemed to alter the electronic properties of the carbon nanotubes making it an even more conductive bulk material than its pristine counterpart.

This synthesis procedure of the present invention takes advantage of the fact that boron acts as a "surface-active agent" during growth of carbon nanotubes producing higher yields than its pristine carbon nanotube counterparts (and even higher than nitrogen doping for that matter, which actually has been proven to slow down growth rate). Therefore, novel and unique aspects of the present invention include:

This synthesis procedure has shown to be feasible at the large-scale industrial level; considering the low cost of production and the fact that the yields are so high (~66-100 mg/min).

The heavily boron-doped regions may act as chemical anchor points for functionalization or adsorption of specific gas molecules or solid-state particles, such as metals or metal ions for example.

There is a dramatic photo-conductivity in tandem with strong photo-acoustic and photoelectric effect exhibited upon exposure to an intense flash of light (i.e., a camera flash). This effect was observed to be more dramatic than that of its pristine carbon nanotube counterpart, producing a 'popping' sound and emitted sparks in response.

These and other novel and unique aspects of the present invention can be realized in many applications for which this material can be utilized. High-tech and high quality sponges are realized with extremely low density, robust mechanical properties, high porosity, super hydrophobicity and high specific surface area while maintaining very high electrical conductivity. These are a remarkable combination of material properties that signifies the novelty and uniqueness of this material.

The present invention can be utilized in a number of applications, including:

Environmental—Embodiments of the present invention can be used for cleaning oil spills, for waste water purification (such as desalination or deionization), etc. Highly efficient natural and synthetic sorbent materials are of current interest for environmental applications on a global scale regarding the increased risk in oil spill catastrophe. In this regard, heteroatom-doped carbon nanotube materials (or "sponges") are superior when it comes to mass absorption efficiency.

As discussed above, FIG. 13C is a graph of the weight-to-weight absorption capacity defined by the ratio of (a) the final weight after solvent absorption to (b) the initial weight of the sponge before absorption for common solvents, as measured on samples having different densities. Lines 1301-1303 are for samples having densities of 24.3 mg/cm$^3$, 17.3 mg/cm$^3$, and 10.8 mg/cm$^3$, respectively. This absorption capacity of the CBxNT material renders it capable for use as a sorbent material.

The use of this sorbent material to clean environmental oil spills was tested using seawater (Galveston, Tex., USA) and black engine oil retrieved from a Houston, Tex., USA gas station (p=0.913 g/cm$^3$). The results of this testing reveals weight-to-weight absorption capacity as high as 79 (i.e., W=79) with the 10.8 mg/cm$^3$ samples. By way of comparison, woolspill knops, the leading natural oil sorbent material (having a density as low as 33 mg/cm$^3$) has a weight-to-weight absorption capacity of 36 (i.e., W=36) with heavy fuel oil (p=0.9535 g/cm$^3$). [See McFarland '215 Patent]. Woolspill™ knops, like most natural sorbents, are hydrophilic and water uptake is expected to minimize its efficiency; therefore the super-hydrophobicity of CNT sorbent materials is a clear advantage.

In this testing, the high buoyancy in seawater was demonstrated by forcing the sample underwater and observing the speed at which the sample submerged to the surface remaining completely dry.

Based on the oil absorption property, a sequence of events were performed to demonstrate the materials use to clean environmental oil contamination in seawater. FIGS. 13D-13G. After the CBxNT material 1304 becomes saturated, the oil could be burned out, and the material could be reused in this way time and time again. The burning of the oil/solvent saturated material will not destroy the CBxNTs significantly since the more volatile substance (oil/solvent) takes most of the local oxygen meanwhile it coats (protects) the CNTs' surface from oxidation. As the solvent/oil vanishes, the CNTs would then have less protection against oxidation, and the CNTs would only then begin to burn to a small degree before it rapidly cools below the oxidation temperature. Alternatively, the oil can be salvaged by means of squeezing it out by mechanical compression (inset 1307 of FIG. 13F). The CBxNT material can be used to 'mop-up' the surface oil out of the water as demonstrated by using a permanent magnet (field strength ~2000 Oe) to move it around as a means to tracking the oil spills. The ferromagnetic properties of the sponge arise due to the iron catalyst particles used in the growth process that remains trapped in the CNT core.

Figure 14A:
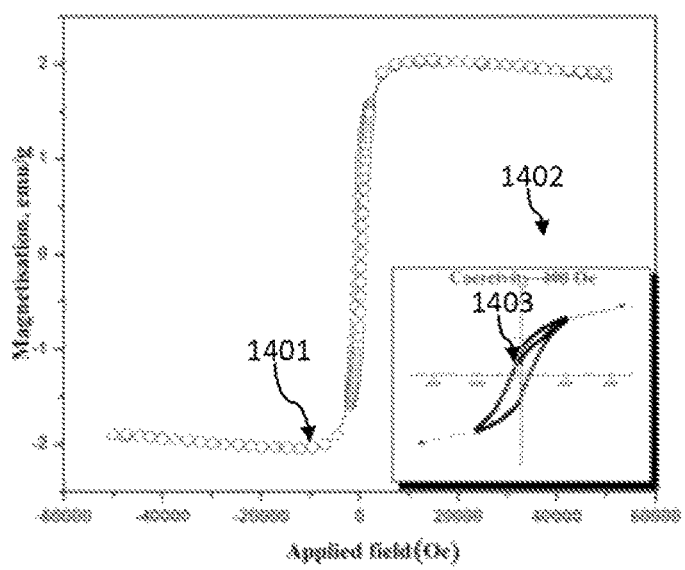
FIG. 14A is a graph of magnetization (emu/g) versus applied magnetic field (Oe) of a sample of CBxNT material.
Figure 14B:
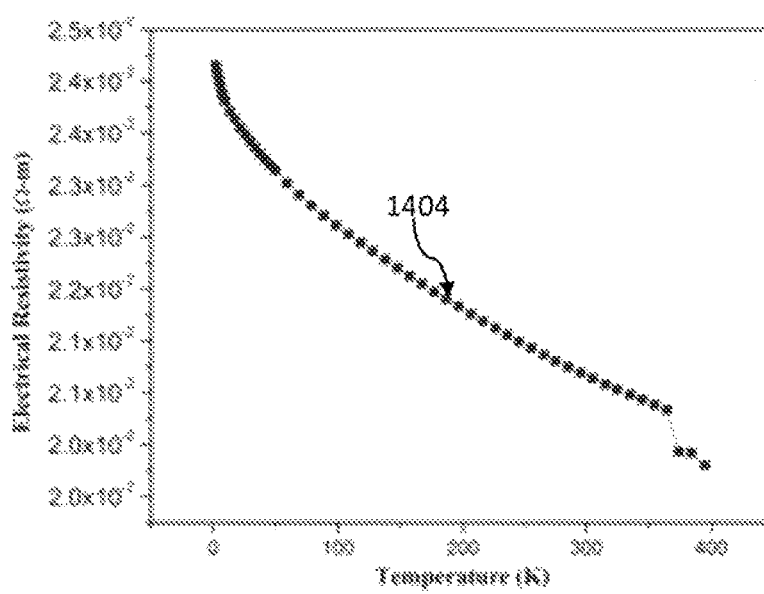
FIG. 14B is a graph of the PPMS four-probe electrical resistivity measurement vs. temperature on bulk CBxNT material.

As shown in FIG. 14A, the room temperature magnetization curve 1401 (M(H)) indicates a very high coercive field of iron (Fe) catalyst nanoparticles (~400 Oe) when compared to bulk iron (~0.9 Oe). Curve 1403 in inset 1402 reflects the coercivity of the sample was found to be ~400 Oe. The strain induced anisotropy due to the spatial confinement within the nanotube may be the reason for the high coercivity found in these magnetic CBxNTs. The considerable saturation magnetization and low field of saturation enables magnetic tracking even with small magnetic fields Interestingly, this heteroatom-doped carbon nanotube materials, such as CBxNT materials, possess a combination of physical properties that will impact the practical use of CNTs for this application. The result of macroscopic CBxNT materials having a network containing many covalent interconnections makes this application more feasible, and helps to deter the drawback of environmental impact concerns of nanoscale debris. Having the ability to direct its whereabouts (oil tracking) via magnetic field further offers a controllable way for handling and recovering all CNT material more safely.

Energy Application—Being a porous and highly conductive bulk material, embodiments of the present invention can be used as an electrode material for supercapacitors/battery devices. Three-dimensional Li ion battery devices are envisaged by coating the heteroatom doped CNTs with an electrically insulating but Li ion conducting layer (which may be accomplished by a low viscosity liquid solution dip coating procedure) followed by filling the remaining free volume of the macropores with cathode material. This would operate as a flexible 3D battery device.

Energy Scavenging/Harvesting Technology—Nanopiezotronic materials may be constructed by making composites with the 3D CNT macrostructure as a conductive scaffold support with inorganic piezoelectric materials such as zinc oxide (ZnO), nanotubes/nanorods or piezoelectric polymers such as polyvinylidene fluoride (PVDF). The 3D CNT macroscale framework may be used as a template/substrate for ZnO nanowire growth/synthesis either in the liquid phase or vapor phase via CVD process procedures: PVDF can be infiltrated and electrostatically poled with high electrical field over set number of minutes/hours to align the polymer chains for maximum piezo-response. Microwave welding procedures may be utilized to weld polymers to the CNT framework for better anchoring.

Bioengineering Material—Embodiments of the present invention can be used as tissue engineering scaffold support for cell growth such as skin/tissue/muscle/bone growth, etc. The high electrical conductivity of the 3D CNT macroscale scaffold may be exploited in this application to stimulate artificial muscle actuation by electrical impulses. In this regard composites thereof may be considered with electrolyte filled polymers and polymer solutions thereof to create electrochemical charge injection type stimulation for actuation.

Hazardous Gas Sensor Application—Embodiments of the present invention can be used to detect harmful gases/chemical vapors in the ppm range, such as by a detectable change in electrical conductivity due to physisorption.

Mechanical Sensor Applications—Embodiments of the present invention may be used to detect super low strains, such as by a detectable change in the electrical conductivity. There may be novel electromechanical phenomenon at the nanoscale "elbow" joints found in the heteroatom-doped macroscale solids. For example, the regions of high curvature may be active sites for electromechanical coupling phenomena upon induced mechanical strains (regions of high stress concentration) originating from quantum mechanical manifestations at the atomic level [ref. Taganstev et al. MRS Bulletin Vol. 34 2009].

Hydrogen storage—Embodiments of the present invention can be used for hydrogen storage, which may have applications in automobiles. The 3D CNT macrostructure may be decorated with any metal or transition metal nanoparticles (Ag, Au, Pt, Pd, Ni, Ti, Sc, V, Cu, etc.), or metal hydride nanoclusters, which may enhance the binding affinity for $H_2$ absorption and dissociation.

Other gas storage/capture applications—$H_2S_2$, $HS_2$, $CO_2$, CO, $NH_3$, $NO_2$, etc. gas capture/storage may be useful towards environmental needs. In which the 3D CNT macrostructures may be functionalized or decorated with nanoparticles for tailoring selectivity and enhancing the molecular gas' binding energy to the CNT surface and filling the pore volume.

Nuclear Applications—Boron carbide ($B_4C$) is known to have good neutron absorption efficiency without forming long-lived radionuclides, which makes it attractive as an absorbent for neutron radiation arising in nuclear power plants. Such applications include shielding materials or control rod materials. The boron content or the $B_4C$ within the 3D MWCNT macrostructure may be enhanced using the microwave irradiation energy mixed with a boron powder source within the 3D MWCNT macrostructure material.

Other Applications—Embodiments of the present invention can be used for other applications, such as material applications requiring a superhydrophobic surface and/or oleophilic surfaces.

The mechanically robustness of embodiments of the present invention may be changed or altered in view of the desired application. For instance, polymers may be used to form a composite as discussed above. In some embodiments, the material may be self-sufficient for the desired application.

The examples provided herein are to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

REFERENCES

Further references in the field of the present invention include:
U.S. Pat. No. 8,080,199, entitled "Interaction of microwaves with carbon nanotubes to facilitate modification," issued Dec. 20, 2011, to Tour et al. ("Tour '199 Patent").
U.S. Pat. No. 7,931,884, entitled "Welding of carbon single-walled nanotubes by microwave treatment," issued Apr. 26, 2011, to Harutyunyan et al. ("Harutyunyan '884 Patent").
U.S. Pat. No. 7,879,940, entitled "Polymerization initiated at sidewalls of carbon nanotubes," issued Feb. 1, 2011, to Tour et al. ("Tour '940 Patent").

U.S. Pat. No. 7,459,137, entitled "Process for functionalizing carbon nanotubes under solvent-free conditions," issued Dec. 8, 2008, to Tour et al. ("Tour '137 Patent").

U.S. Pat. No. 7,304,103, entitled "Process for making polymers comprising derivatized carbon nanotubes and compositions thereof," issued Dec. 4, 2007, to Tour et al. ("Tour '103 Patent").

U.S. Pat. No. 7,250,147, entitled "Process for derivatizing carbon nanotubes with diazonium species," issued Jul. 31, 2007, to Tour et al. ("Tour '147 Patent").

U.S. Pat. No. 7,125,533, entitled "Method for functionalizing carbon nanotubes utilizing peroxides," issued Oct. 24, 2006, to Khabashesku et al. ("Khabashesku '533 Patent").

U.S. Pat. No. 7,105,596, entitled "Methods for producing composites of single-wall carbon nanotubes and compositions thereof," issued Sep. 12, 2006, to Smalley et al. ("Smalley '596 Patent").

U.S. Pat. No. 7,067,098, entitled "Method for forming an array of single-wall carbon nanotubes and compositions thereof," issued Jun. 27, 2006, to Colbert et al. ("Colbert '098 Patent").

U.S. Pat. No. 6,645,455, entitled "Chemical derivatization of single-wall carbon nanotubes to facilitate solvation thereof; and use of derivatized nanotubes to form catalyst-containing seed materials for use in making carbon fibers," issued Nov. 11, 2003, to Margrave et al. ("Margrave '455 Patent").

U.S. Pat. No. 6,495,258, entitled "Structures with high number density of carbon nanotubes and 3-dimensional distribution," issued Dec. 17, 2002, to Chen et al. ("Chen '258 Patent).

U.S. Pat. No. 5,252,215, entitled "Absorbent materials and use thereof," issued Oct. 12, 1993, to McFarlane et al. ("McFarland '215 Patent").

Blasé, X., et al., "Boron-Mediated Growth of Long Helicity-Selected Carbon Nanotubes," *Phys. Rev. Lett.*, 1999, 83, 5078-5081 ("Blasé 1999").

Burgess, J. S., et al., "Boron-doped carbon powders formed at 1000° C. and one atmosphere, *Carbon*, 2008, 46, 1711-1717 ("Burgess 2008").

Carroll, D. L., et al., "Effects of Nanodomain Formation on the Electronic Structure of Doped Carbon Nanotubes," *Phys. Rev. Lett.*, 1998, 81, 2332-2335 ("Carroll 1998").

Cermignani, W., et al., "Synthesis and characterization of boron doped carbons," *Carbon*, 1995, 33, 367-374 ("Cermignani 1995").

Dunlap, B. I., "Connecting carbon tubules," *Phys. Rev. B*, 1992, 46, 1933-1936 ("Dunlap 1992").

Endo, M., et al., "Atomic Nanotube Welders: Boron Interstitials Triggering Connections in Double-Walled Carbon Nanotubes," *Nano Lett.*, 2005, 5, 1099-1105 ("Endo 2005").

Froudakis, G. E., "Hydrogen storage in nanotubes & nanostructures," *Materialstoday*, 2011, 14, 324-328 ("Froudakis 2011").

Gogotsi, Y., "High-Temperature Rubber Made from Carbon Nanotubes," *Science*, 2010, 330, 1332-1333 ("Gogotsi 2010").

Goldberg, D., et al., "Single-walled B-doped carbon, B/N-doped carbon and BN nanotubes synthesized from single-walled carbon nanotubes through a substitution reaction," *Chem. Phys. Lett.*, 1999, 308, 337-342 ("Goldberg 1999").

Gui, X., et al., "Soft, Highly Conductive Nanotube Sponges and Composites with Controlled Compressibility, *ACS Nano*, 2010, 4, 2320-2326 ("Gui I 2010").

Gui X., et al., "Carbon Nanotube Sponges," *Adv. Mater.*, 2010, 22, 617-621 ("Gui II 2010").

Han, W. Q., et al., "Aligned CNx nanotubes by pyrolysis of ferrocene/$C_{60}$ under $NH_3$ atmosphere," *Appl. Phys. Lett.*, 2000, 77, 1807-1810 ("Han 2000").

Iijima, S., "Helical Microtubules of Graphitic Carbon" *Nature*, 1991, 354, 56-58 ("Iijima 1991").

Jacobsohn, L. G., et al., "X-ray photoelectron spectroscopy investigation of boron carbide films deposited by sputtering," *Surf Sci.*, 2004, 572, 418-424 ("Jacobsohn 2004")

Koós, A. A., et al., "Comparison of Structural changes in nitrogen and boron-doped multi-walled carbon nanotubes," *Carbon*, 2010, 48, 3033-3041 ("Koós 2010").

Kresse, G., et al., "Efficient iterative schemes for ab initio total-energy calculations using aplane-wave basis set," *Phys. Rev. B*, 1996, 54, 11169-11186 ("Kresse 1996").

Kurt, R., et al., "Tailoring the diameter of decorated C—N nanotubes by temperature variations using HF-CVD," *Carbon*, 2001, 39, 2163-2172 ("Kurt 2001").

Lee, C. J., et al., "Synthesis of bamboo-shaped carbon-nitrogen nanotubes using $C_2H_2$—$NH_3$—$Fe(CO)_5$ system," *Chem. Phys. Lett.*, 2002, 359, 115-120 ("Lee 2002").

Lehman, J. H., et al., "Evaluating the characteristics of multiwall carbon nanotubes," *Carbon*, 2011, 49, 2581-2602 ("Lehman 2011").

Li, S., et al., "Super-Hydrophobicity of Large-Area Honeycomb-Like Aligned Carbon Nanotubes," *J. Phys. Chem. B*, 2002, 106, 9274-9276 ("Li 2002").

Liu, Y. S., et al., "Effect of deposition temperature on boron-doped carbon coatings deposited from a $BCl_3$—$C_3H_6$—$H_2$ mixture using low pressure chemical vapor deposition," *Appl. Surf Sci.*, 2009, 255, 8761-8768 ("Liu 2009").

Lozano-Castello, D., et al., "Preparation and characterisation of novel 'sea-cucumber'-like structures containing carbon and boron," *Carbon*, 2004, 42, 2223-2231 ("Lozano-Castello 2004").

Lyu, S. C., et al., "Synthesis of boron-doped double-walled carbon nanotubes by the catalytic decomposition of tetrahydrofuran and triisopropyl borate," *Carbon*, 2011, 49, 1532-1541 ("Lyu 2011").

Ma, X., et al., "Polymerized carbon nanobells and their field emission properties," *Appl. Phys. Lett.*, 1999, 75, 3105-3108 ("Ma 1999").

Maultzsch, J., et al., "Raman characterization of boron-doped multiwalled carbon nanotubes," *Appl. Phys. Lett.*, 2002, 81, 2647-2650 ("Maultzsch 2002").

McGuire, K., et al., "Synthesis and Raman characterization of boron-doped single-walled carbon nanotubes," *Carbon*, 2005, 43, 219-217 ("McGuire 2005").

Mondal, K. C., et al., "Boron mediated synthesis of multi-walled carbon nanotubes by chemical vapor deposition," *Chem. Phys. Lett.*, 2007, 437, 87-89 ("Mondal 2007").

Nath, M., et al., "Production of bundles of aligned carbon and carbon-nitrogen nanotubes by the pyrolysis of precursors on silica-supported iron and cobalt catalyst," *Chem. Phys. Lett.*, 2000, 322, 333-340 ("Nath 2000").

Oberlin, A., et al., "Filamentous growth of carbon through benzene decomposition," *Journal of Crystal Growth*, 1976, 32, 335-349 ("Oberlin 1976").

Redlich, P., et al., "B—C—N nanotubes and boron doping of carbon nanotubes," *Chem. Phys. Lett.*, 1996, 260, 465-470 ("Redlich 1996").

Perdew, J. P., et al., "Generalized gradient approximation made simple," *Phys. Rev. Lett.*, 1996, 77, 3865-3868 ("Perdew 1996").

Romo-Herrera, J. M., et al., "The Role of Sulfur in the synthesis of Novel Carbon Morphologies: From Covalent Y-Junctions to Sea-Urchin-Like Structures," *Adv. Func. Mater.*, 2009, 19, 1193-1199 ("Romo-Herrera 2009").

Romo-Herrera, J. M., et al., "An atomistic branching mechanism for carbon nanotubes: Sulfur as the triggering agent," *Angewandle Chemie*, 2008, 47, 2948-2953 ("Romo-Herrera 2008").

Romo-Herrera, J. M., et al., "Covalent 2D and 3D networks from 1D nanostructures: designing new materials," *Nano Lett.*, 2007, 7, 570-576 ("Romo-Herrera 2007")

Sen, R., et al., "B—C—N, C—N and B—N nanotubes produced by the pyrolysis of precursor molecules over Co catalyst," *Chem. Phys. Lett.*, 1998 287, 671-676 ("Sen 1998").

Sen, R., et al., "Nitrogen-containing carbon nanotubes," *J. Mater. Chem.*, 1997, 7, 2335-2337 ("Sen 1997").

Shirasaki, T., et al., "Synthesis and characterization of boron-substituted carbons," *Carbon*, 2000; 38, 1461-1467 ("Shirasaki 2000")

Stephan O., et al., "Doping graphitic and carbon nanostructures with boron and nitrogen," *Science*, 1994, 266, 1683-1685 ("Stephan 1994").

Singh, A. K., et al., "Metallacarboranes: Towards Promising Hydrogen Storage Metal Organic Frameworks," *J. Am. Chem. Soc.*, 2010, 132, 14126-14129 ("Singh 2010").

Suenaga, K., et al., "Radially modulated nitrogen distribution in CNx nanotubular structures prepared by CVD using Ni phthalocyanine," *Chem. Phys. Lett.*, 2000, 316, 365-372 ("Suenaga 1997").

Suenaga, K., et al., "Synthesis of Nanoparticles and Nanotubes with Well-Separated Layers of Boron Nitride and Carbon," *Science*, 1997, 278, 653-655 ("Suenaga 1997").

Sumpter, B. G., et al., "A Theoretical and Experimental Study On Manipulating the Structure and Properties of Carbon Nanotubes Using Substitutional Dopants," *International Journal of Quantum Chemistry*, 2009, 109, 97-118 ("Sumpter 2009").

Sumpter, B. G., et al., "Nitrogen-Mediated Carbon Nanotube Growth: Diameter Reduction, Metallicity, Bundle Dispersability, and Bamboo-like Structure Formation," *ACS Nano*, 2007, 1, 369-375 ("Sumpter 2007").

Terrones, M., et al., "Efficient route to large arrays of CNx nanofibers by pyrolysis of ferrocene/melamine mixtures," *Appl. Phys. Lett.*, 1999, 75, 3932-3925 ("Terrones 1999").

Terrones, M., et al., "Pyrolytically grown BxCyNz nanomaterials: nanofibres and nanotubes," *Chem. Phys. Lett.*, 1996, 257, 576-582 ("Terrones 1996").

Wang, X., et al., Controllable Growth, Structure, and Low Field Emission of Well-Aligned CNx Nanotubes. J. Phys. Chem. B 2002, 106, 2186-2190 ("Wang 2002").

Wu, X., et al., "Inhibition of catalytic oxidation of carbon/carbon composites by boron-doping," *Carbon*, 2005, 43, 1768-1777 ("Wu 2005").

Xu, M., et al., "Carbon Nanotubes with Temperature-Invariant Viscoelasticity from −196° to 1000° C.," *Science*, 2010, 330, 1364-1368 ("Xu 2010").

Yang, L. et al., "Boron-doped carbon nanotubes as metal-free electrocatalysts for the oxygen reduction reaction," *Angewandle Chemie-International Ed.*, 2011, 50, 7132-7135 ("Yang 2011").

Yi, J.-Y., et al., "Atomic Structure and doping of microtubules," *Phys. Rev. B*, 1993, 47, 1708-1711 ("Yi 1993").

Yudasaka, M., et al., "Nitrogen-containing carbon nanotube growth from Ni phthalocyanine by chemical vapor deposition," *Carbon*, 1997, 35, 195-201 ("Yudasaka 1997").

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A solid three-dimensional carbon nanotube structure comprising boron-containing carbon nanotubes,
    wherein the structure is prepared by chemical vapor deposition synthesis of carbon nanotubes, comprising reacting a hydrocarbon, a boron source, and a metal catalyst source in a chemical vapor deposition reactor, wherein the ratio of the metal atoms to the boron atoms is between 2 and 20, and
    wherein the structure is in the form of a macroscale three-dimensional material of entangled carbon nanotube networks.

2. The structure of claim 1, wherein the ratio of the metal atoms to the boron atoms present is between 4 and 6.

3. The structure of claim 1, wherein the carbon source comprises toluene or hexane.

4. The structure of claim 1, wherein the metal catalyst source comprises ferrocene.

5. The structure of claim 1, wherein the boron source comprises triethylborane.

6. The structure of claim 1, wherein the hydrocarbon, the boron source, and the metal catalyst source are combined to form a chemical precursor within the reactor.

7. The structure of claim 6, wherein the hydrocarbon is between about 87 wt % and about 97 wt % of the hydrocarbon, the metal catalyst source, and the boron source.

8. The structure of claim 6, wherein the metal catalyst source is between about 2.5 wt % and about 12 wt % of the hydrocarbon, the metal catalyst source, and the boron source.

9. The structure of claim 6, wherein the boron source is between about 0.1 wt % and about 2 wt % of the hydrocarbon, the metal catalyst source, and the boron source.

10. The structure of claim 1, wherein the structure is in the form of a macroscale three-dimensional structure of nanotubes, and wherein the macrostructure is at least 1 cm in two perpendicular directions.

11. The structure of claim 1, wherein the structure is in the form of a macroscale three-dimensional structure of nanotubes, and wherein the macrostructure is at least 1 cm in three orthogonal directions.

12. The structure of claim 1, wherein the structure is a porous material having a bulk density less than 10 mg/cm$^3$.

13. The structure of claim 1, wherein the structure is a porous material having a bulk density between 10 mg/cm$^3$ and 29 mg/cm$^3$.

14. The structure of claim 1, wherein the structure is comprised of an isotropic ensemble of entangled individual carbon nanotubes comprising elbow defects or covalent junction sites.

15. The structure of claim 1, wherein the three-dimensional carbon nanotube structures comprising boron-containing carbon nanotubes are comprised of an isotropic ensemble of entangled individual carbon nanotubes which does not comprise elbow defects or covalent junction sites.

16. The structure of claim 1, wherein the boron source is selected from the group consisting of organoboranes, organoborates, and combinations thereof.

17. The structure of claim 1, wherein the structure exhibit elastic mechanical behavior.

18. The structure of claim 1, wherein the structure exhibits magnetic properties with a high coercive field of about 400 Oersted.

19. The structure of claim 1, wherein the structure is a porous solid.

20. The structure of claim 1, wherein the process further comprises welding the boron-containing carbon nanotubes of the three-dimensional macroscale carbon nanotube structures.

21. The structure of claim 1, wherein the boron source is the boron containing gas source, boron trichloride.

22. An electrode material for use in supercapacitors or battery devices, comprising the structure of claim 1.

23. A battery comprising the electrode material of claim 22.

24. A supercapacitor comprising the electrode material of claim 22.

25. The electrode material of claim 22, wherein the material is a porous material having a bulk density less than 10 mg/cm$^3$.

26. The electrode material of claim 22, wherein the material is comprised of an isotropic ensemble of entangled individual carbon nanotubes comprising elbow defects or covalent junction sites.

\* \* \* \* \*